United States Patent [19]
Otobe et al.

[11] Patent Number: 5,823,547
[45] Date of Patent: Oct. 20, 1998

[54] CHILD SAFETY SEAT

[75] Inventors: Tetsuro Otobe; Hiroshi Matsumoto; Kazuhiro Sasaki; Kazumasa Okumura, all of Kariya; Kazuo Sato, Ohbu; Masaaki Toya, Nagoya, all of Japan

[73] Assignee: Kabushiki Kaisha Toyoda Jodoshokki Seisakusho, Japan

[21] Appl. No.: 812,200

[22] Filed: Mar. 6, 1997

Related U.S. Application Data

[63] Continuation of Ser. No. 326,016, Oct. 19, 1994, abandoned.

[30] Foreign Application Priority Data

Oct. 19, 1993 [JP] Japan .................................. 5-261430
Oct. 19, 1993 [JP] Japan .................................. 5-261431

[51] Int. Cl.$^6$ ........................................................ B62B 7/10
[52] U.S. Cl. ........................ 280/30; 280/643; 280/648; 297/250.1
[58] Field of Search .............. 280/30, 641, 642, 280/643, 647, 648, 650; 297/118, 250.1

[56] References Cited

U.S. PATENT DOCUMENTS

| | | | |
|---|---|---|---|
| 4,786,064 | 11/1988 | Baghdasarian | 280/30 |
| 4,832,354 | 5/1989 | LaFreniere | 280/30 |
| 4,834,403 | 5/1989 | Yanus et al. | 280/30 |
| 4,872,692 | 10/1989 | Steenburg | 280/30 |
| 4,872,693 | 10/1989 | Kennel | 280/30 |
| 4,874,182 | 10/1989 | Clark | 280/30 |
| 4,989,888 | 2/1991 | Qureshi et al. | 280/30 |
| 5,104,134 | 4/1992 | Cone | 280/30 |
| 5,360,221 | 11/1994 | Chai | 280/30 |
| 5,398,951 | 3/1995 | Ryu | 280/30 |

FOREIGN PATENT DOCUMENTS

| | | |
|---|---|---|
| 62-138638 | 9/1987 | Japan . |
| 4-232175 | 8/1992 | Japan . |
| 803538 | 10/1958 | United Kingdom . |

*Primary Examiner*—Brian L. Johnson
*Assistant Examiner*—Michael Mar
*Attorney, Agent, or Firm*—Woodcock Washburn Kurtz Mackiewicz & Norris LLP

[57] ABSTRACT

A child safety seat can be used as an auxiliary seat in an automobile and a stroller. The child safety seat has front and rear caster arms which are rotatably provided in a seat structure. The front and rear caster arms selectively extend downward from and retract above the lowermost portion of the seat structure. The child safety seat can be attached to the automobile seat when the front and rear caster arms retract.

30 Claims, 46 Drawing Sheets

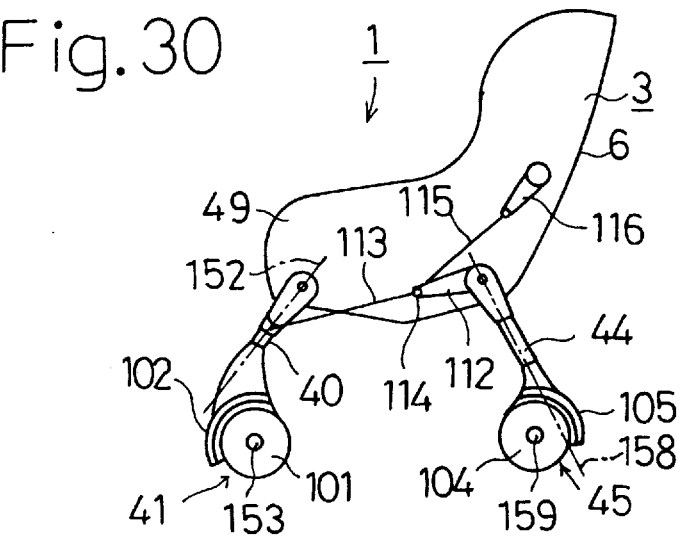
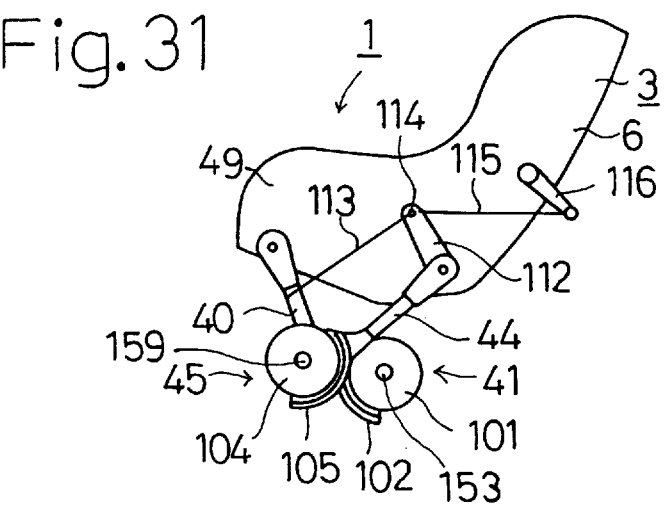
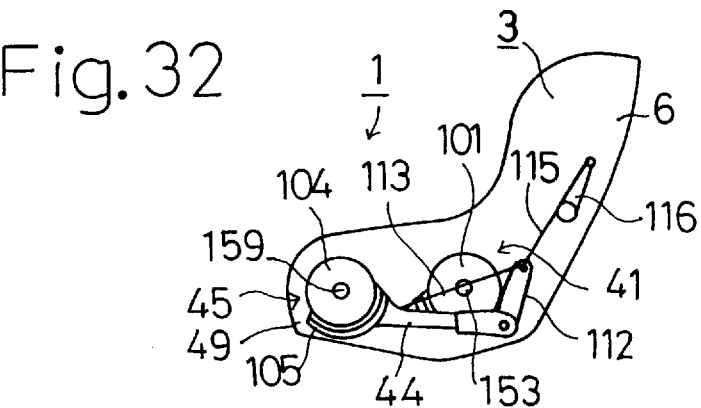

Fig.51

CHILD SAFETY SEAT

This is a continuation of application Ser. No. 08/326,016, filed Oct. 19, 1993 now abandoned.

BACKGROUND OF THE INVENTION

1. Field of the Invention

The present invention relates to child safety seats, and more particularly to child safety seats that function both as an auxiliary automobile safety seat and as a stroller.

2. Description of the Related Art

In general, regular automobile seats and seat belts are designed for adults. Consequently, when a baby or a small child is placed directly on a regular automobile seat, the seat belts typically will not safely support or secure the child to the automobile seat. To correct this problem, auxiliary child safety seats affix directly to the seat by means of the automobile's seat belt. A small child is then placed in the safety seat to be secured thereto by a safety belt incorporated in the safety seat. The child safety seat will in this way support the child's posture as well as safely secure the child to the automobile seat.

Due to the wide spread use of automobiles in today's increasingly mobile society, parents of small a child often find themselves constantly placing their child in and out the auxiliary safety seat. This task is further burdened by transferring the child to a stroller. Although a stroller facilitates their mobility with a child outside the automobile, the parent must transport the stroller in the automobile. Moreover, a stroller takes up a significant amount of available interior storage space in today's compact automobiles, and unfortunately reduces the trunk space for other baggage.

In the past, one proposed solution to this problem included an auxiliary child safety seat having the combined function of a safety seat and a stroller. The parent can selectively use the combined seat either as an auxiliary safety seat securable to the automobile seat or as a stroller capable of transporting the child outside the automobile on a sidewalk or other hard surface. Japanese Unexamined Patent Publication No. 4-232175, for example, discloses a child seat which can be converted into a stroller or an auxiliary safety seat by operating a clamping member attached to a seat's shell while pulling up on a hand held stem. The lower portion of the safety seat houses the front and rear wheels of the stroller, allowing the safety seat to be attached to the automobile seat.

This past design, however, increased the height of the auxiliary safety seat at least by the front and rear wheels. Such an increase in height is undesirable for the low headroom space in many of today's compact cars. When the auxiliary seat is placed on the automobile seat in the compact cars, the automobile's ceiling often contacted the top portion of the auxiliary seat. This contact made it relative difficult to install and remove the above-described stall seat in the automobile seat.

Furthermore, in converting this old auxiliary seat, the operator must operate the clamping member and lift the stem of the auxiliary safety seat. If a baby or small child had been already be in the auxiliary safety seat at the time of this operation, the conversion operation would have been quite difficult. Consequently, this particular past design did not allow the user to handle the convertible safety seat with ease.

Another past attempt is found in Japanese Unexamined Utility Model Publication No. 62-138638, which also teaches a child safety seat convertible to a stroller comprising leg members and a main seat body securable to an automobile seat. Upon conversion of the stroller unit to the auxiliary safety seat, the front and rear wheels are housed in the lower portion of the auxiliary safety seat body by rotating the leg members into the bottom portion of the safety seat.

Once again, this seat had the similar disadvantage mentioned previously, i.e., the increased height due to the collapsed wheels made it difficult to install and remove the seat in and from the automobile. Furthermore, this model had an additional disadvantage that when the safety seat was placed on the automobile seat, the front and rear wheels of the stroller unit contacted the automobile seat. This contact could result in considerable damage to the automobile seat. Generally, in auxiliary safety seats of this kind which are convertible to stroller units, it is highly desirable to collapse or rotate the stroller's legs and wheels with a minimum rotational angle.

SUMMARY OF THE INVENTION

The present invention has been accomplished with a view to solving the above problems. An object of the present invention to provide a child safety seat in which an overall height of the child safety seat, when switched from the stroller to the auxiliary seat, can be made lower as compared to when the front and rear wheels are housed in the lower portion of the seat structure so as to improve operability for placing the child safety seat on an automobile seat from the outside or unloading the child safety seat from the automobile seat outside the automobile.

It is another object of the present invention to provide a child safety seat in which switching between the stroller and the auxiliary seat can be performed with simple operation so as to improve the switch operation.

It is still another object of the present invention to provide a child safety seat which substantially minimizes damage to an automobile seat when the child safety seat is placed on the automobile seat.

The characteristic features of the present invention are a child safety seat for selective use as an auxiliary seat attachable to an automobile seat and as a stroller, said child safety seat comprising a seat structure attachable on the automobile seat, said seat structure having a torso support and a back portion, a pair of front caster arms rotatably coupled to both sides of the seat structure for selectively extending downward from and retracting above a lowermost portion of the seat structure and a pair of rear caster arms rotatably coupled to both sides of the seat structure for selectively extending downward from and retracting above the lowermost portion of the seat structure, wherein the front and rear caster arms retract substantially simultaneously.

BRIEF DESCRIPTION OF THE DRAWINGS

The invention, together with objects and advantages thereof, may best be understood by reference to the following description of the presently preferred embodiments together with the accompanying drawings in which:

FIG. 30 is a schematic side view showing another embodiment of the connection structure of the front and rear caster arms in FIG. 2;

FIG. 31 is a schematic side view showing the caster arms of FIG. 30 rotated in a position where they are in close proximity to each other;

FIG. 32 is a schematic side view showing the caster arms of FIG. 31 further rotated in a folded position outside the seat structure;

FIG. 51 is a partial sectional view showing the interior structure of the connection rod, the lever arm, and the protection cover in FIG. 50;

DETAILED DESCRIPTION OF THE PREFERRED EMBODIMENTS

First Embodiment

A first embodiment of the present invention will be described below with reference to FIGS. 1 to 23.

Figure 1:
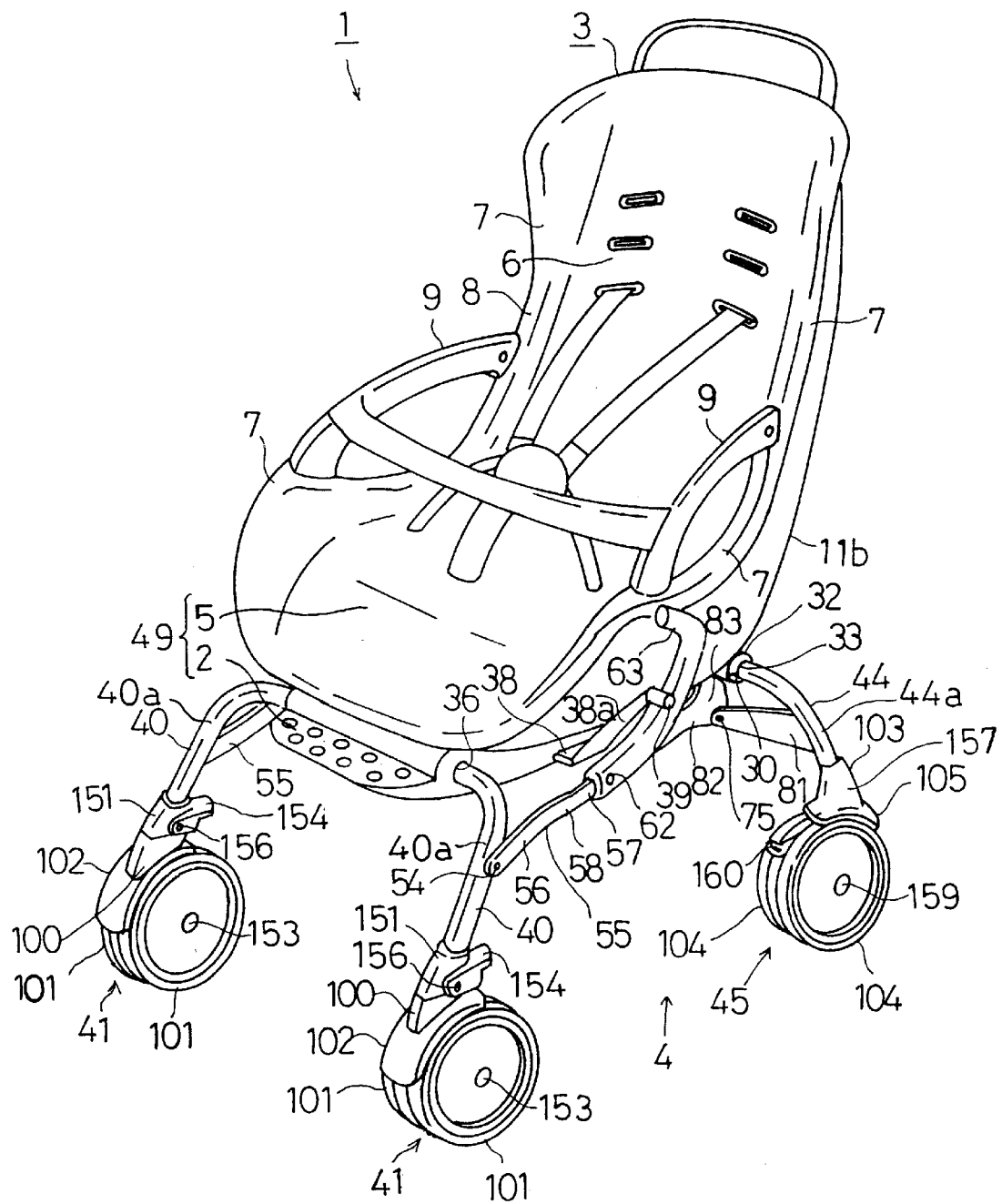
FIG. 1 is a perspective view showing a child safety seat, of a first embodiment of the present invention, used as a stroller.
Figure 2:
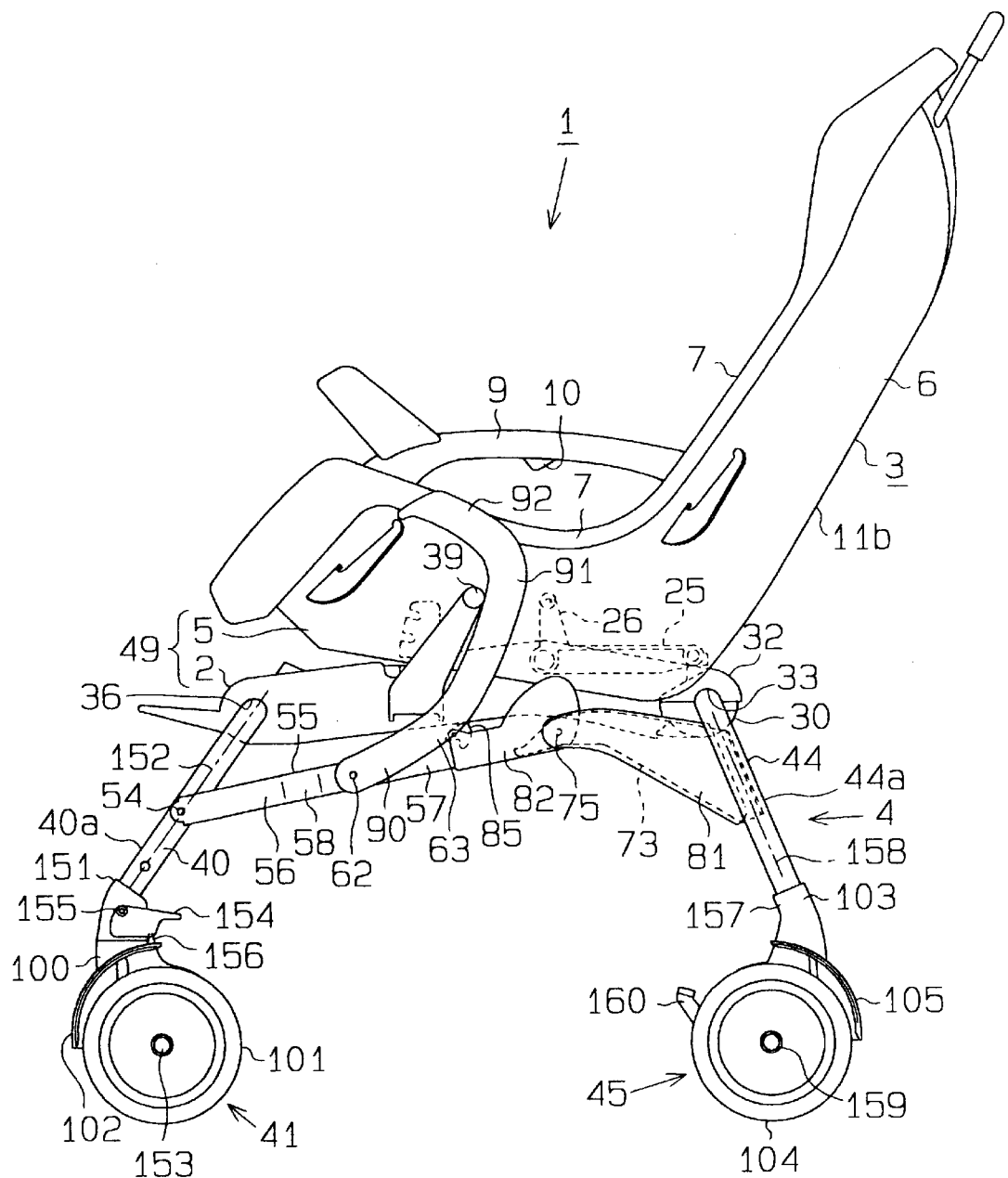
FIG. 2 is a side elevational view of the child safety seat in FIG. 1.

As shown in FIGS. 1 and 2, a child safety seat is composed of a seat structure 3 made from a synthetic resin and a leg structure 4 including a pair of front leg members and a pair of rear leg members. The seat structure 3 includes a back portion 6 and a base portion 49. The base portion 49 supports the buttocks and thighs of the child, while the back portion 6 receives and supports the back of the child. The base portion further includes a bottom frame 2 made of a synthetic resin and a torso support 5 fitted on the bottom frame 2. The torso support 5 and back portion 6 are integrally formed with a synthetic resin. The seat structure 3 further includes a side supports 7 extending upward from the side edges of the torso support 5 and forward from the back portion 6. The side supports 7 restrict the horizontal movement of the child in the seat 1. The surface of the torso support 5 and back portion 6 is covered with an elastic cloth cover 8. The seat structure 3 in certain instances of practice of the current invention still further includes casters 41, 45 and caster arms 44, 40.

As shown in FIG. 2, a pair of hollow side guards 9, also made from synthetic resin, attach to the side supports 7 and extend between the back portion 6 and the base portion 49. Each side guard 9 has a lever 10 rotatably mounted approximately midway between the back portion 6 and the base portion 49. A portion of each lever protrudes downward from the side guard 9.

Figure 4:
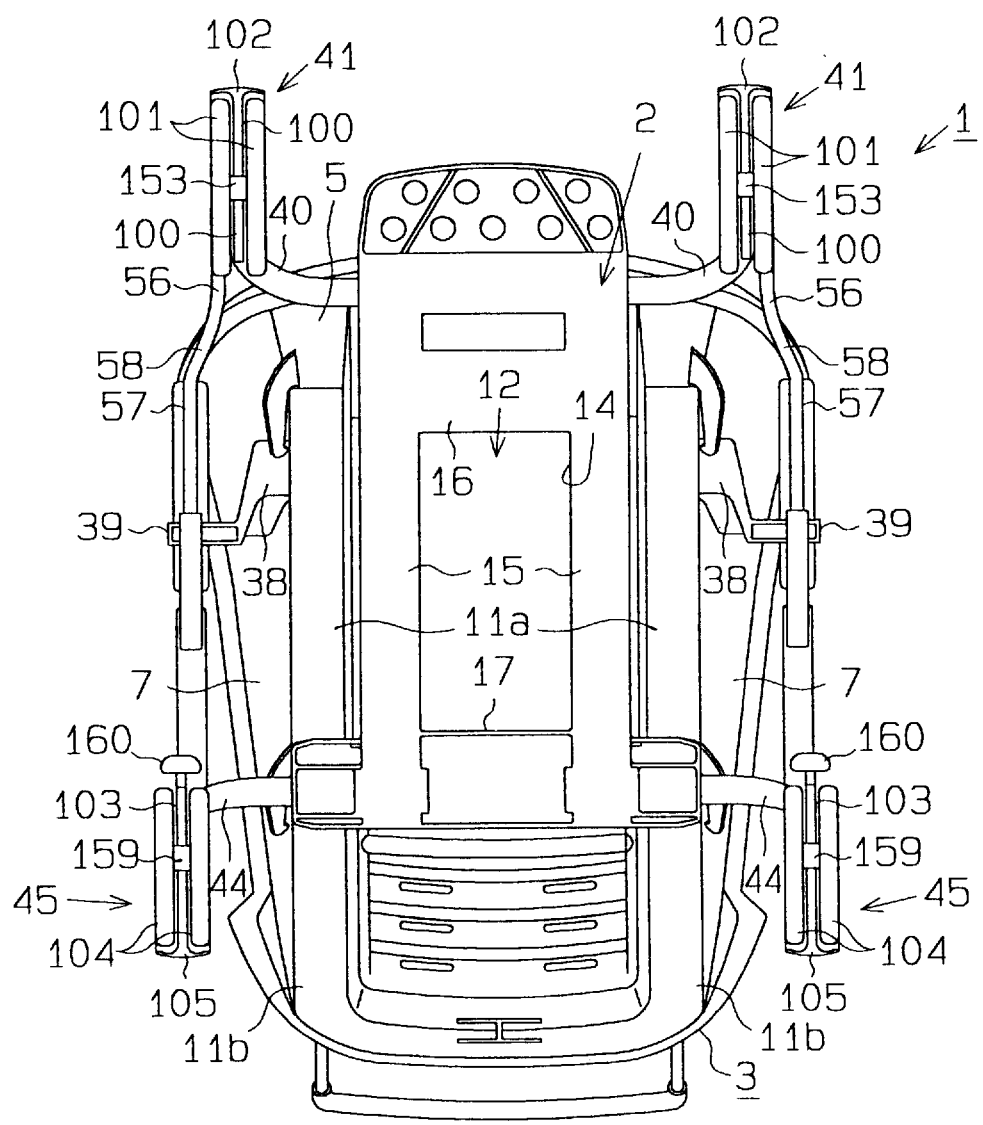
FIG. 4 is a bottom view of the child safety seat illustrated in FIG. 1.
Figure 5:
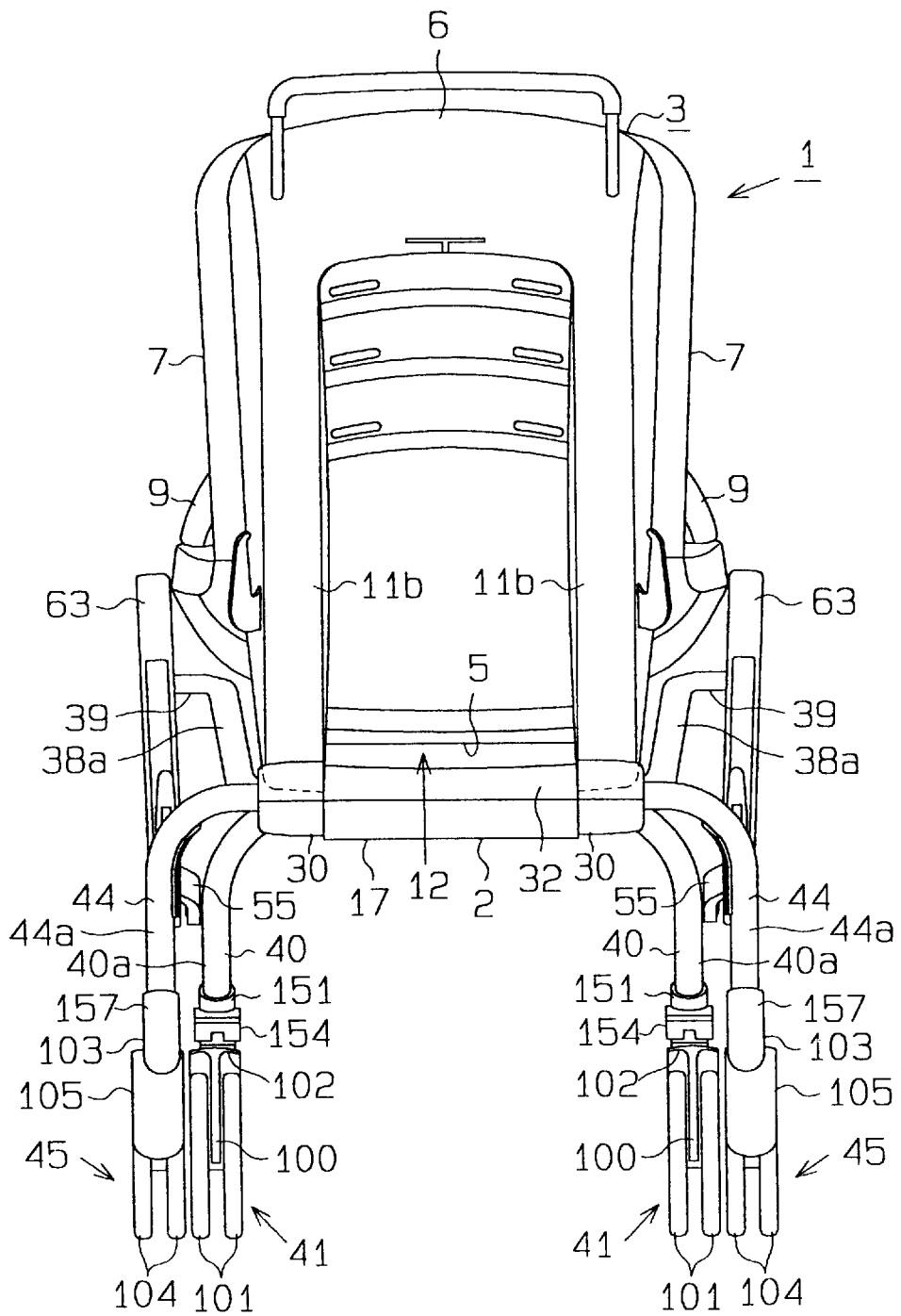
FIG. 5 is a rear view of the child safety seat illustrated in FIG. 2.

As shown in FIGS. 4 and 5, the torso support 5 is formed integrally with a first pair of spaced protrusions 11a that protrude downward from the undersurface of the torso support 5. The back portion 6 is formed integrally with a second pair of spaced protrusion 11b protruding from the rear surface of the back portion 6. The main functions of the protrusions 11a and 11b are to reinforce the torso support 5 and the back portion 6.

The above-described bottom frame 2, disposed in space 12 between the protrusions 11a, is rectangular in shape and extends from the back portion 6 to the front of safety seat 1. A rectangular opening 14 is formed in the bottom frame 2 to reduce the weight of the base portion 2. The bottom frame 2 is formed by side frame 15 on each side of the opening 14 and front frame 16 and rear frame 17 in front and rear of the opening 14. Each of the frames 15, 16, and 17 is a surface-hollowed structure in which the upper surface is open to minimize its weight.

Figure 8:
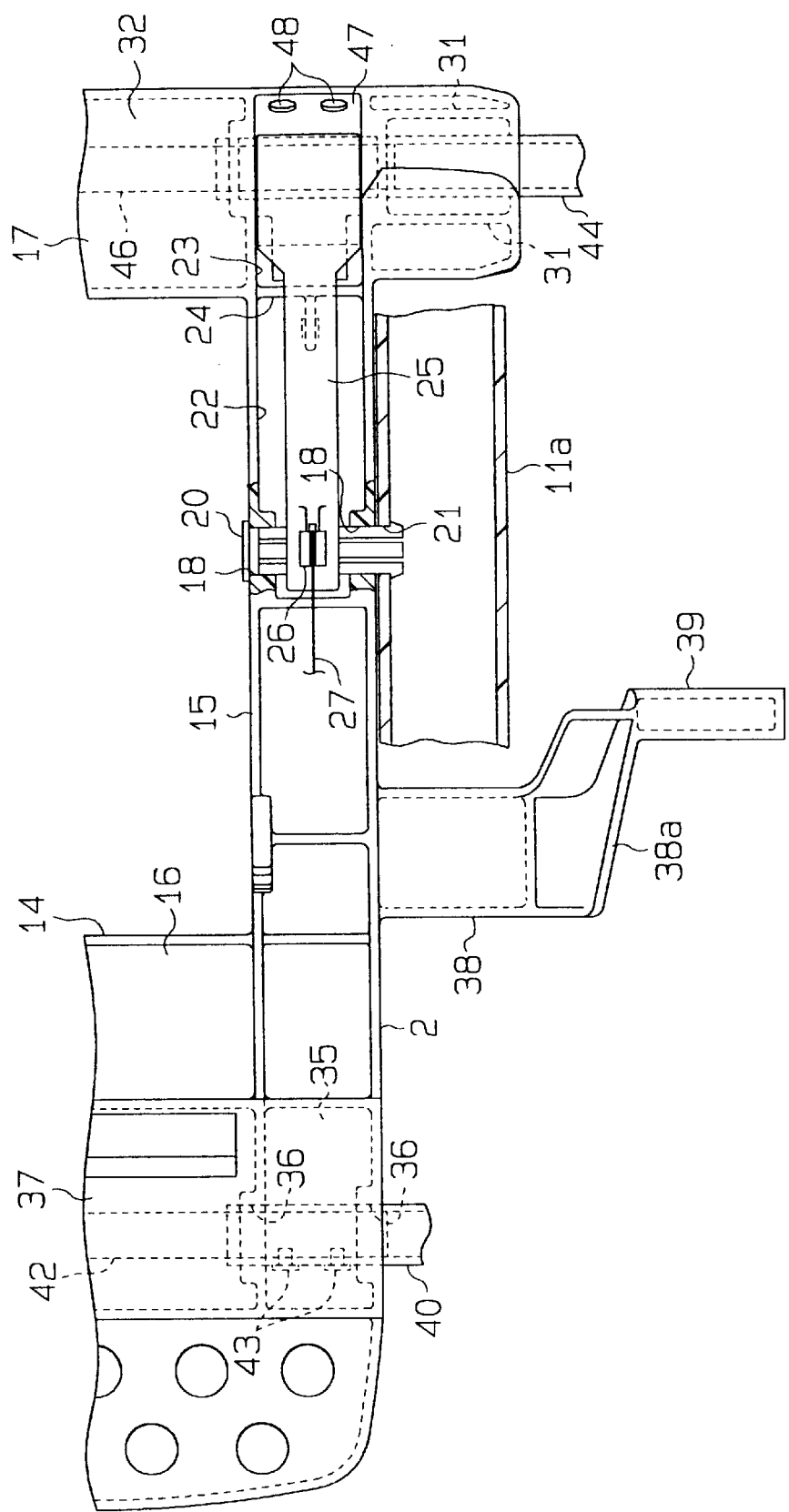
FIG. 8 is a partial plan view similar to FIG. 7, showing the front and rear caster arms covered with blind covers.

As shown in FIG. 8, a support pin 20 is inserted into a bore 18 formed on each side frame 15. Each bore 18 extends along the width of the side frame 15. In association with the bore 18, each protrusion portion 11a is formed with a counter bore 21 to receive the support pin 20. The support pin 20 is inserted from the side of the rectangular opening 14 of the bottom frame 2 into the bores 18 and 21. The main portion 5 is rotatably supported on the bottom frame 2 by means of the support pin 20.

Figure 9:
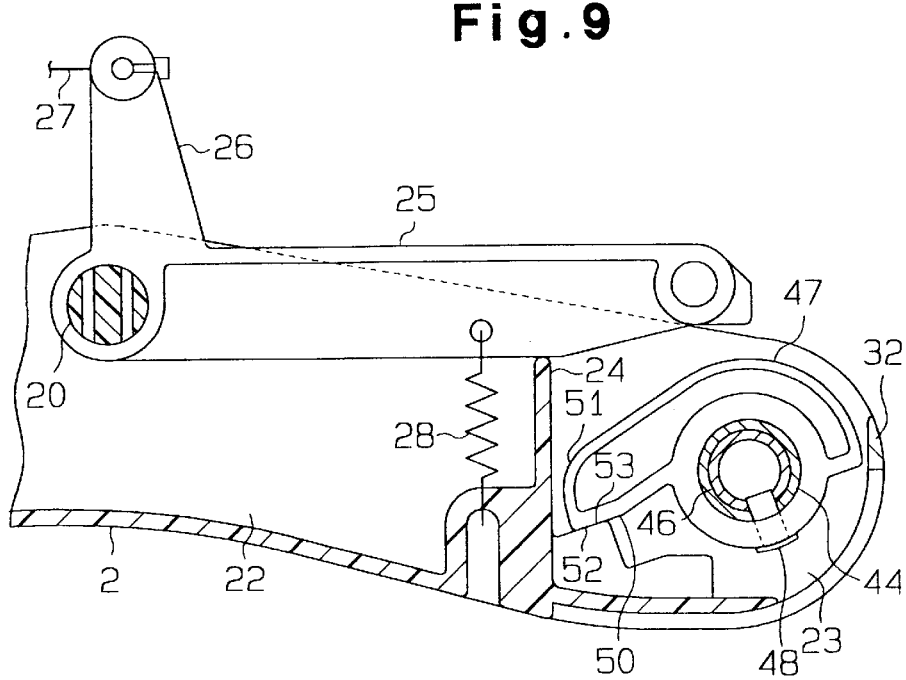
FIG. 9 is a partial side sectional view showing one side of the locking arm and the arm lock in FIG. 8.

As shown in FIGS. 8 and 9, adjacent to the rear frame 17, an accommodating portion 22 is defined by side frames 15 and a partition wall 24 and receives a locking arm 25, association with the accommodating portions 22, the rear frame 17 includes an accommodating portions 23 that receives an arm lock 47. The accommodating portions 22 and 23 are separated by a partition wall 24. The locking arms 25 is rotatable around an axis of the support pin 20. An arm lever 26 is formed integrally in the proximal end portion of the locking arm 25. The arm lever 26 and the corresponding side of the lever 10 are connected to each other by a wire 27 disposed inside the corresponding side guard 9.

The above-described locking arm 25 extends over the partition wall 24 into the accommodating portion 23 and is connected through a coil spring 28 to the bottom of the accommodating portion 22 by a coil spring 28. The locking arm 25 is always pulled in the clockwise direction (toward the partition wall 24) and rotated around the support pin 20 by means of the coil spring 28.

Figure 12:
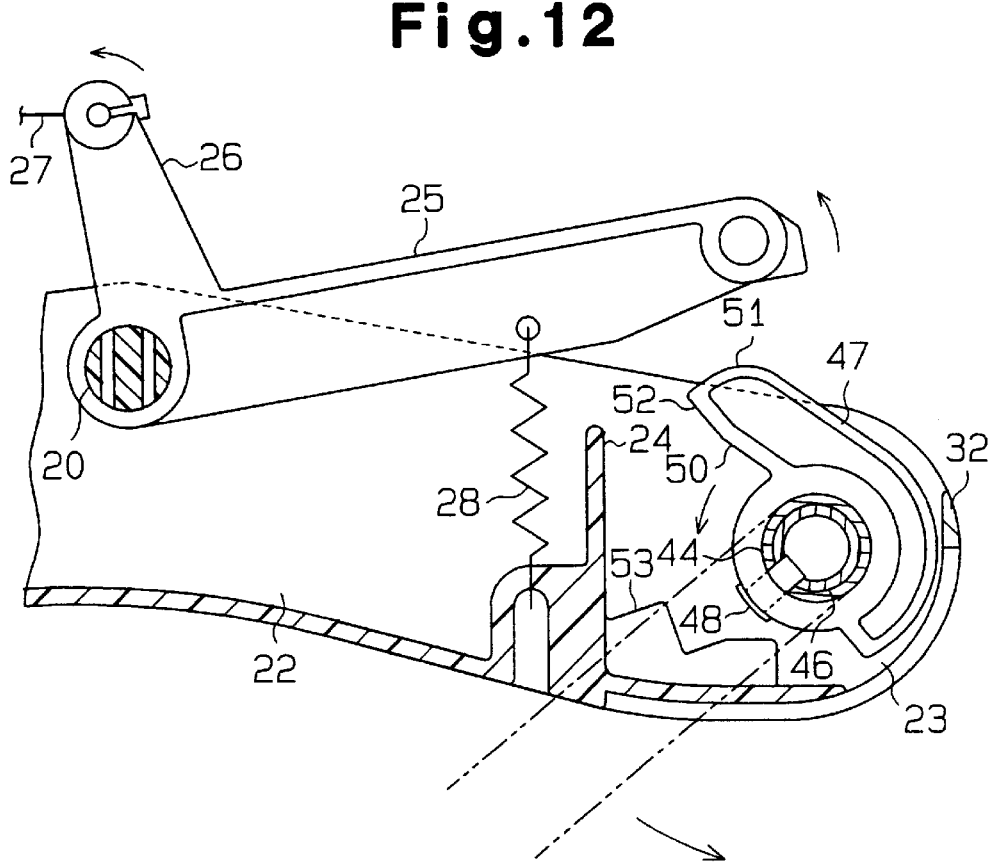
FIG. 12 is a partial sectional view illustrating how the rotation of the locking arm shown in FIG. 11 allows the rotation of the arm lock.

When an operator depresses the lever 10 into the side guard 9, the wire 27 will exert tension on the coil spring 28, as shown by the arrow in FIG. 12. Therefore, each arm lever 26 rotates counterclockwise around axis of the support pin 20 and moves away from the partition wall 24. If the operator releases his hold of the lever 10 in this state, the locking arm 25 and the arm lever 26 will be rotated clockwise around an axis of the support pin 20 by the tension of the coil spring 28, as shown in FIG. 9. Further rotation of the locking arm is restricted when the arm 25 contacts the partition wall 24.

Figure 7:
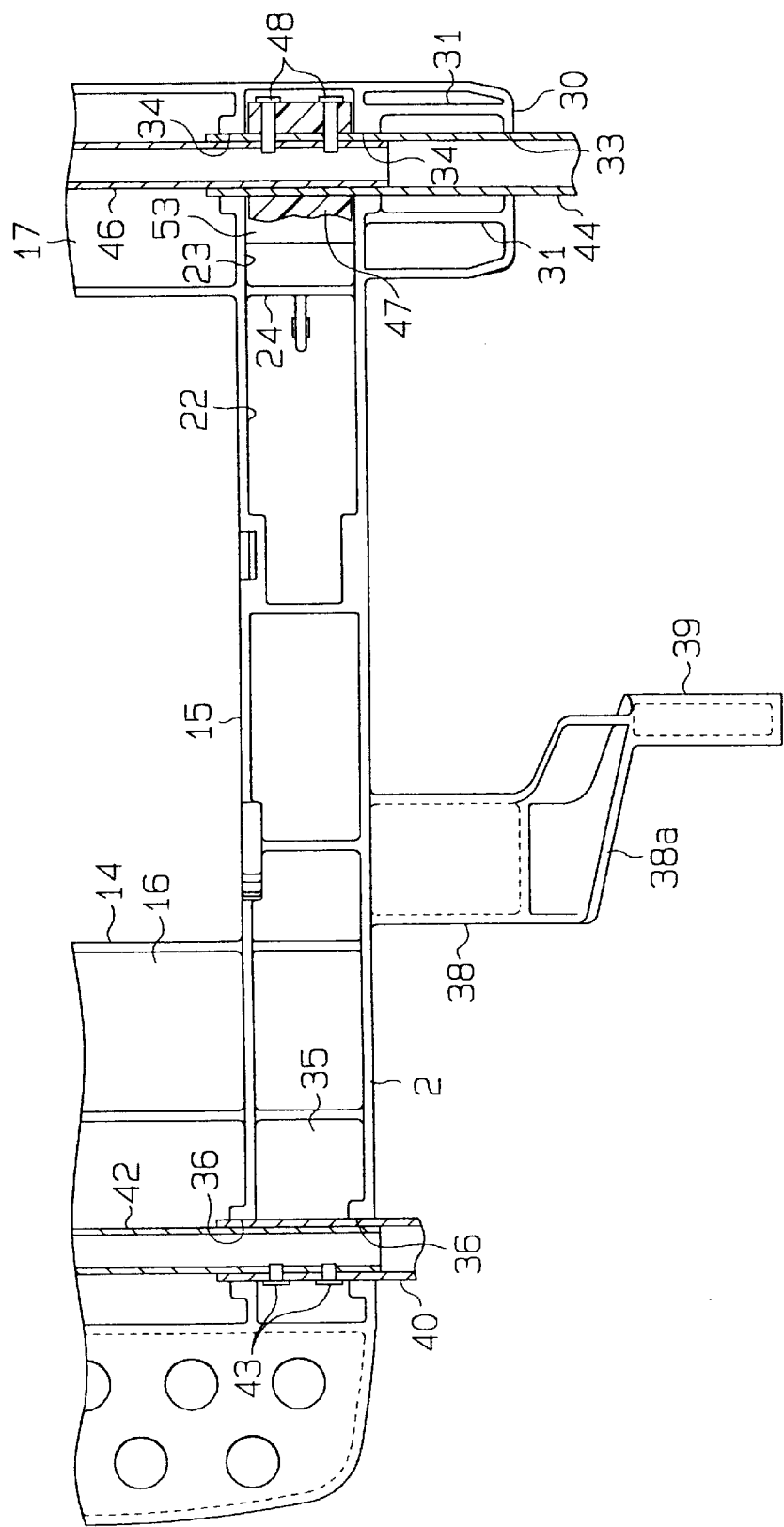
FIG. 7 is a partly horizontal sectional view showing how the front and rear caster arms in FIG. 1 are mounted to the bottom frame in FIG. 1.

As shown in FIGS. 7 and 8, a reinforcing portion 30, having a semicircular cross section, is integral with accommodating portion 23. The inner surface thereof has a plurality of reinforcing ribs 31. The reinforcing portion 30 and the portion of the rear frame 17 excluding the accommodating portion 23 are covered with a blind cover 32. The reinforcing portion 30 and the cover 32 are formed having a bore 33 into which a rear caster arm 44 is inserted. Likewise, the rear frame 17 has a bore 34 into which the rear caster arm 44 is inserted.

To minimize the weight of the bottom frame 2, concave portions 35 are formed in the opposite side portions of the front frame 16. At that portion of the bottom frame 2, corresponding to the concave portion 35, the front frame 16 is formed with a bore 36 into which a front caster arm 40 is inserted. A blind cover mounts on the front frame 16 to cover the concave portion 35.

Extending member 38 is integrally formed on the longitudinal intermediate portion of the side frame 15, and protrudes outwardly from the side frame 15. Member 38a extends obliquely and upwardly from the distal end of the extending member 38, while a cylindrical regulating pin 39, extends outwardly the upper end of the oblique member 38a. Both the extending member 38 and the regulating pin 39 are vertical to the side frame 15.

Figure 3:
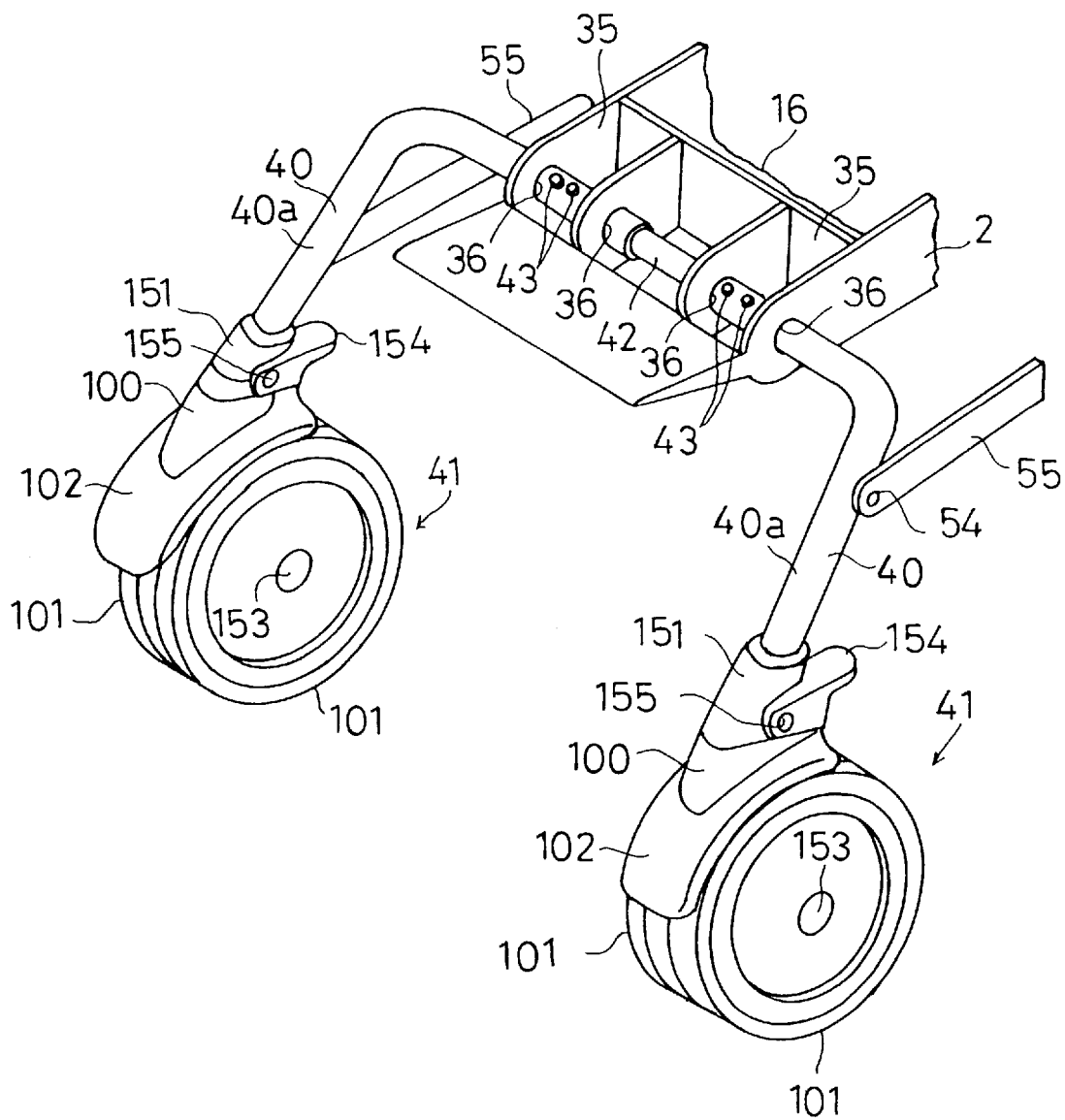
FIG. 3 is a partial perspective view showing the support structure of the caster arms in FIG. 1 to the bottom frame.

As shown in FIGS. 2, 3, and 5, the proximal ends of the front caster arms 40 are rotatably inserted into the bores 36 formed in the base portion 2. Each front caster arm or leg 40 is formed into an L shape and has a front caster 41 rotatably mounted to the distal end thereof. More particularly, a cast top 151 is a fixed to the distal end of the caster arm 40. The caster top 151 is curved from the longitudinal center axis 152 of a leg structure 40a of the caster arm 40 towards the rear caster 45 as shown in FIG. 2. The caster top 151 has a front caster bracket 100 rotably attached to the lower end thereof with a protection cover 102. A caster axle 153 having a pair of front wheels 101 and 101 on the opposite ends thereof is rotatably attached to the caster bracket 100. Since the caster top 151 is positioned rearward the center axis 152 of the caster arm 40, the caster axle 153 is offset to the rear of the center axis 152.

A locking arm 154 is rotatably attached through a support shaft 155 to the caster top 151. A projection 156 as shown in FIG. 2 is formed integrally on the top portion of the caster bracket 100. If the locking arm 154 is brought into contact with the projection 156, the rotation of the front wheel 101 will be restricted.

As shown in FIGS. 3 and 7, an end of an auxiliary pipe 42, extending outwardly through the base portion 2, is inserted into a corresponding proximal end portion of the caster arms 40. The length of the auxiliary pipe 42 is almost equal to the width of the front frame 16 of the base portion 2. The caster arms 40 and the auxiliary pipe 42 are joined together in the concave portions 35 by means of a pair of rivets 43. In this way, a pair of right and left caster arms 40 is rotatable as a single unit. The distance between the pair of right and left leg portions 40a of the caster arms 40 is wider than the width of the base portion 2. The front caster arms 40, the front casters 41, the auxiliary pipe 42, and the rivets define a front leg member.

Figure 6:
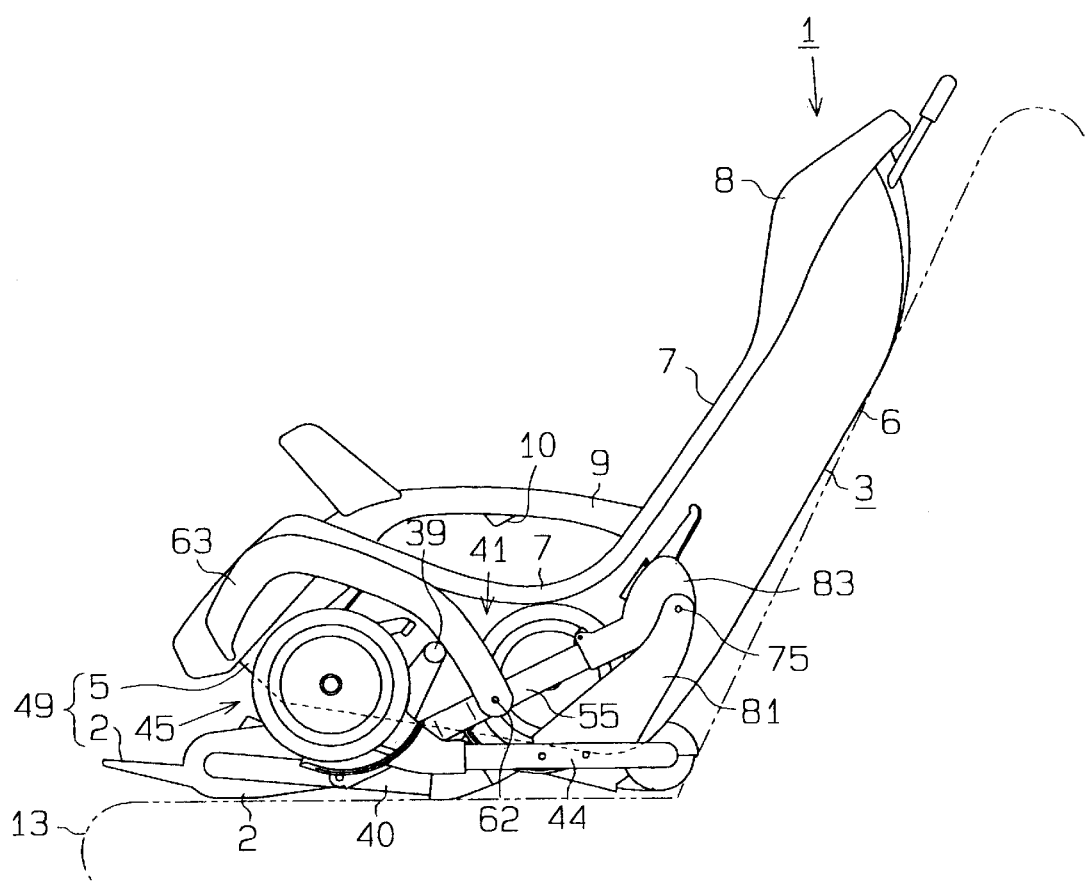
FIG. 6 is a side view of the child safety seat of FIG. 1 used as an auxiliary automobile seat.

The front leg member can selectively be manipulated between a first secured folded position in which the member is retracted outside the seat structure 3, up from the bottom frame 2 and a second traveling position in which the member projects downward from the seat structure 3 as respectively shown in FIG. 6 and FIG. 3.

As shown in FIGS. 2, 5, and 7, the proximal end of each rear caster arms on legs 44 is rotatably inserted into the bores 33 and 34 formed in the base portion 2. Each rear caster arm 44 is formed into an L shape and carries a rear caster 45 at the distal end thereof. More particularly, a caster bracket 103 having a protection cover 105 is fixedly connected to the distal end of the caster arm 44. A distal end of the caster bracket 103 is curved from the longitudinal center axis 158 of a leg portion 44a of the caster arm 44 towards the front caster 41 as shown in FIG. 2. The caster bracket 103 has rotatably attached thereto a caster axle 159 which carries a pair of rear wheels 104 on the opposite ends thereof. Since the caster top 157 is curved forward from the center axis 158 of the caster arm 44, the caster axle 159 is also offseted forward the center axis 158. Further, the distance between a pair of right and left rear casters 45 is wider than that between the front casters 41 and 41, as shown FIG. 4.

A forwardly extending operation lever 160 is disposed between the rear wheels 104. When the extending operation lever 160 is pressed down, the rotation of the rear wheels 104 is locked.

As shown in FIG. 7, each end of an auxiliary pipe 46 extending outwardly at the bottom frame 2 is inserted into the proximal end portion of the rear caster arm 44. The length of the auxiliary pipe 46 is almost equal to the width of the rear frame 17 of the bottom frame 2. A rear arm lock 47 is fitted in the outer peripheral surface of the proximal end portion of the caster arm 44. The caster arm 44, the auxiliary pipe 46, and the arm lock 47 are joined together in the accommodating portion 23 by a pair of rivets 43. Therefore, the caster arms 44, the arm locks 47 and the auxiliary pipe 46 rotate as one unit. As shown in FIG. 5, the distance between the leg portions 44a of the rear caster arms 44 is wider than the width of the bottom frame 2 or the distance between the leg portions 40a of the front caster arms 40. For this reason, the rear caster 45, in contrast to the front caster 41, projects substantially outward from each side of the bottom frame 2. The rear caster arms 44, the rear casters 45, the auxiliary pipe 46 and the rivets 48 define a rear leg member.

The rear leg member can be selectively switched between a retracted or folded position and a traveling position. In the folded position, the rear leg member is folded outside the seat structure 3 and above of the lowermost surface of the seat portion 49 and a traveling position in which the member projects downward from the seat structure 3 as respectively shown in FIG. 6 and FIG. 2.

Figure 10:
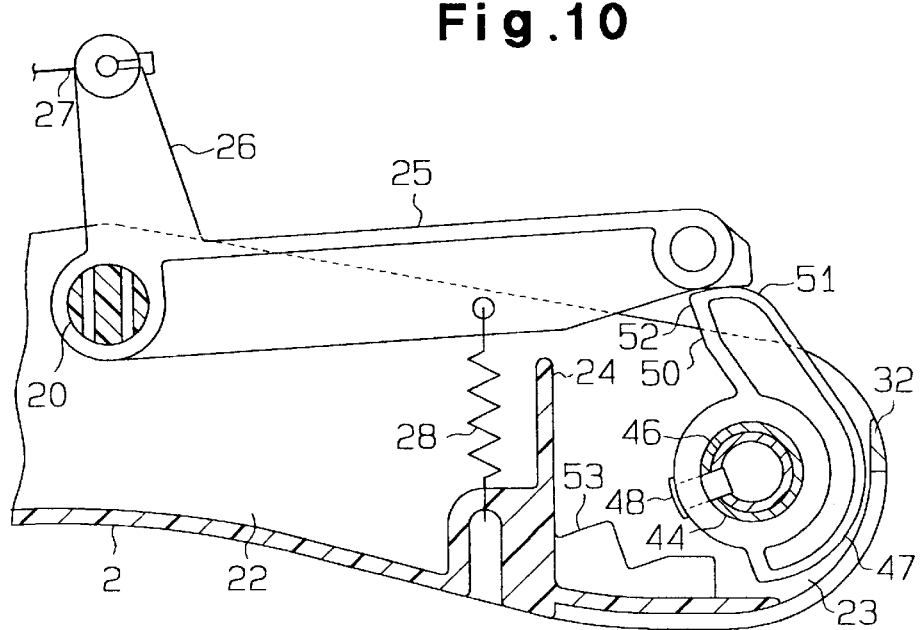
FIG. 10 is a partial sectional view illustrating how the arm lock in FIG. 8 elevates the locking arm in FIG. 8.

As shown in FIGS. 9 and 10, each of the above-described arm locks 47 is integrally formed with an elongated portion 50 and has continuous with an arcuate protruding surface 51 continuous with a straight engagement surface 52. When the caster arm 44 is rotated clockwise, the protruding surface 51 will be brought into contact with the distal end of the locking arm 25. When the caster arm 44 is further rotated, the distal end of the locking arm 25 will be elevated by the elongate portion 50, while resisting the tension of the coil spring 28, as shown in FIG. 10.

Figure 11:
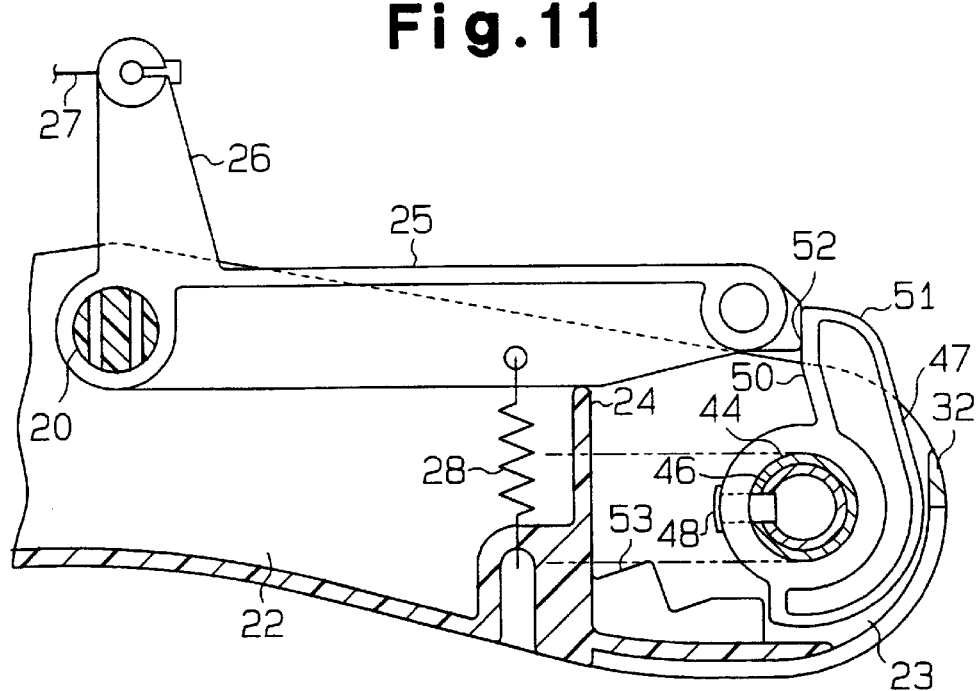
FIG. 11 is a partial sectional view illustrating how the arm lock of FIG. 10 disengages from the locking arm.

As shown in FIG. 11, if the caster arm 44 is further rotated clockwise and the protruding surface 51 is disengaged from the locking arm 25, the coil spring 28 will retract the locking arm so that the locking arm 25 contacts the partition wall 24. This restarts the counterclockwise rotation of the arm lock 47.

As shown in FIG. 11, if the wire 27 pulls the arm lever 26, the locking arm 25 is rotated counterclockwise to move away from the partition wall 24, the arm lock 47 will be disengage from the locking arm 25. Consequently, it becomes possible to rotate the arm lock 47 and the caster arm 44 in the counterclockwise direction.

However, the above-described accommodating portion 23 contains a regulating surface 53. When the locking arm 25 pivots away from the elongated portion 50 so as to allow the rotation of the caster lock 47, the counterclockwise rotations of the arm lock 47 are restricted by the contact of the surface 52 with the regulating surface 53. The arm lock 47 and the accommodating portion 23 also prevent the caster arm 44 from moving along on axis of the width of the bottom frame 2.

A preferred embodiment of the child safety seat 1 according to the current invention is employed as a stroller or automobile auxiliary seat. When the child safety seat 1 is employed as a stroller, the front casters 41 and rear casters 45 are positioned under the bottom frame 2, as shown in FIGS. 1 and 2. On the other hand, when the child safety seat 1 is employed as an automobile auxiliary seat, the front and rear casters 41 and 45 are retracted and folded above the lowermost surface of the bottom frame 2, as shown in FIG. 6. To change between a stroller and auxiliary automobile seat, a linking mechanism is used.

Figure 13:
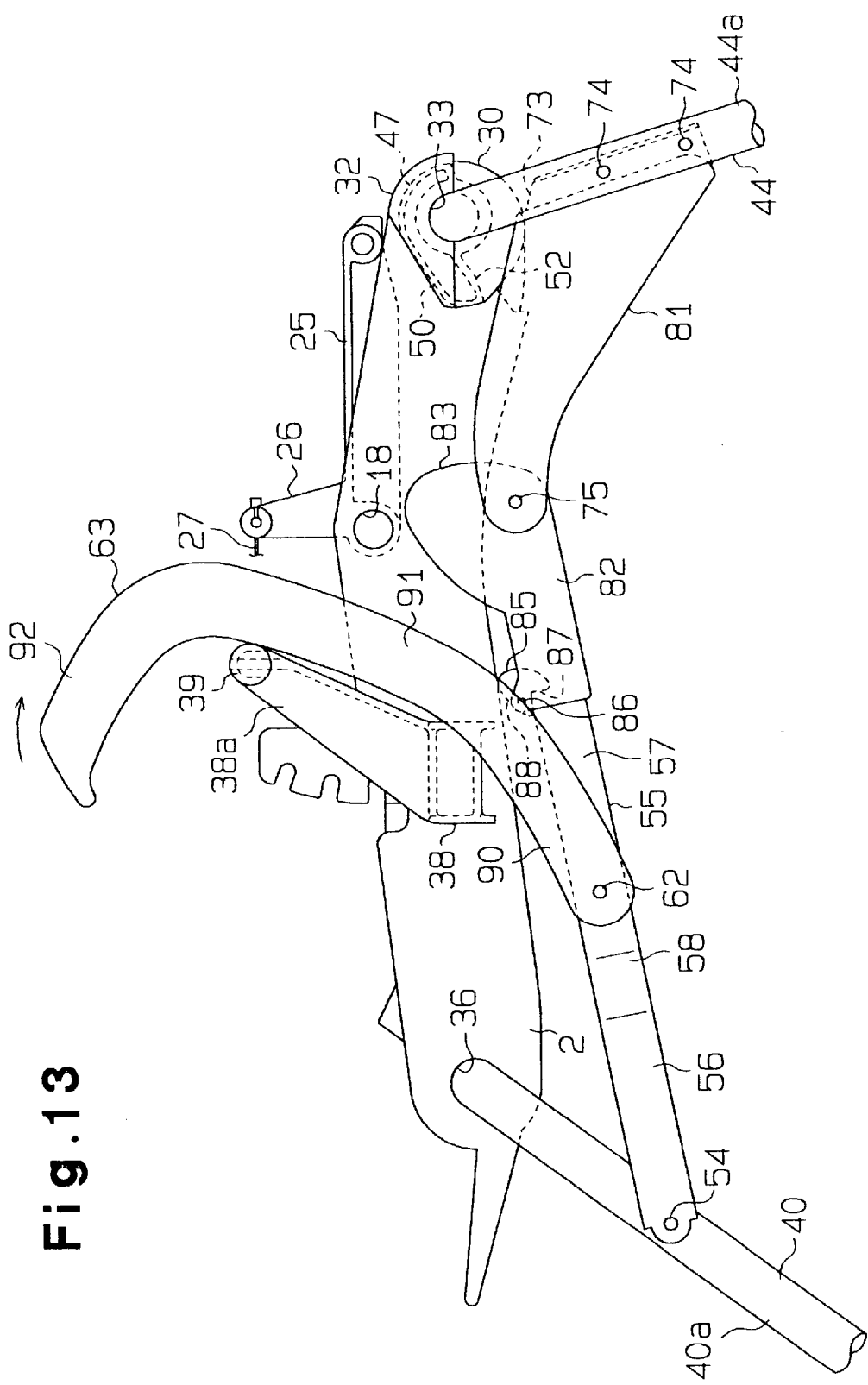
FIG. 13 is a partial sectional view showing the bottom frame, the front and rear caster arms, and the peripheral members in FIG. 2.
Figure 16:
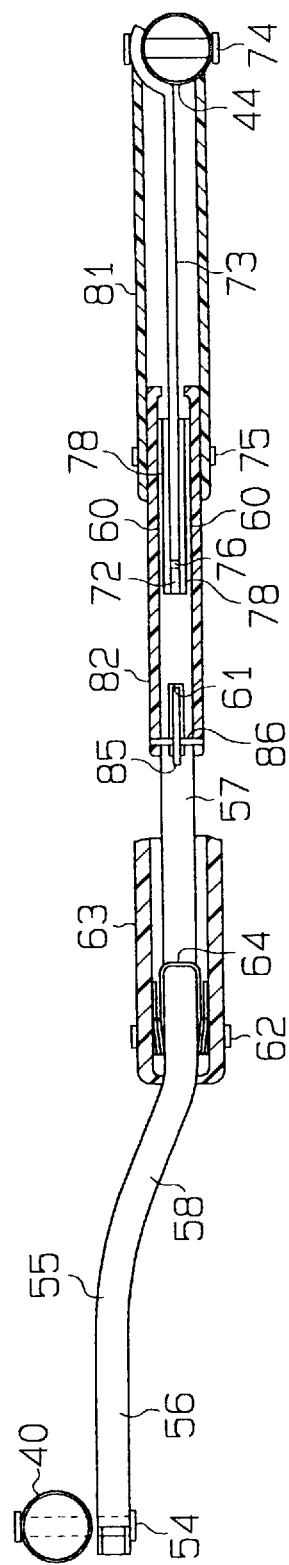
FIG. 16 is a partial sectional view showing the connecting structure between the connection rod and the locking member in FIG. 14.

The linking mechanism will now be described. As shown in FIGS. 13 and 16, the proximal end portion of the connection rod 55 as a front connection member is rotatably attached to the front caster arm 40 by means of a swivel pin 54. The connection rod 55 is made of a hollow square aluminum alloy. As shown in FIG. 16, the connection rod 55 is formed with an oblique portion 58 and opposite end straight portions 56 and 57. As shown in FIG. 4, the straight portions 56 and 57 are parallel to the above-described projection portion 11a and the portion 58 extends obliquely with respect to the projection portion 11a. As shown in FIG. 2, the connection rod 55 extends obliquely upward so that the distal end thereof is closer to the seat portion 5 than the proximal end.

As shown in FIG. 16, a pair of support plates 60 extending parallel to each other are formed on the distal end portion of the straight portion 57, and a rectangular window portion 61 is formed in the longitudinal intermediate portion of the straight portion 57. The proximal end portion of a lever arm 63 is rotatably attached to the straight portion 57 by means of a support pin 62.

Figure 17:
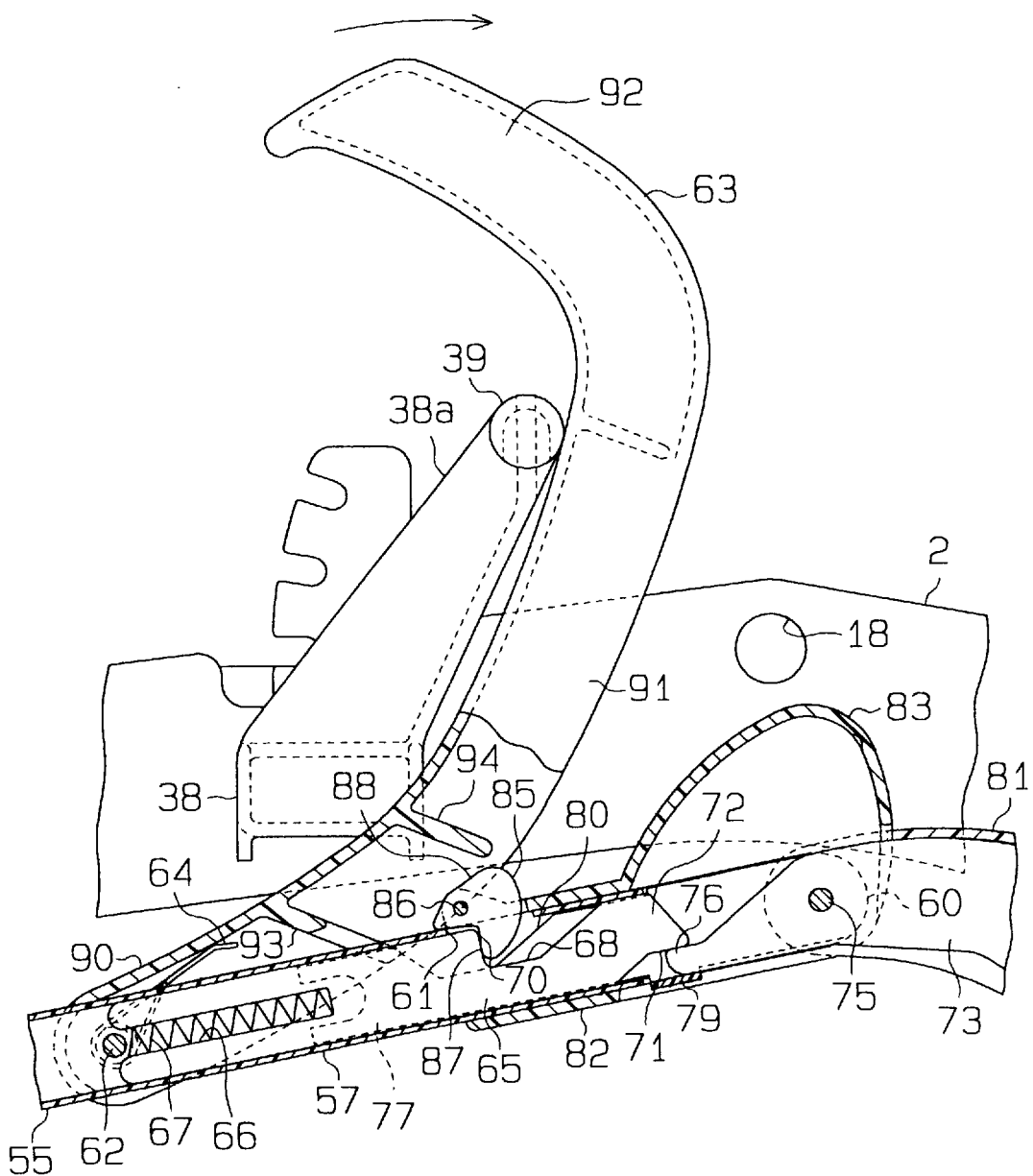
FIG. 17 is an enlarged sectional view showing the essential parts of FIG. 14.

As shown in FIG. 17, a handle spring 64 is mounted on the support pin 62 and urges the lever arm 63 in a counter-clockwise direction. Since the lever arm 63 is brought into contact with the above-described regulating pin 39 by this urging force, further rotation of the arm 63 will be restricted. In this locked state, the lever arm 63 is positioned at approximately middle point in a longitudinal axis of the seat portion 5, as shown in FIG. 2. Thus, regulating pin 39 and the handle spring 64 hold the lever arm 63 at a predetermined position.

Figure 15:
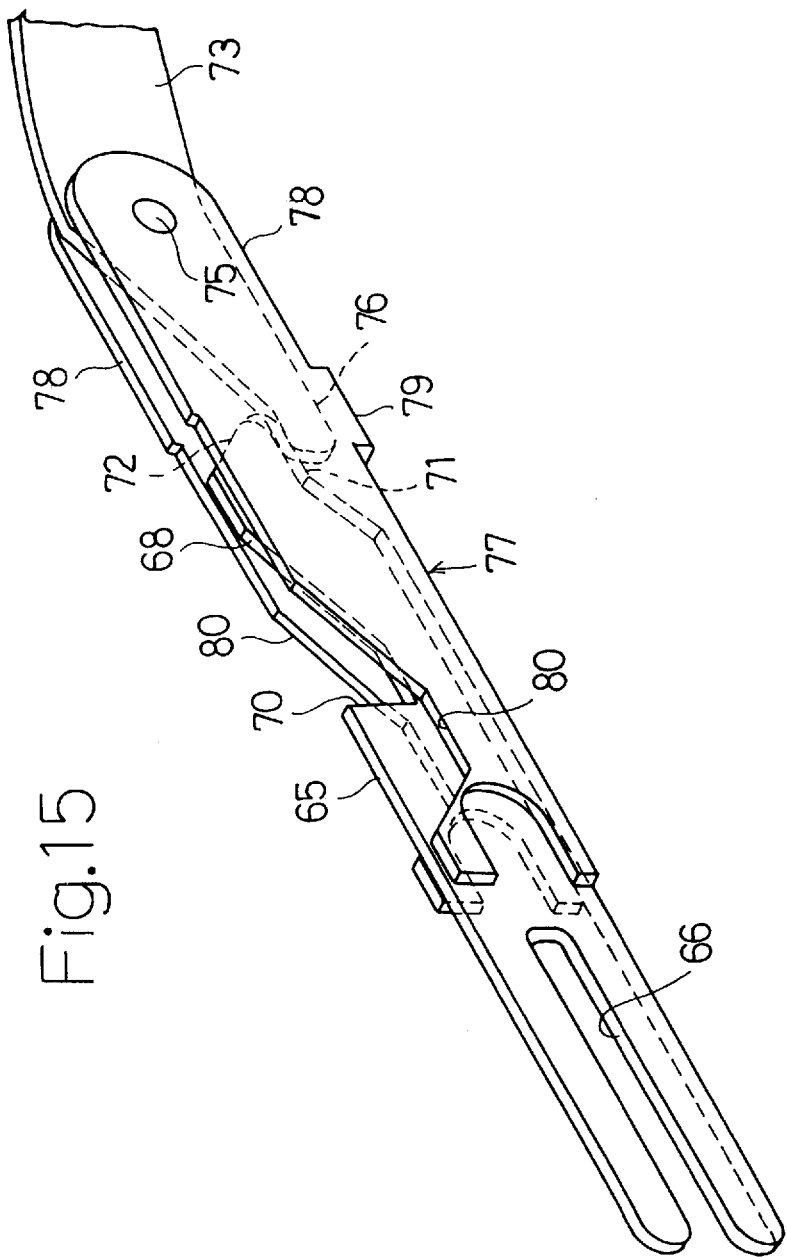
FIG. 15 is a partial perspective view showing the slide member, the reinforcing member, and the locking member in FIG. 14.

As shown in FIGS. 15 and 17, a metallic sliding member 65 made from stainless steel, iron or the like is slidably disposed within the straight portion 57. A guide groove 66 located at the front end of the sliding member 65, extends rearward from the front end. The support pin 62 is inserted into the guide groove 66. A compressed spring 67 is disposed in the guide groove 66 and held therein by the support pin 62 for urging the sliding member 65 toward the distal end of the connection rod 55.

The sliding member 65 is formed with a first notch 68 at the upper portion thereof and a second notch 71 at the rear end lower portion. When the sliding member 65 slides towards the support pin 62, the notch 68 opposes the above-described window portion 61. The notch 68 has a pressing surface 70 perpendicular to the longitudinal direction of the sliding member 65. The rear end upper portion of the sliding member 65 includes a depressed sloping portion 72.

On the other hand, as shown in FIG. 13, the proximal end portion of a locking member 73 made from stainless steel, iron or the like is fixedly mounted on the rear caster arm 44 by means of a pair of rivets 74. Both the locking member 73 and the connection rod 55 form connecting means which links the front caster arm 46 and rear caster arm 44 so as to facilitate transition between the retracted position and the extended position.

As shown in FIG. 16, the distal end portion of the locking member 73 is rotatably connected by a connection pin 75 between the support plates 60. A projection 76, engaging the notch 71, is formed at the distal end of locking member 73.

Further, as shown in FIGS. 15 to 17, a metallic (iron) reinforcing member 77 is disposed within the straight portion 57 but a portion of the outer surfaces of the sliding member 65 as well as a portion of the outer surfaces of the locking member 73. The reinforcing member 77 comprises a pair of side plates spaced in parallel 76 and a connection plate 79 connecting the lower portions of the side plates 78. The reinforcing member 77 is connected near the distal end of the locking member 73 by means of the above-described connection pin 75. The connection plate 79 is positioned in the proximal end portions of the support plates 60 and blocking the further rotation of the locking member 73 by contacting the above-described protrusion 76. The spring 67, the notch 71, the protrusion 76 and the connection plate 79 define means for holding the front arm caster arms 40, the front wheels 101, the rear caster arms 44, and the rear wheels 104 in the extended position.

Each side plate 78 is formed at the upper surface thereof with a notch 80 formed in the shape of an inverted trapezoidal. When the sliding member 65 slides to expose the pressing surface 70 for engagement at the notches 80, the notch 71 engages the protrusion 76. Thus, the front caster arm 40 and rear caster arm 44 are operatively connected through the connection rod 55 and the locking member 73. Assume now that the distance between the front casters 41 is the same as that between the rear casters 45. Assume further that the connection rod 55 is a straight line with the locking member 73. In this case, since the caster arms 40 and 44 are rotated to be close to each other, the front and rear casters 41 and 45 interfere with each other when the child safety seat 1 is switched to the auxiliary seat. In a preferred embodiment according to the current invention, however, the distance between the rear casters 45 is wider than that between the front casters 41 or that between the right and left oblique portions 58. This difference in distance between the above-described structure is maintained by the oblique portion 58, and prevents interference between the casters 41 and 45.

When the protrusion 76 is locked in between the notch 71 and the connection plate 79, the connection rod 55 and the locking member 73 cannot rotate on the connection pin 75.

Figure 14:
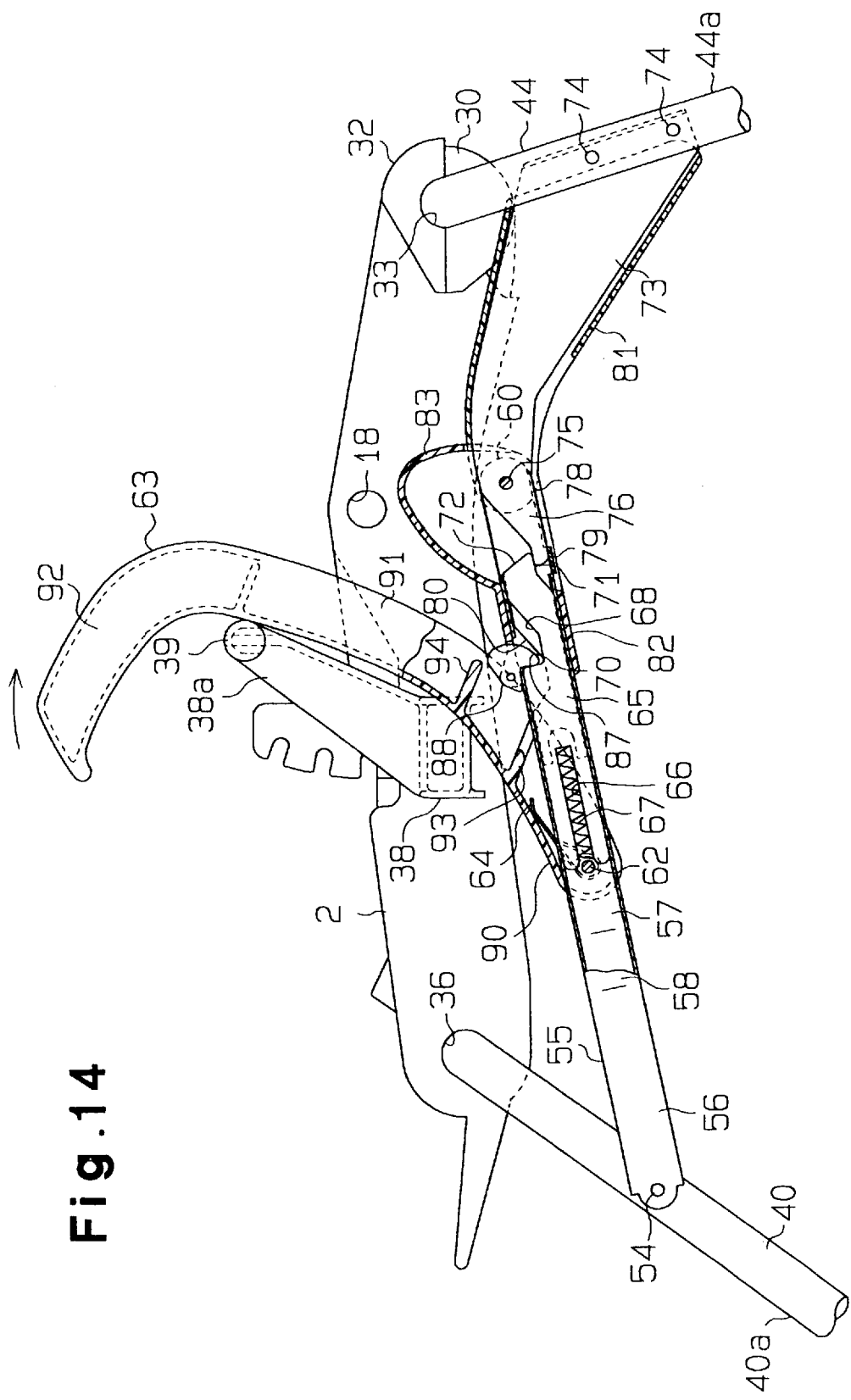
FIG. 14 is a partial sectional view showing the connection structure of the connection rod, the lever arm, and the locking member in FIG. 13.
Figure 19:
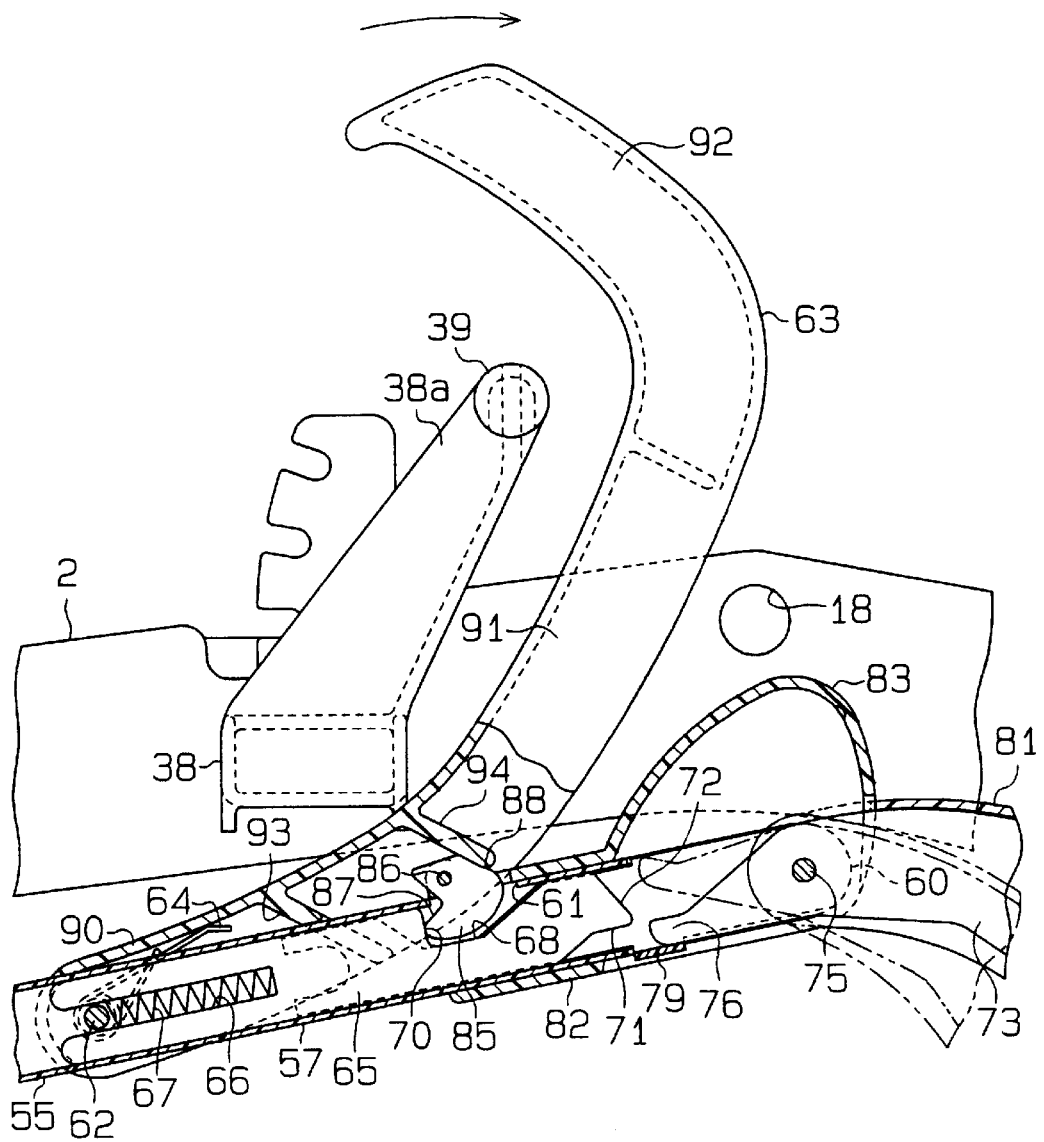
FIG. 19 is an enlarged side sectional view showing the essential parts of FIG. 18.

As shown in FIG. 14, the distal end portions of the straight portion 57 and the locking member 73 are covered by a first projection cover 82 which is made of a synthetic resin. Further, almost the whole portion of the locking member 73 is covered with a second protection cover 81 also made of a synthetic resin. The first protection cover 82 has a bulged portion 83 to allow the locking member 73 to rotate on the connection pin 75. Further, as shown in FIG. 19, a lock release 85 has a concave engagement portion 87 and a slide surface 88 is rotatably supported in the vicinity of the protection cover 82 by means of a release axle 86. A part of the lock release 85 is inserted through the above-described window portion 61 into the straight portion 57 and positioned within the notch 68. The concave engagement portion 87 of the lock release 85 is in engagement with the pressing surface 70 of the notch 68. The counterclockwise rotation of the lock release 85 is restricted by the upper surface of the straight portion 57, as shown in FIG. 17. The lock release 85 releases the caster arms 40, 44, the front wheels 101, and the rear wheels 104 from being held in an extended traveling position. Therefore, when the lever arm 63 contacts the regulating pin 39, the sliding member 65 moves toward the distal end portion of the connection rod 55 due to force caused by spring 67. The pressing surface 70 pushes the concave engagement portion 87 and rotates the lock release 85 counterclockwise. The rotation of the lock release 85 is stopped when it contacts the upper surface of the straight portion 57. This restricts further movement of the sliding member 65. Force caused by the spring 67 urges the sliding member 65 to come out of the straight portion 57.

The above-described lever arm 63 has a proximal portion 90, an intermediate portion 91, and a grip portion 92 and is curved so that the intermediate portion 91 projects rearward. The cross section of the lever arm 63 is formed in a U shape to reduce its weight. The lever arm 63 is rotatably supported at the proximal portion 90 on the straight portion 57 by means of the support pin 62.

A rotation regulating portion 93 is located in the central interior of the proximal portion 90 of the lever arm 63. In the interior of the proximal portion 90, a protrusion 94 is formed at a predetermined position apart from the rotation regulating portion 93. This protrusion 94 depresses the slide surface 88 of the lock release 85.

Figure 18:
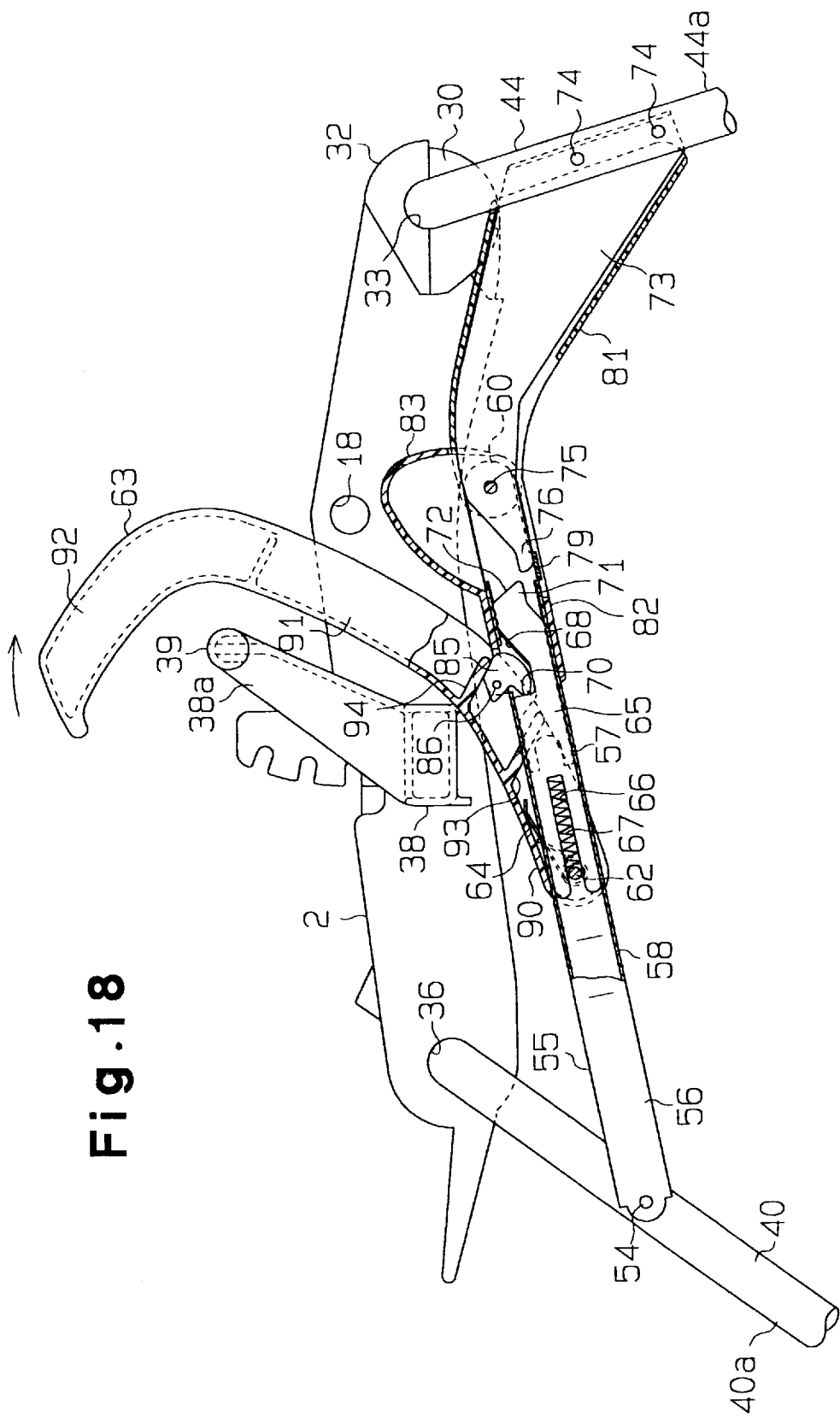
FIG. 18 is a partial sectional view illustrating the rearward rotation of the lever arm shown in FIG. 14 and how the sliding member disengages from the locking member.

Accordingly, when an operator rotates the lever arm 63 rearward from the position where the lever arm 63 contacts the regulating pin 39, the regulating portion 93 will contact the upper surface of the connection rod 55, as shown in FIGS. 18 and 19. This restricts further rotation of the lever arm 63. Concurrently, as the lever arm 63 is rotated, the protrusion 94 slides on the slide surface 88 of the lock release 85, while pressing the surface 88. The lock release 85 therefore rotates clockwise on the release axle 86. Then, the concave engagement portion 87 presses the pressing surface 70 of the sliding member 65, while resisting the urging force of the spring 67. This pushing causes the sliding member 65 to move within the straight portion 57 toward the proximal end portion of the connection rod 55. This movement causes the notch 71 to disengage from the protrusion 76 of the locking member 73.

If in this state the operator grips the lever arm 63 to lift the child safety seat, the lever arm 63 together with the connection rod 55 will undergo a rearward and upward movement with respect to the bottom frame 2. When the connection rod 55 moves in this manner, the front caster arm 40 rotates counterclockwise, and as shown in FIG. 6, the caster 41 is sandwiched in between the second protection 81 cover containing the locking member 73 and the lateral supports 7. The front caster arm 40 and the front caster 41 are covered by the lateral supports 7, the connection rod 55, and the second protection cover 81. In this folded condition, the caster 41 is held above the bottom frame 2 and does not extend beyond the lowermost surface of the bottom frame 2.

As the connection rod 55 is moved upwardly, the locking member 73 is also lifted to rotate the caster arm 44 clockwise. The arm lock 47 within the accommodating portion 23 together with the rear caster arm 44 is rotated clockwise, and as shown in FIG. 10, the elongated portion 50 elevates the distal end of the locking arm 25 and resists the tension of the coil spring 28. The locking arm 25 rotates counterclockwise on the support pin 20. When the locking arm 25 is rotated to a predetermined angle to allow the rear caster arm 44 to also rotate to the predetermined angle, the rear caster 45 will be positioned above the lowermost surface of the bottom frame 2 and laterally outside the straight portion 56 of the connection rod 55, as shown in FIG. 6. Further, at this position, the protrusion 76 of the locking member 73 enters the bulged portion 83 as shown in FIG. 20.

When the locking arm 25 is rotated to a maximum predetermined angle, the elongated portion 50 of the arm lock 47 will be disengaged from the distal end of the locking arm 25, as shown in FIG. 11. The locking arm 25 will rotate clockwise on the support pin 20, due to the urging force of the coil spring 28, and will contact with the partition wall 24. The contact surface 52 of the elongated portion 50 engages the distal end of the locking arm 25 so the counterclockwise rotation of the arm lock 47 is restricted. This restricts the rotation of the rear caster arm 44 so as to prevent the caster 45 from any sudden projection below the undersurface of the bottom frame 2.

Thus, when the child safety seat 1 is converted from a stroller to an auxiliary automobile seat, the casters 41 and 45 are retracted outside the lateral supports 7 without projecting from the lowermost surface of the bottom frame 2. In switching the child safety seat 1 to the auxiliary seat, the casters 41 and 45 do not interfere with the straight portions 56 and 57 due to the oblique design of portion 58 of the connection rod 55. Therefore, the caster 45 is retracted outside the straight portion 56, while the caster 41 is folded inside the straight portion 57.

Figure 20:
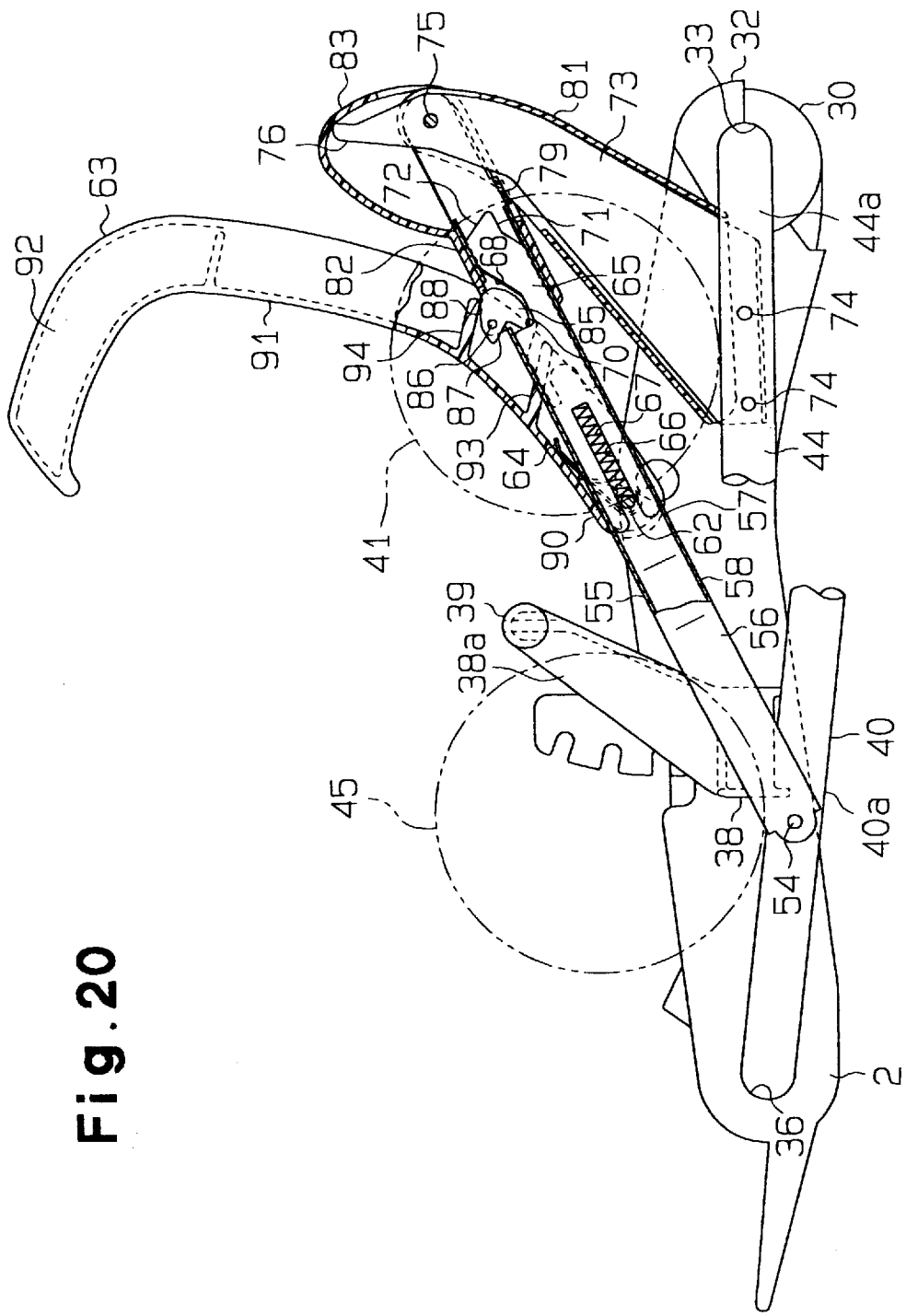
FIG. 20 is a partial sectional view illustrating the elevation of the lever arm shown in FIG. 18 and how both caster arms rotate in close proximity toward each other.
Figure 21:
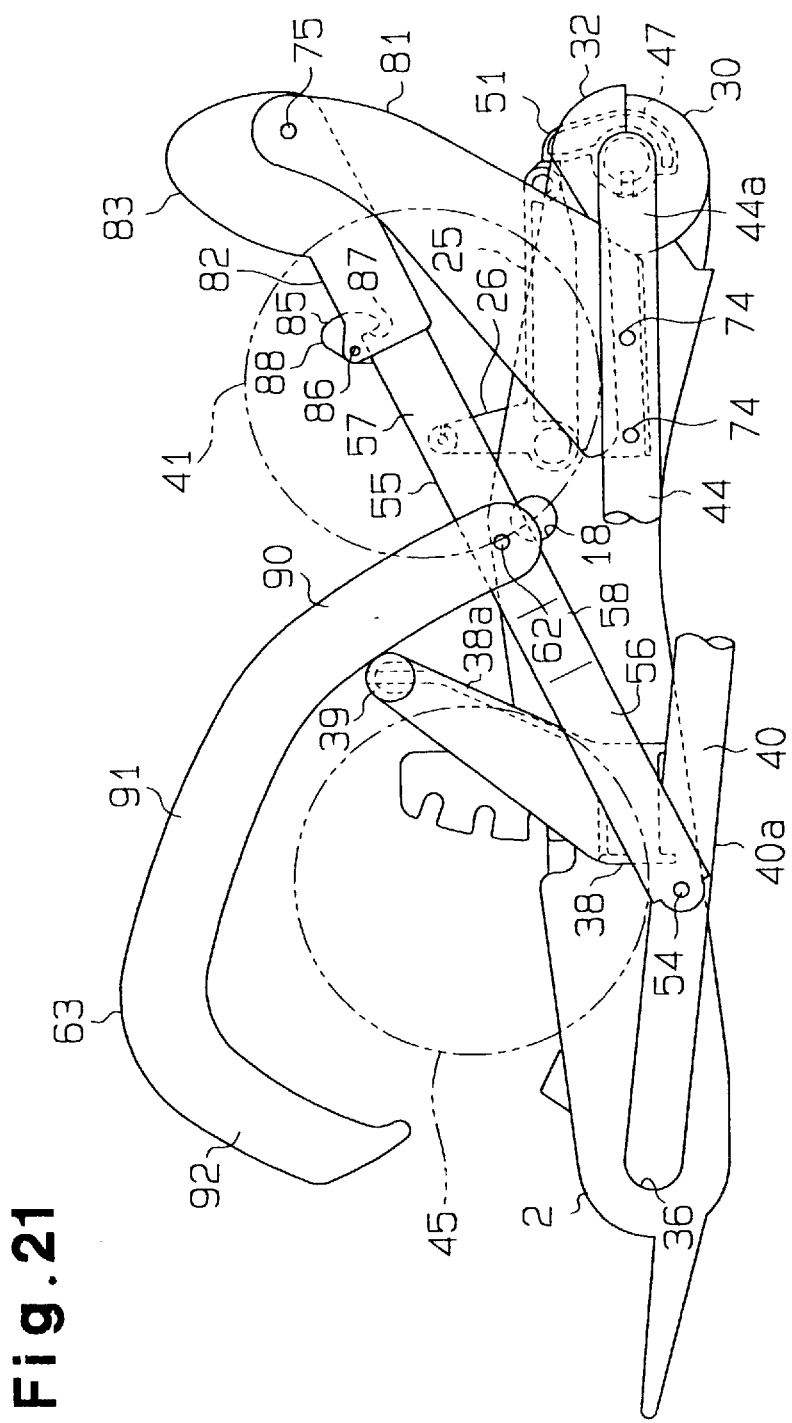
FIG. 21 is a partial side view showing the state in which lever arm of FIG. 20 has been rotated to contact the regulating pin.
Figure 22:
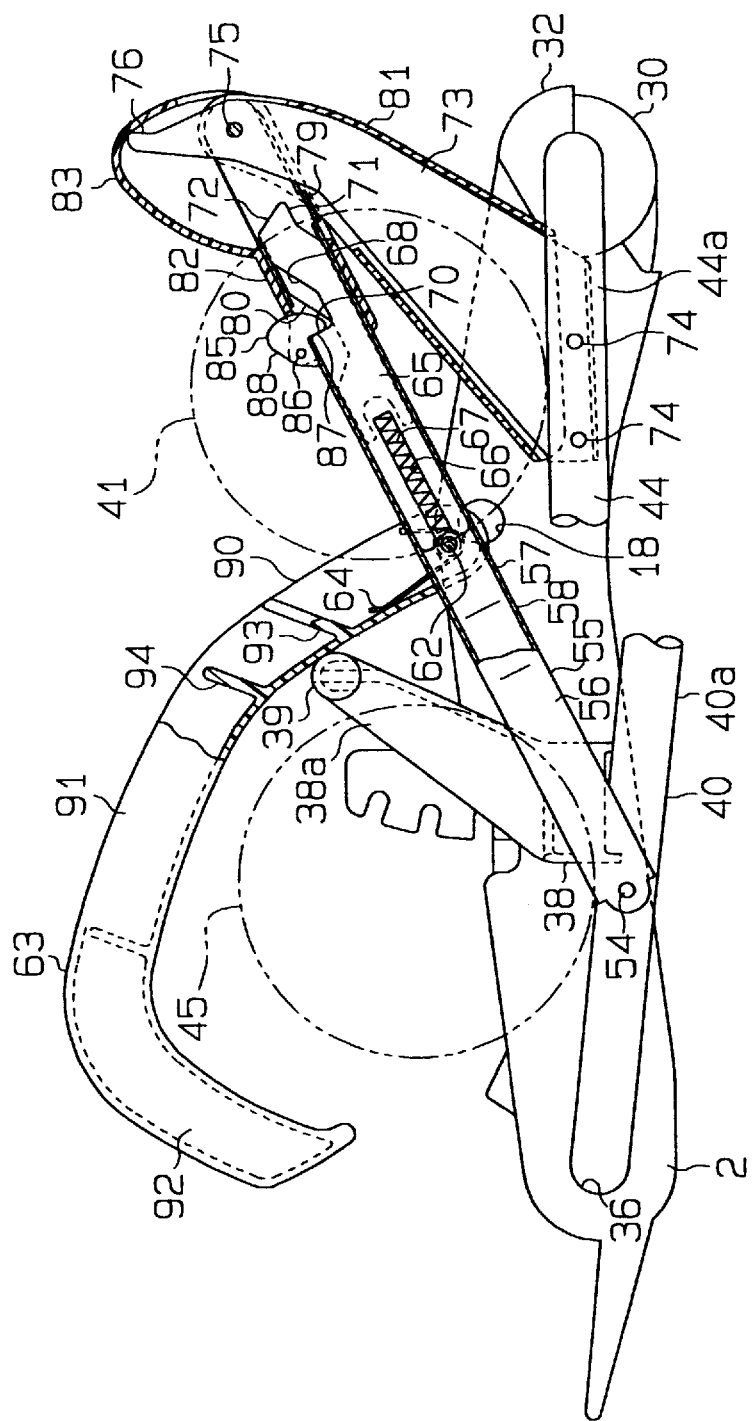
FIG. 22 is a partial sectional view showing the internal structure of the connection rod and the protection cover in FIG. 21.

If the operator releases the lever arm 63, as shown in FIG. 20, the lever arm 63 will automatically rotate forward by means of the handle spring 64, as shown in FIGS. 21 and 22. When the lever arm 63 contacts the regulating pin 39, further rotation of the lever arm 63 is restricted. In this embodiment, the caster 45 is retracted up underneath the lever arm 63.

If the side guard 9 shown in FIG. 6 is gripped, and the lever 10 is operated. The wire 27 is then pulled, the locking arm 25 and the arm lever 26 rotate counterclockwise on the support pin 20, as shown in FIG. 11. If, as shown in FIG. 12, the distal end of the locking arm 25 is moved up away from the partition wall 24, the arm lock 47 will be able to rotate counterclockwise since nothing restricts its rotation. In this state, if the side guard 9 is gripped and the child safety seat 1 is lifted, the caster arms 40, 44 and the casters 41, 45 will automatically rotate downward by their own weight and project from the lowermost surface of the bottom frame 2.

The rotations of the caster arms 40 and 44 cause the connection rod 55 and the locking member 73 to move beyond the bottom frame 2. With this movement, the angle between the connection rod 55 and the locking member 73 increases until both rod 55 and member 73 form nearly a straight line. In the embodiment in which the caster arms 40 and 44 hang from the bottom frame 2, if the child safety seat 1 is converted into a stroller, the caster arms 40 and 44 will expand in the direction that they move away from each other.

At this time, the protrusion 76 disposed within the bulged portion 83 of the protection cover 82 shown in FIG. 20, presses against the depressed portion 72 of the sliding member 65. Therefore, the sliding member 65 slides within the straight portion 57 toward the proximal end of the connection rod 55, while resisting the force of the spring 67.

If the protrusion 76 moves over the depressed portion 72 and contacts the connection plate 79, the sliding member 65 will move toward the distal end of the connection rod 55 due to the urging force of the spring 67. Moreover, the protrusion 76 will engage the notch 71 restricting the rotations of the connection rod 55 and the locking member 73. Also, as shown in FIG. 9, the engagement surface 52 of the arm lock 47 engages the regulating surface 53 in the accommodating portion 23, thereby restricting the counterclockwise rotation of the caster arm 44. When the caster arms 40 and 44 rotate, the lever arm 63 rotates on the support pin 62, while sliding on the regulating pin 39. In the way, the child safety seat 1 is switched from the auxiliary seat to the stroller.

The operation of the above described child safety seat 1 will now be described. FIG. 1 illustrates the arrangement in which the child safety seat 1 is used as a stroller. In this state, the front and rear caster 41 and 45 project downwardly from the lowermost portion of the bottom frame 2. The handle spring 64 urges the lever arm 63 to rotate forward (counterclockwise). This rotation is restricted when the lever arm 63 contacts the regulating pin 39. Because of this restriction, the lever arm 63 moves upwardly in the vicinity of the regulating pin 39.

As shown in FIG. 17, the protrusion 76 of the locking member 73 is sandwiched between the notch 71 of the sliding member 65 and the connection plate 79 of the reinforcing member 77. This locking arrangement cannot be released unless both the lever arms 63 rotate rearward. Therefore, even if the operator gripped the side guards 9 and lifted the child safety seat 1, there would be no possibility for the connection rod 55 and the locking member 73 to rotate on the connection pin 75. Thus, the front and rear caster arms 40 and 44 do not rotate, and the front and rear casters 41 and 45 are always secured in the extended or traveling position.

The rotation of the locking member 73 on the connection pin 75 is restricted by the engagement of the protrusion 76 and the connection plate 79. Therefore, when an operator uses the child safety seat 1 as a stroller on the road, the casters 41 and 45 can be unfolded to predetermined positions making it possible to use the child safety seat 1 as a stroller.

In addition, the protection covers 102 and 105 guards mud and water spattered by the front wheel 101 and the rear wheel 104 and prevent an operator from being spattered with mud and water.

When the form of the child safety seat 1 is switched from the stroller to the auxiliary seat, the operator rotates the lever arm 63 in the direction indicated by the arrow in FIG. 13, i.e., the direction in which the arm 63 moves away from the regulating pin 39, as shown in FIGS. 13 and 14. At this point, the lever arm 63 is intermediate to and extends outside the seat support 5. Since the operator grips the lever arm 63 from the rear side of the child safety seat 1, the child safety seat 1 has an excellent operability.

In addition, in this embodiment the lever arm 63 is curved so that the intermediate portion 91 thereof projects rearward and includes the grip portion 92. Because of this curvature, the operator can readily grip and lift the lever arm 63 from the rear side of the child safety seat 1. If the lever arm 63 is a straight line shape, there is the possibility that the grip portion 92 could slip out of the operator's hand unless it is gripped strongly. In this embodiment, however, the grip portion 92 of the lever arm 63 is almost perpendicular to the direction in which the child safety seat 1 is lifted. Therefore, if the operator grips the grip portion 92, a possibility is substantially reduced that the lever arm 63 slips out of the operator's hand unless the grip is not made. The operator can grip the arm 63 firmly and lift the child safety seat 1 reliably.

The lever arm 63 is further rotated clockwise on the support pin 62 and, as shown in FIGS. 18 and 19, will be restricted when the rotation regulating portion 93 is brought into contact with the upper surface of the connection rod 55. The protrusion 94 of the lever arm 63 depresses and slides on the slide surface 88 of the lock release 85. This causes the lock release 85 to rotate clockwise on the release axle 86. As the lock release 85 is rotated, the surface 70 of the sliding member 65 presses the concave engagement portion 87 of the lock release 85 against the force of the spring 67.

The sliding member 65 then slides in the straight portion 57 toward the proximal end portion of the connection rod 55. In the process of this sliding motion, the notch 71 of the sliding member 65 disengages from the protrusion 76 of the locking member 73. This makes it possible to rotate the connection rod 55 and the locking member 73 on the connection pin 75. In this arrangements, if the operator lifts the child safety seat 1 gripping the lever arm 63, the connection rod 55 and the lever arm 63 will be lifted as one united body, as shown in FIG. 20. The connection rod 55 and the locking member 73 then rotate on the connection pin 75, and finally decrease the angle between the lower surfaces of the rod 55 and the member 73. The front caster arm 40 and the rear caster arm 44 respectively rotate rearward end forward. In this embodiment, since the width between the leg portions 44a of the rear caster arms 44 is made wider than that between the leg portions 40a of the front caster arms 40, the caster arms 40 and 44 will interfere with each other.

As the front caster arm 40 rotates rearward, the front caster 41 moves up from the lowermost portion of the base main body 2. The front caster 41 is then held between the protection cover 81 and the support portion 7. Likewise, as the rear caster arm 44 rotates forward, the rear caster 45 moves up from the undersurface of the base main body 2. The rear caster 45 is then folded outside the straight portion 56. In this way, both the casters 41 and 45 are retracted and folded in compact positions.

In this embodiment, the front caster axle 153 is off the center axis 152 of the front caster arm 40. The rear caster axle 159 is off the center axis 158 of the rear caster arm 44, as shown in FIG. 2. That is, the caster axles 153 and 159 are shifted in the directions of the rotating caster arms 40 and 44. Therefore, since the caster axles 153 and 159 are not on the center axes 152 and 158, when the baby seat 1 is converted to an auxiliary automobile seat, both the casters 41 and 45 can be retracted in folded positions with less rotation than that needed for the caster arms 40 and 44.

At the same time, the rotation of the rear caster arm 44 causes the arm lock 47 to rotate clockwise, as shown in FIG. 10. The elevation of the surface 51 of the lock arm 47 elevates the distal end of the locking arm 25, and resists the tension of the coil spring 28. Consequently, the locking arm 25 rotates counterclockwise around the support pin 20 to move away from the partition wall 24.

When the caster 45 is retracted outside the straight portion 56, the surface 51 of the arm lock 47 is disengaged from the distal end of the locking arm 25, as shown in FIG. 11. The locking arm 25 is then rotated clockwise on the support pin 20 by means of the tension of the coil spring 28 and is brought into contact with the partition wall 24. Since the contact surface 52 of the elongated portion 50 engages the distal end of the locking arm 25, the counterclockwise rotation of the arm lock 47 will be restricted. Therefore, both the casters 41 and 45 can be folded in the retracted position. This prevents the caster arm 44 from sudden rotation when, for example, the child safety seat 1 is lifted.

Should the operator set the child safety seat 1 on the ground and release the lever arm 63, the lever arm 63 will rotate forward by the urging force of the handle spring 64. This rotation stops when the lever arm 63 contacts the regulating pin 39. Therefore, there is no need for the operator to rotate the lever arm 63 each time the user releases the arm 63. This avoids the need for complicated mechanism to rotate the lever arm 63.

When the lever arm 63 contacts the regulating pin 39, the grip portion 92 and the intermediate portion 91 of the lever arm 63 covers the caster 45. At this time, the protrusion 94 of the lever arm 63 moves away from the lock release 85, eliminating the force exerted on the sliding member 65. Therefore, the sliding member 65 slides toward the distal end of the connection rod 55 by means of the spring 67. When the pressing surface 70 of the sliding member 65 engages the concave engagement portion 87 of the lock release 85 and when the lock release 85 contacts the upper surface of the connection rod 55, the sliding motion of member 65 stops.

As shown in FIG. 6, when the front caster 41 is retracted to a folded position, it will be covered with the support portion 7 of the seat structure 3 and the protection cover 81, preventing caster 41 from contacting the operator or the automobile seat. This prevents the operator's clothes and the automobile seat from being stained due to the contact with the caster 41.

When the child safety seat 1 is placed on the automobile seat 13, the casters 41 and 45 are retracted in folded positions outside the seat main body 3. The caster arms 40 and 44 are positioned to the side of seat portion 49. The casters 41, 45 and the caster arms 40 and 40 are positioned to the side of seat portion 49. Neither of the casters 41, 45 in this arrangement is below the seat portion 49. Consequently, the height of the child safety seat is less than that of the conventional convertible seats, and will not interfere with the automobile ceiling. This allows for the seat 1 to be easily installed and removed from the automobile.

In the state in which the child safety seat 1 is placed on the seat 13, the caster arms 40 and 44 project slightly below the lowest portion of the bottom frame 2. These arms contact the automobile seat 13, in such a way that enhances the stability of seat 1 on the automobile seat 13.

In this arrangement, both the casters 41 retract into a folded position outside the sides of the back portion 6. If the distance between the front casters 41 is larger than that between the rear casters 45, the amount that the casters 41 extend the bottom frame 2 will be large. This would create the possibility that the casters 41 could contact and damage any lumbar support that the automobile seat may incorporate. In this embodiment, however, the distance between the front casters 41 is smaller than that between the rear casters 45, so that the amount that the casters 41 extend outside the bottom frame 2 is minimal. The casters 41 of the present embodiment thus will not contact or damage any lumbar seat supports.

Figure 23:
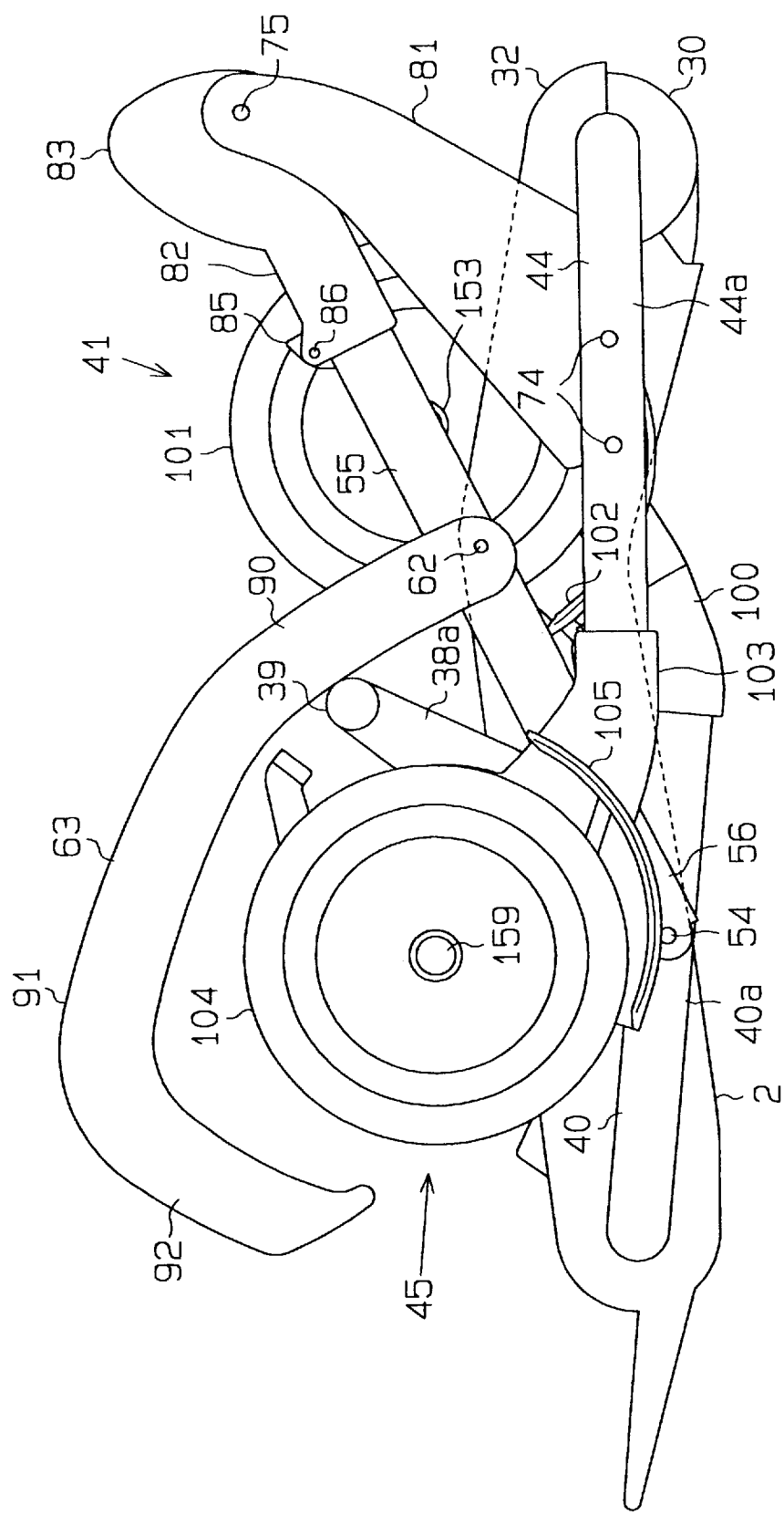
FIG. 23 is a partial longitudinal side view showing the caster arm and the caster folded outside the seat structure.

When the child safety seat 1 is affixed to the seat 13 by a seat belt (not shown), the casters 41 and 45 are folded outside the seat structure 3 above the seat 13, to prevent the seat from becoming dirty. In addition, the protective covers 102 and 105 are respectively positioned below the front and rear wheels 101 and 104 as shown in FIG. 23, and prevent direct contact between the wheels and seat. Therefore, even if water or mud were on the front and rear wheels 101, the protective covers 102 and 105 would protect the seat of the water or mud comes out the wheels. This further prevents the automobile seat 13 from being stained with water or mud when the child safety seat 1 is mounted in the automobile.

Thus, when the operator lifts and rotates the lever arm 63, the rotation of the connection rod 55 and locking member 73 as well as the lifting of the child safety seat 1 is performed simultaneously. This allows the stroller to easily convert to an auxiliary automobile seat with simple operation.

Lifting both the lever arms 63 while rotating them rearward does not require substantial force and is easily accomplished. Therefore, only the slightest effort is required to readily switch the child safety seat 1 to the auxiliary seat while a child is being held in the seat 1.

In order to rotate both the caster arms 40 and 44 at the same time, although various complicated mechanisms can be employed in addition to the mechanism described in this embodiment, this embodiment employs a very simple mechanism in which both the caster arms 40 and 44 are connected by the connection rod 55 and the locking member 73. This embodiment therefore has the advantage of incorporating a reduced number of parts for a light weight child safety seat 1. In addition, another advance includes that the rotational angle of the caster arms 40 and 44 can be changed simply by altering the size or shape of the connection rod 55 and the locking member 73, or by changing the position of the connection pin 75 and the swivel pin 54.

Although the rear caster 45 is positioned outside portion 56 of the connection rod 55, the upper portion of the rear caster 45 is covered with the lever arm 63. Therefore, the operator cannot touch the rear casters 45 easily from the lever arm side. Likewise, the front casters 41 are housed between the lateral supports 7 of the seat structure 3 and the protection cover 81. Therefore, there is no need to provide an exclusive cover for covering the casters 41 and 45. This can reduce the number of parts and make the child safety seat 1 compact.

It should be noted that the above-described handle spring 64 can be omitted as occasion demands. In such case, the operator has to rotate the lever arm 63 up over the casters 45.

The operation and the advantages in the case where the form of the child safety seat 1 is switched from the auxiliary seat to the stroller will now be described. The action of gripping the side guard 9 and pushing the lever 10 into the side guard 9 causes the wire 27 to be pulled. As shown in FIG. 12, the locking arm 25 then rotates on the support pin 20 away from the partition wall 24. During its rotation, the locking arm 25 resists the tension of the coil spring 28, and its distal end is disengaged from the surface 52 of the elongated portion 50.

If the child safety seat 1 is lifted in this state, the front caster arm 40 and the rear caster arm 44 will automatically rotate to extend by their own weight. When the casters 40 and 44 are hanging from the bottom frame 2, caster arms have rotated as described above. If the child safety seat 1 is placed on the ground, the caster arms 40 and 44 will be further rotated to predetermined angle.

During the above operation, the connection rod 55 and the locking member 73 also rotate on the connection pin 75. The protrusion 76 of the locking member 73 presses against the portion 72 of the sliding member 65, while resisting the urging force of the spring 67. Therefore, the sliding member 65 slides within the straight portion 57 toward the proximal end portion of the connection rod 55. The caster arms 40 and 44 then rotate to their predetermined angles, so that the casters 41 and 45 reach fully extend positions. At this time, the protrusion 76 traverses the depressed portion 72. The sliding member 65 slides toward the distal end of the connection rod 55 by means of the urging force of the spring 67. As the member 65 slides, the notch 71 engages with the protrusion 76 of the locking member 73. As a result, the child safety seat 1 is transformed from the auxiliary seat into the stroller.

Since the side guard 9 in the support portion 7 has a long and slender shape in this embodiment, the child safety seat 1 can be held reliably by this side guard 9, an operator can easily carry the child safety seat 1. In addition, when the child safety seat 1 is switched from the auxiliary seat to the stroller, the operator can grip the side guard 9 and lifts the child safety seat 1, while pushing the lever 10 into the side guard 9. Therefore, only the slightest effort is needed to easily perform the above operation to switch the child safety seat 1 to the stroller with a baby held in the seat 1. In this embodiment the opposite ends of the side guard 9 are connected to the lateral supports 7. This allows the side guards 9 to be easily gripped and lifted, even from behind the seat 1.

If the operator grips each side guard 9 and lifts the child safety seat 1 while operating the levers 10, the locking arms 25 are disengaged from the arm locks 47 and the child safety seat 1 can be switched to the stroller. The operator does not need to separately lift the side guards 9 and the levers 10. With the side guards 9 gripped, the levers 10 can easily be operated and the side guards 9 lifted.

Unless the operator operates both the levers 10 at the same time, he or she could not switch the child safety seat 1 from the auxiliary seat to the stroller. However, even if the operator operated only one lever 10 by mistake, the casters 40 and 44 will not suddenly rotate.

The above-described embodiment may be modified without departing from the spirit of the present invention according to the following.

Figure 24:
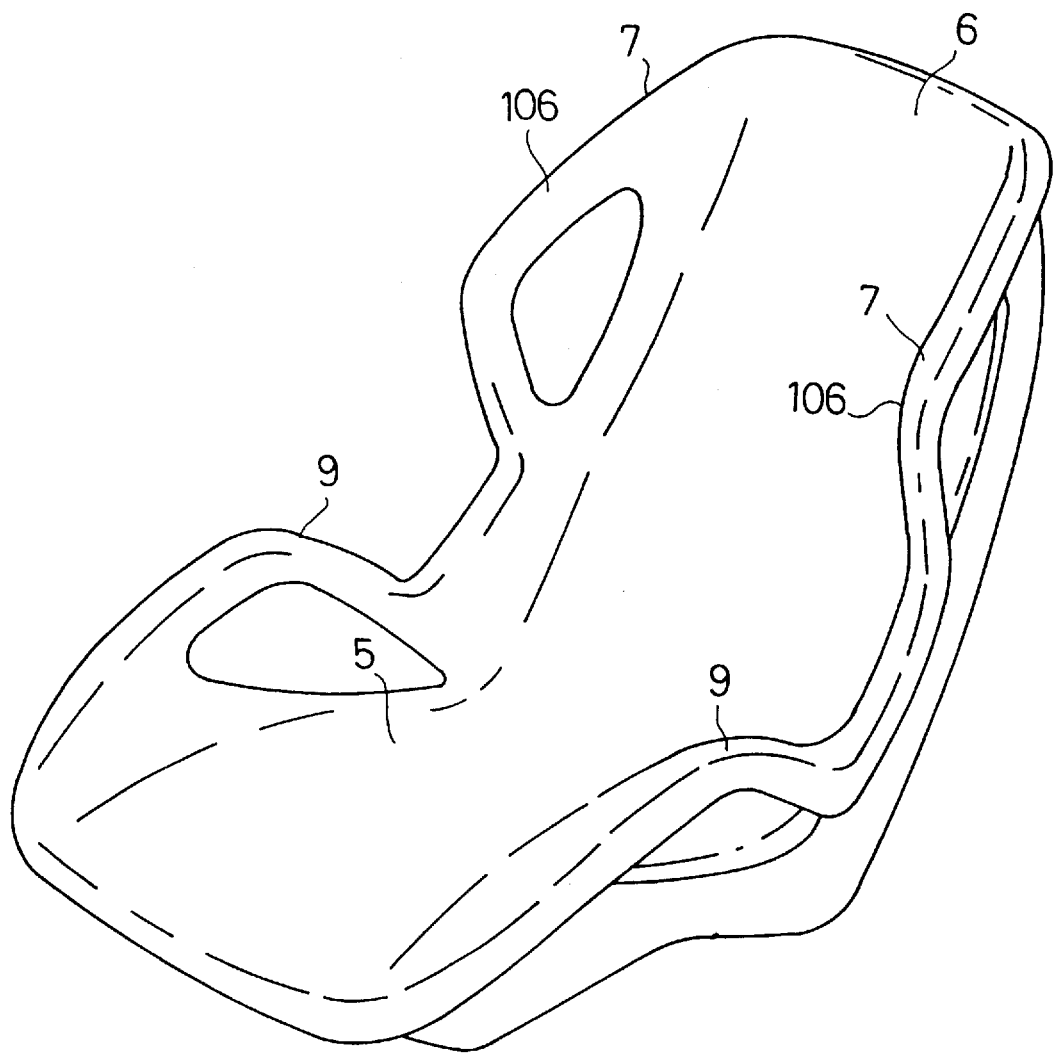
FIG. 24 is a perspective view showing another shape of the seat structure of FIG. 1.
Figure 25:
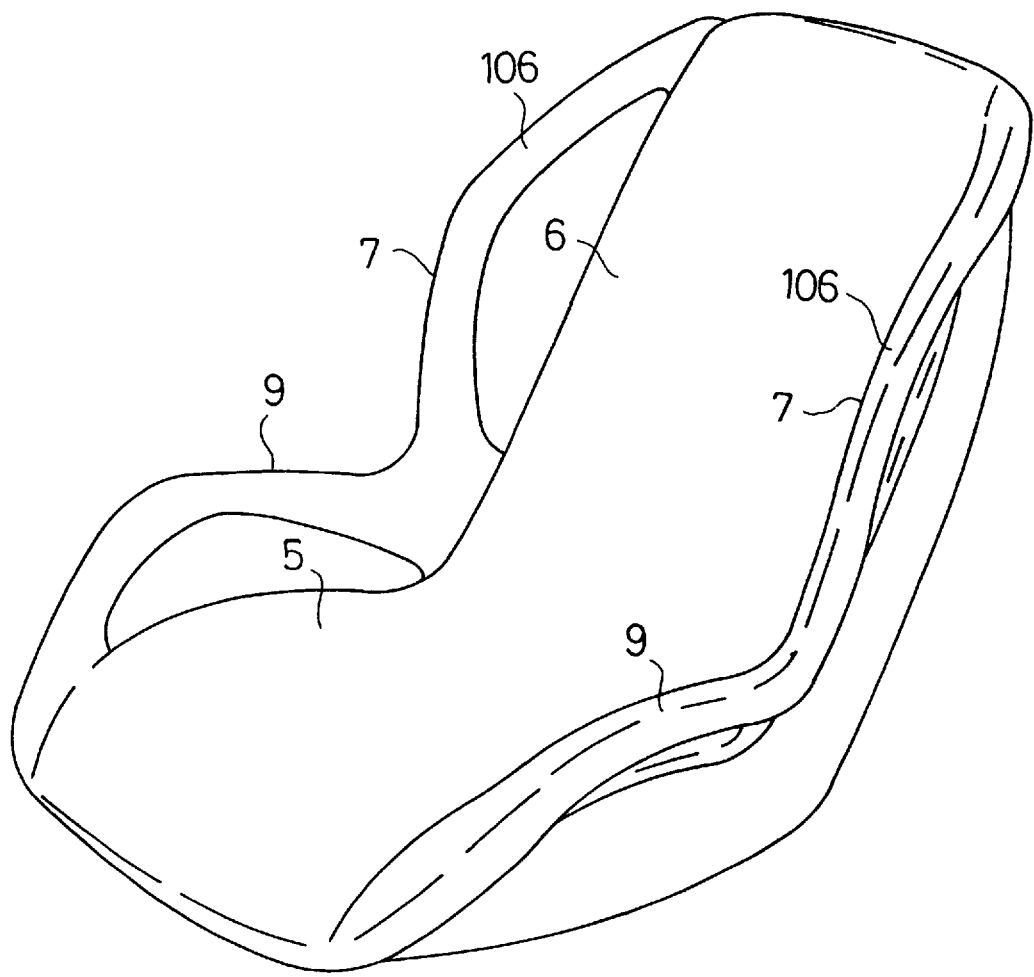
FIG. 25 is a perspective view showing another shape of the seat structure of FIG. 1.
Figure 26:
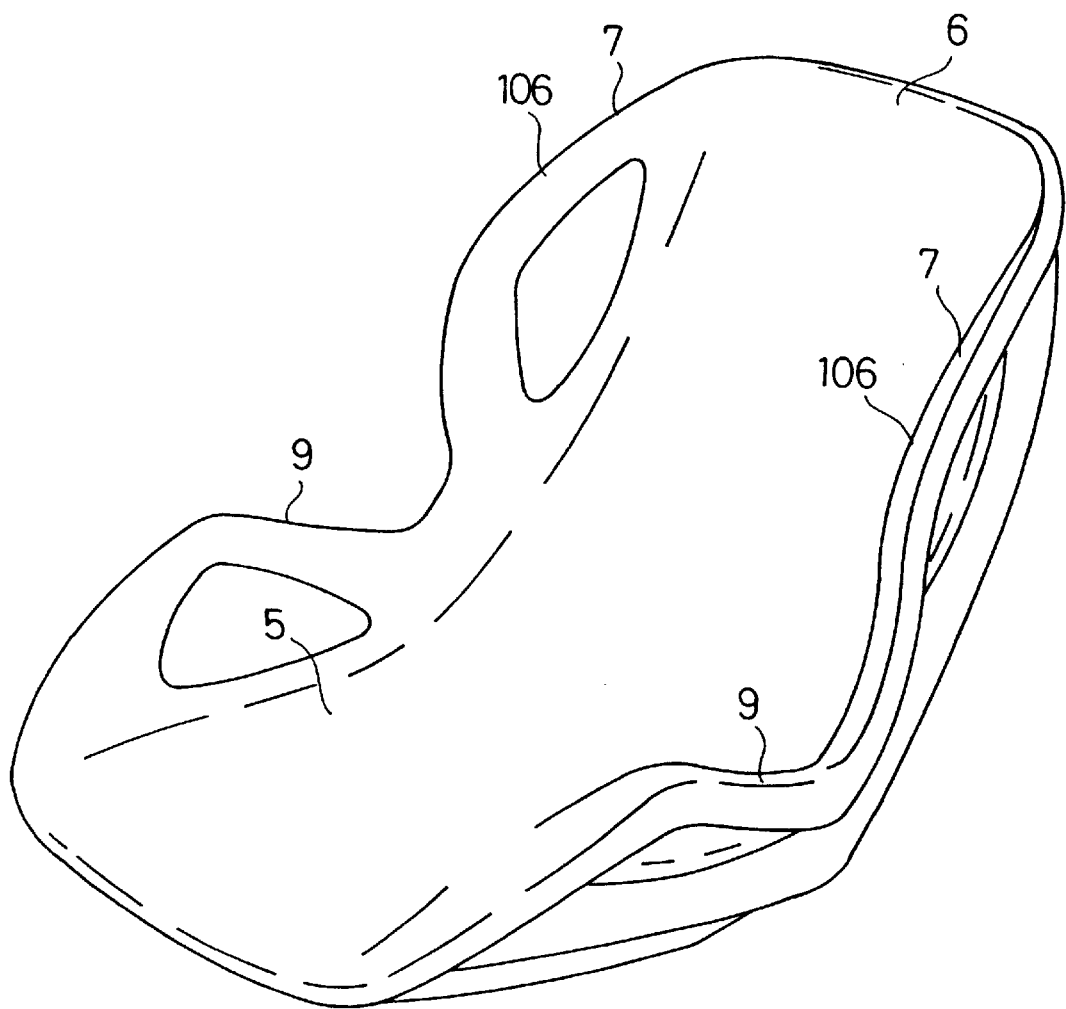
FIG. 26 is a perspective view showing another shape of the seat structure of FIG. 1.

(1) In the first embodiment, although the side guard 9 and the seat structure 3 are separately formed, they may be integrally formed as shown in FIGS. 24 to 26. With this arrangement, a pair of gripping portions 106 may be formed in the lateral supports 7 of the back portion 6 in order to facilitate gripping of the lateral supports 7. With such a structure, the child safety seat 1 can be adjusted to a suitable position by means of the grip portion 106, after it has been placed on the seat 13. As compared with a child safety seat having no grip portion 106, the child safety seat 1 provided with grip portions 106 can be adjusted readily to a suitable position.

(2) The lever 10 may also be attached to only one of the side guards 9.

Figure 27:
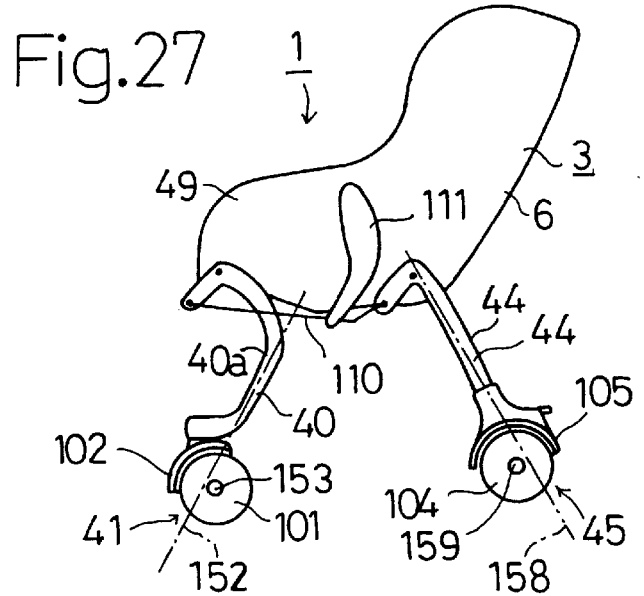
FIG. 27 is a schematic side view showing another embodiment of the connection structure of the front and rear caster arms in FIG. 2.
Figure 28:
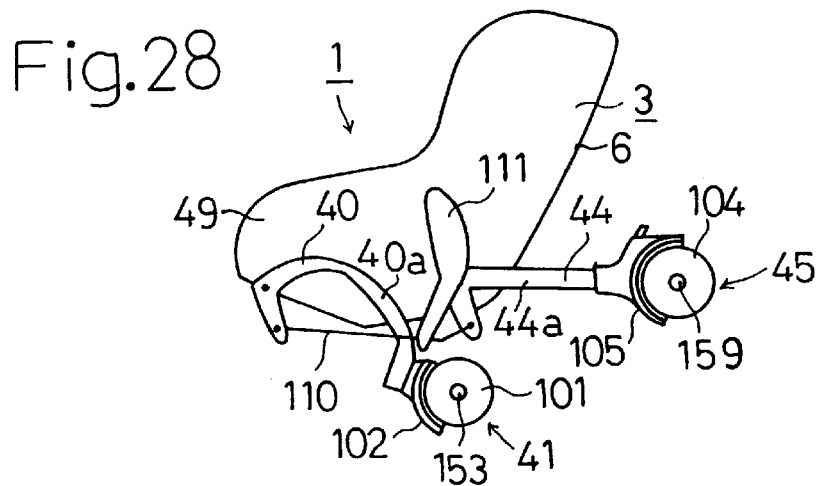
FIG. 28 is a schematic side view showing that the caster arms of FIG. 27 can be rotated rearward.
Figure 29:
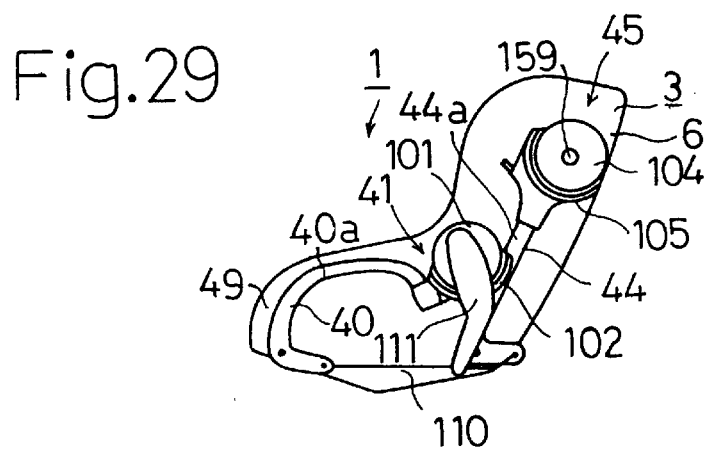
FIG. 29 is a schematic side view showing the state in which the caster arms of FIG. 29 have been further rotated a folded position outside the seat structure.

(3) As shown in FIG. 27, the caster arms 40 and 44 may also be rotatably connected by a single connection rod 110, with a lever arm 111 mounted thereon. Here, in this case, when the lever 111 is operated, the caster arms 40 and 44 will rotate in the same directions (counterclockwise), as shown in FIG. 28. As shown in FIG. 29, the front caster arm 40 and the front caster 41 are housed outside the seat portion 49, and the rear caster arm 44 and the rear caster 45 are housed outside the back portion 6. In this way, the caster arms 40, 44 and the casters 41, 45 can be readily housed in the predetermined position using a reduced number of parts.

Additionally, the distance between the leg structures 40a of the front caster arms 40 and the distance between the leg structures 44a of the rear caster arms 44 are wider than at least the width of the seat portion 49. Further, the distance between the leg structures 40a and the distance between the leg structures 44a are substantially same.

The caster axle 153 of the front caster 41 is located rear to the center axis 152 of the front caster arm 40. The caster axle 159 of the rear caster 45 is located forward to the center axis 158 of the rear caster arm 44. If the casters 41, 45 are adjusted in this manner, the rotational angles of the caster arms 40 and 44, when the casters 41 and 45 are housed, can be made smaller.

(4) The above-described embodiment may also be modified as shown in FIG. 30. In this case, a crank member 112 is fixedly mounted on the caster arm 44, and a connection rod 113 is rotatably mounted on the caster arm 40. The crank member 112 and the connection rod 113 are rotatably connected by means of a connection pin 114. Further, an operation lever 116 is attached to the seat structure 3, while the distal end of the operation lever 116 is connected through an operation bar 115 to the connection pin 114. In this case, if the operation lever 116 is rotated, the caster arms 40 and 44 will be rotated in the same direction, as shown in FIG. 31. Thereafter, the caster arms 40 and 44 are both housed outside the seat portion 49 as shown in FIG. 32.

In this modification, the angle between the caster arms 40 and 44 can be changed by adjusting the length of the crank member 112.

Since the caster axle 153 is located rear to the center axis 152 and the caster axle 159 is located front to the center axis 158, the rotational angles of the caster arms 40 and 44, when the casters 41 and 45 are folded, are smaller.

Figure 33:
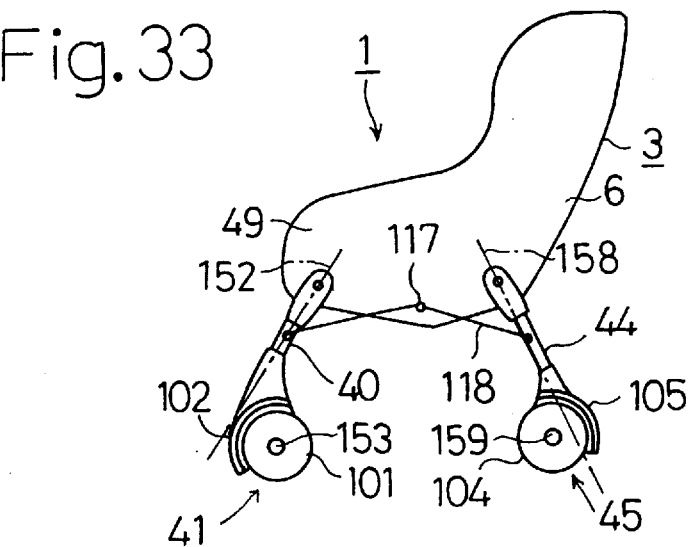
FIG. 33 is a schematic side view showing another embodiment of the structure connecting the front and rear caster arms in FIG. 2.
Figure 34:
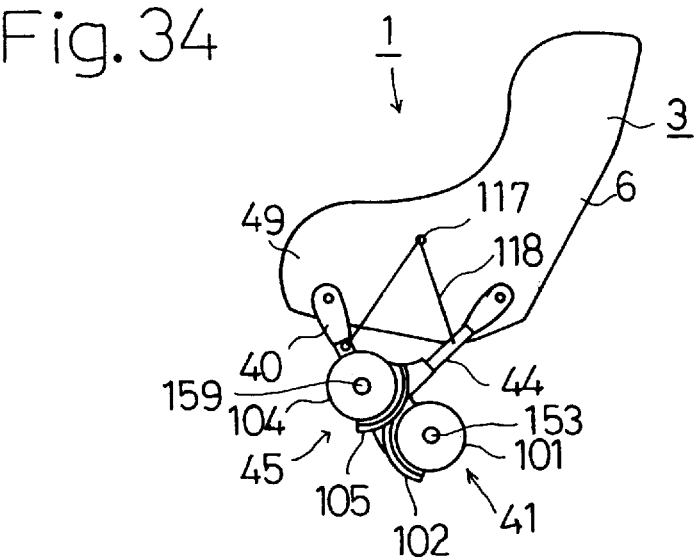
FIG. 34 is a schematic side view showing how the caster arms of FIG. 33 rotated in close proximity toward each other.
Figure 35:
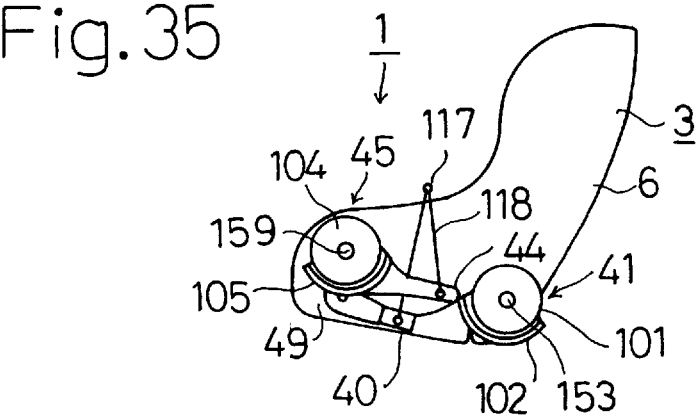
FIG. 35 is a schematic side view showing the caster arms of FIG. 34 even further rotated in a folded position outside the seat structure.

(5) As shown in FIG. 33, the caster arms 40 and 44 may also be connected through a connection rod 118 having a rotational shaft 117. In this case, the rotational shaft 117 is guided by means (not shown) upward, as illustrated in FIG. 34. The casters arms 40 and 44 are rotated toward each other and housed in predetermined positions outside the seat portion 49 as shown in FIG. 35.

Since the caster axle 153 is located rear to the center axis 152 and the caster axle 159 is located front to the center axis 158, the rotational angles of the caster arms 40 and 44 are smaller when casters 41 and 45 are folded.

Second Embodiment

A second embodiment of the present invention will now be hereinafter described in accordance with FIGS. 36 through 53. The same reference numerals will be used for the same parts as those of the first embodiment and their detailed description will not be given.

According to the second embodiment, the extending member 38, the oblique member 38a and the regulating pin 39 are not formed in the base portion 2. Therefore, the attachment structure of the lever arm 63 to the connection rod 55 is different from that of the first embodiment.

Figure 38:
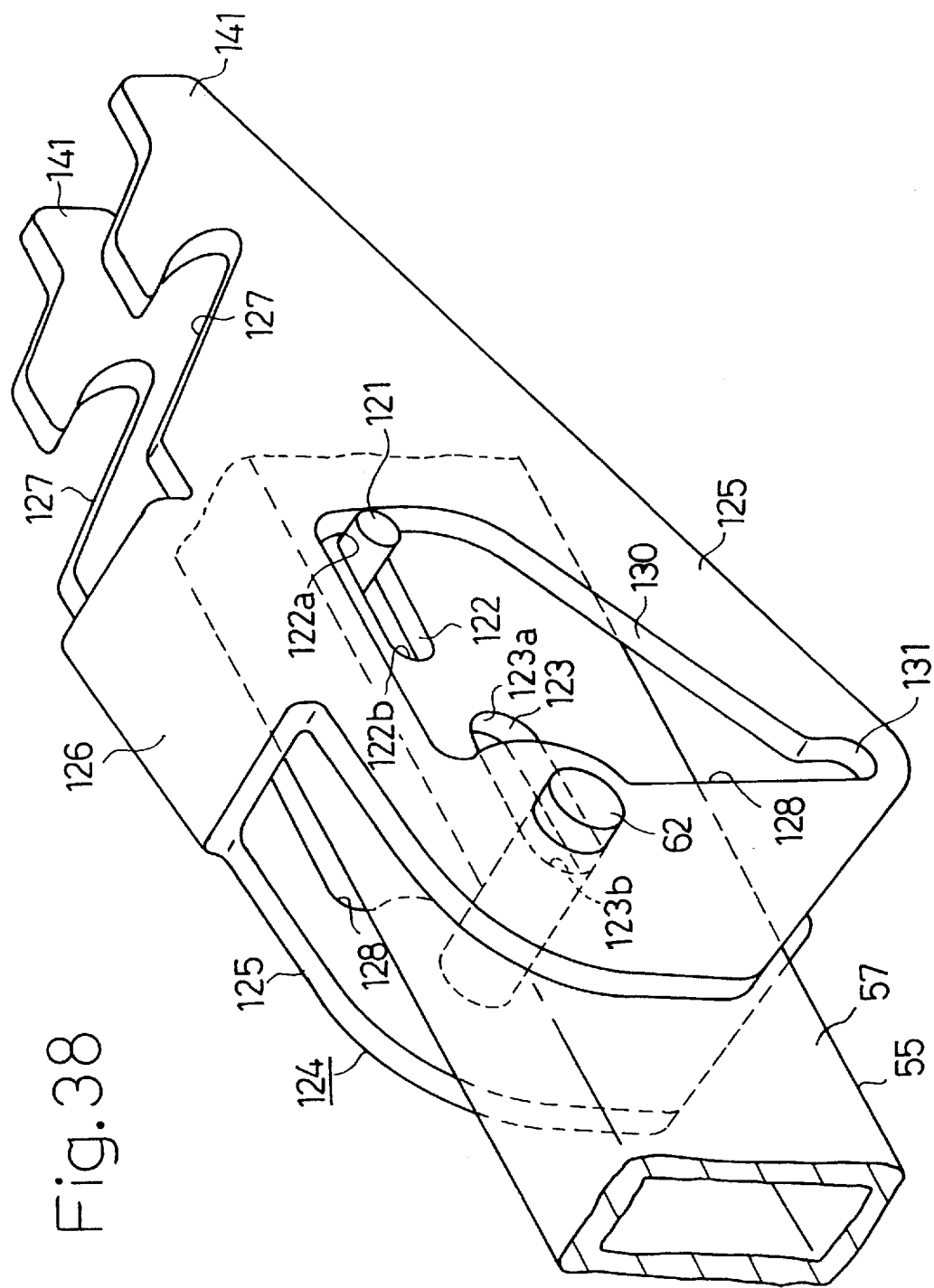
FIG. 38 is a partial perspective view showing the structure connecting the auxiliary member and the connection rod in FIG. 36.
Figure 40:
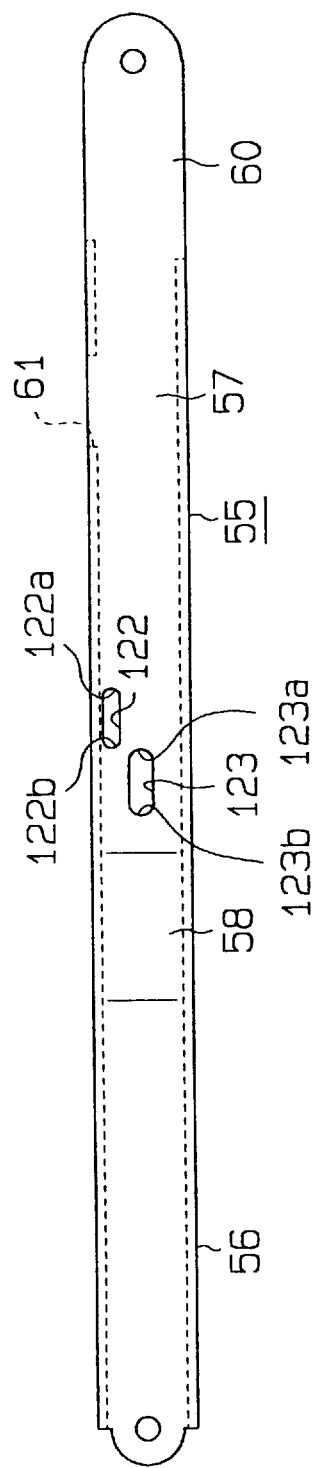
FIG. 40 is a side view of the connection rod in FIG. 36.
Figure 41:
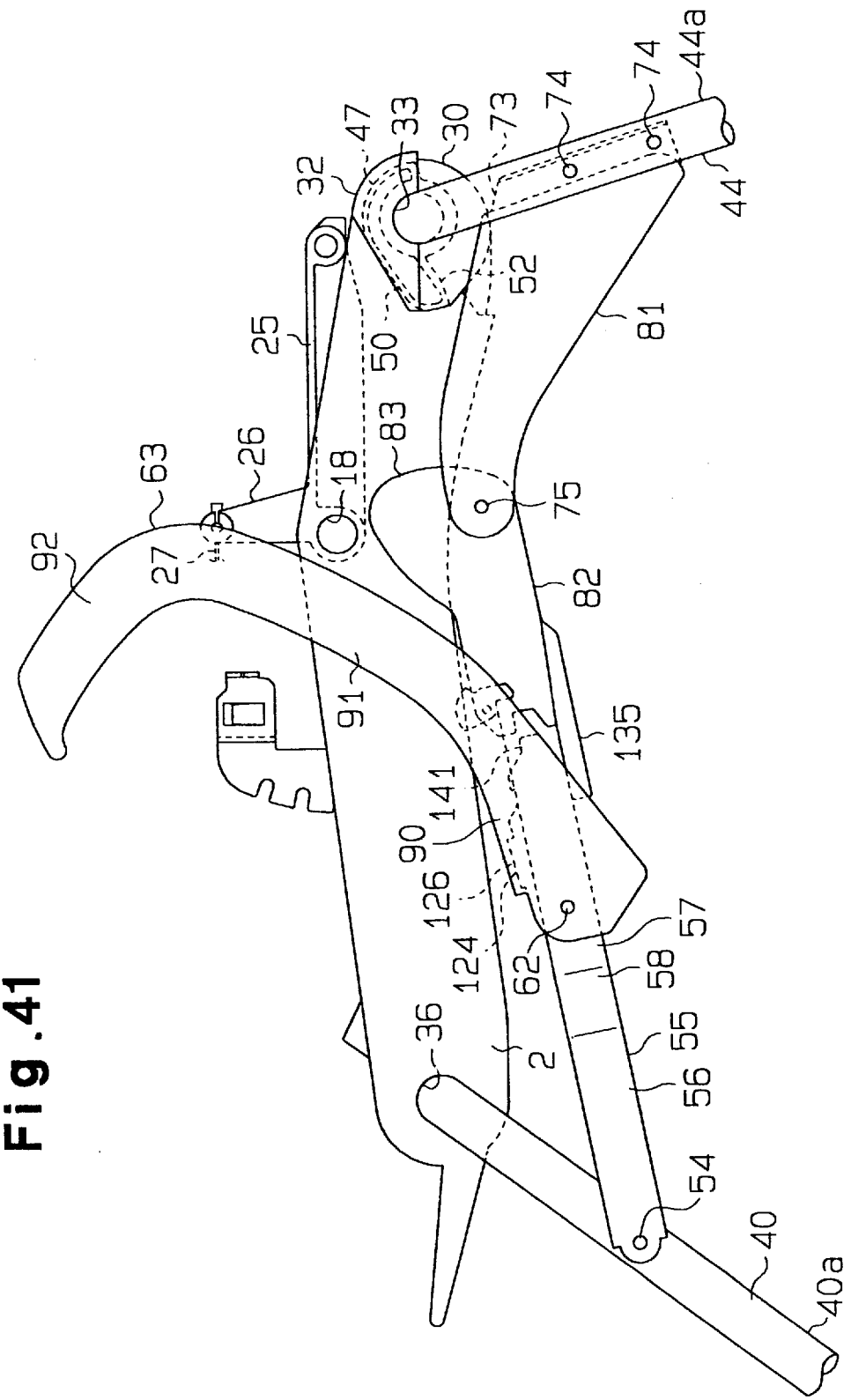
FIG. 41 is a partial side view showing the bottom frame, the front and rear caster arms, and the peripheral members in FIG. 36.
Figure 42:
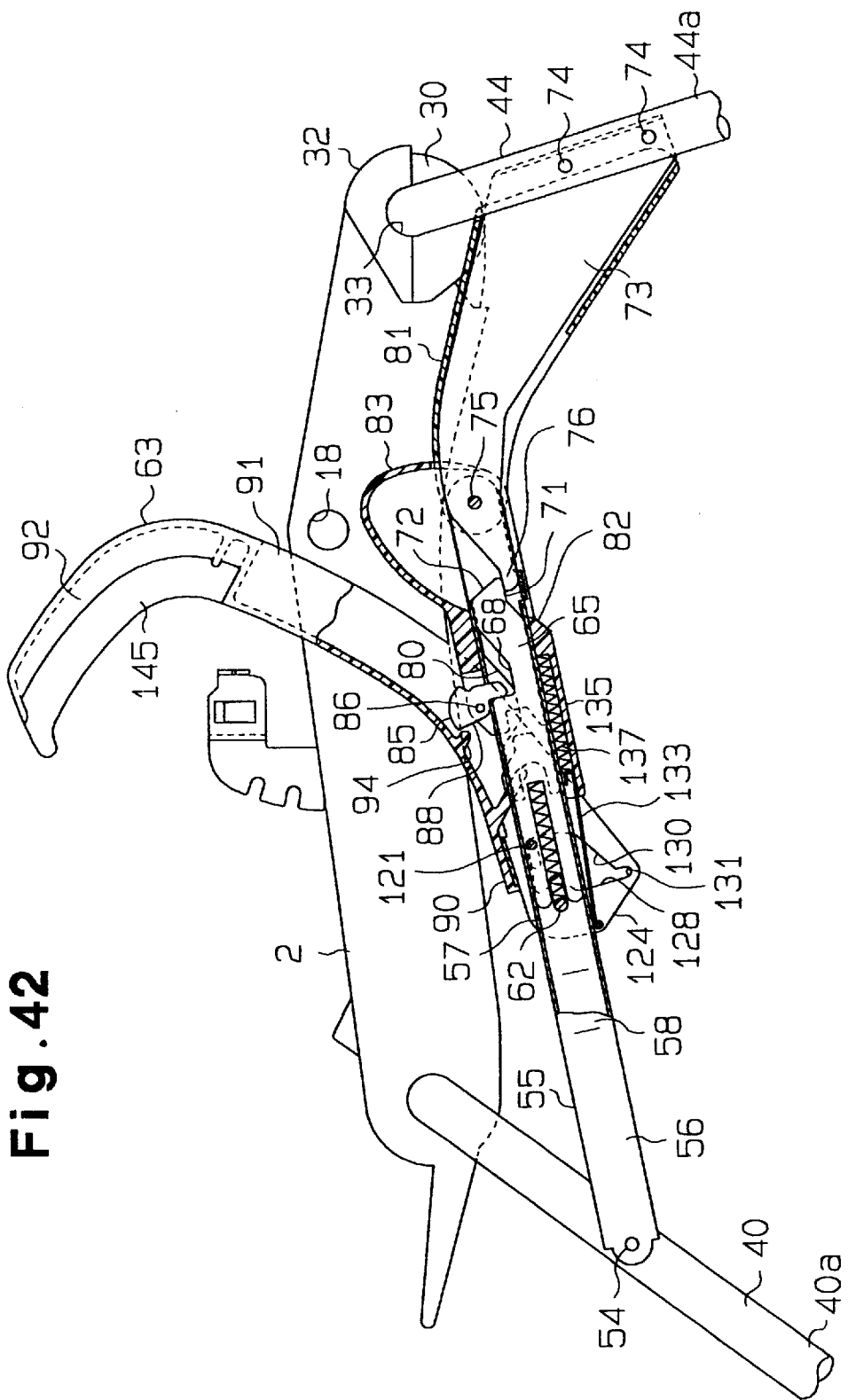
FIG. 42 is a partial sectional view showing the structure connecting the lever arm and the locking member in FIG. 41.
Figure 43:
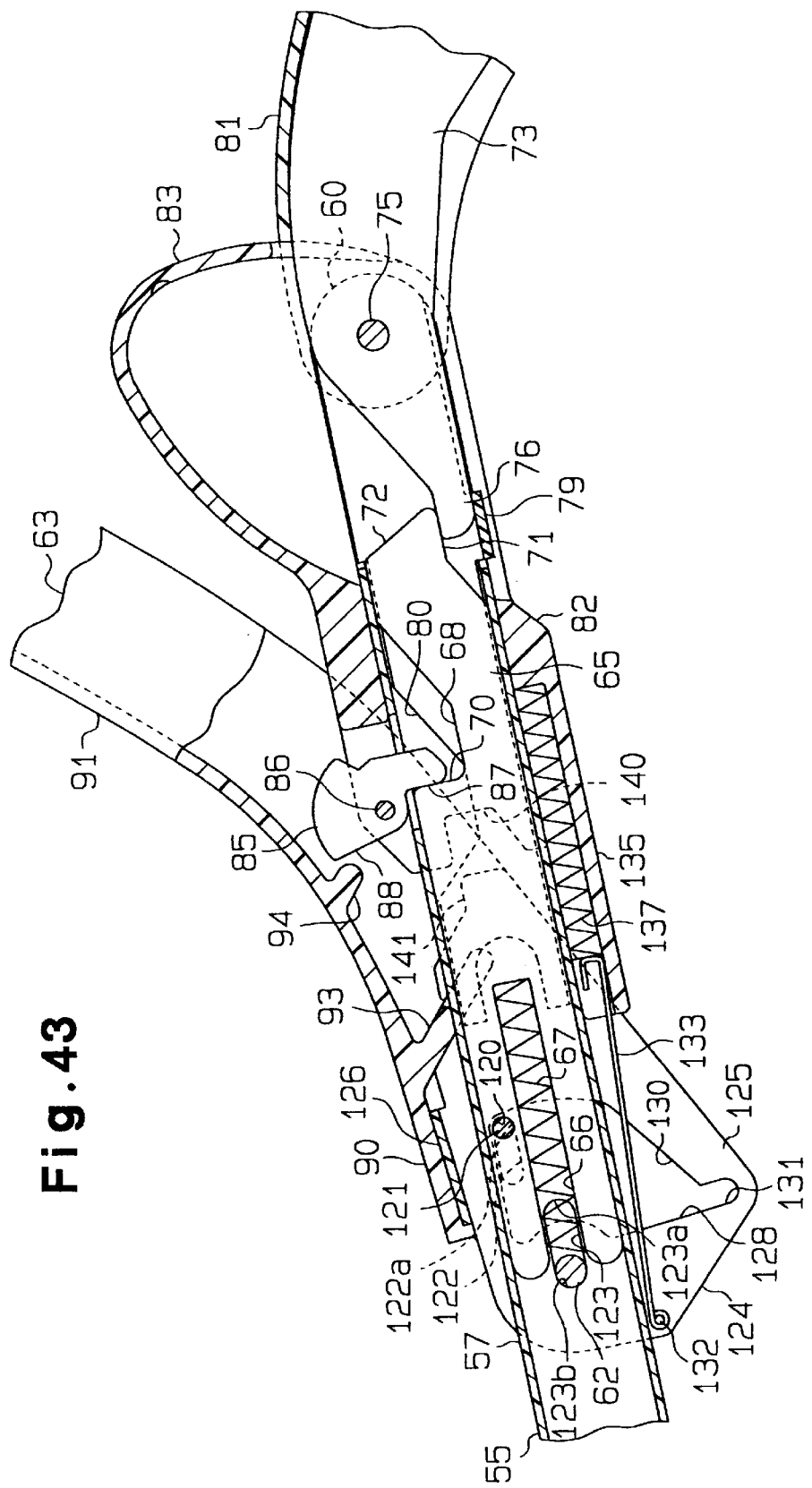
FIG. 43 is an enlarged sectional view showing the essential parts of FIG. 42.
Figure 44:
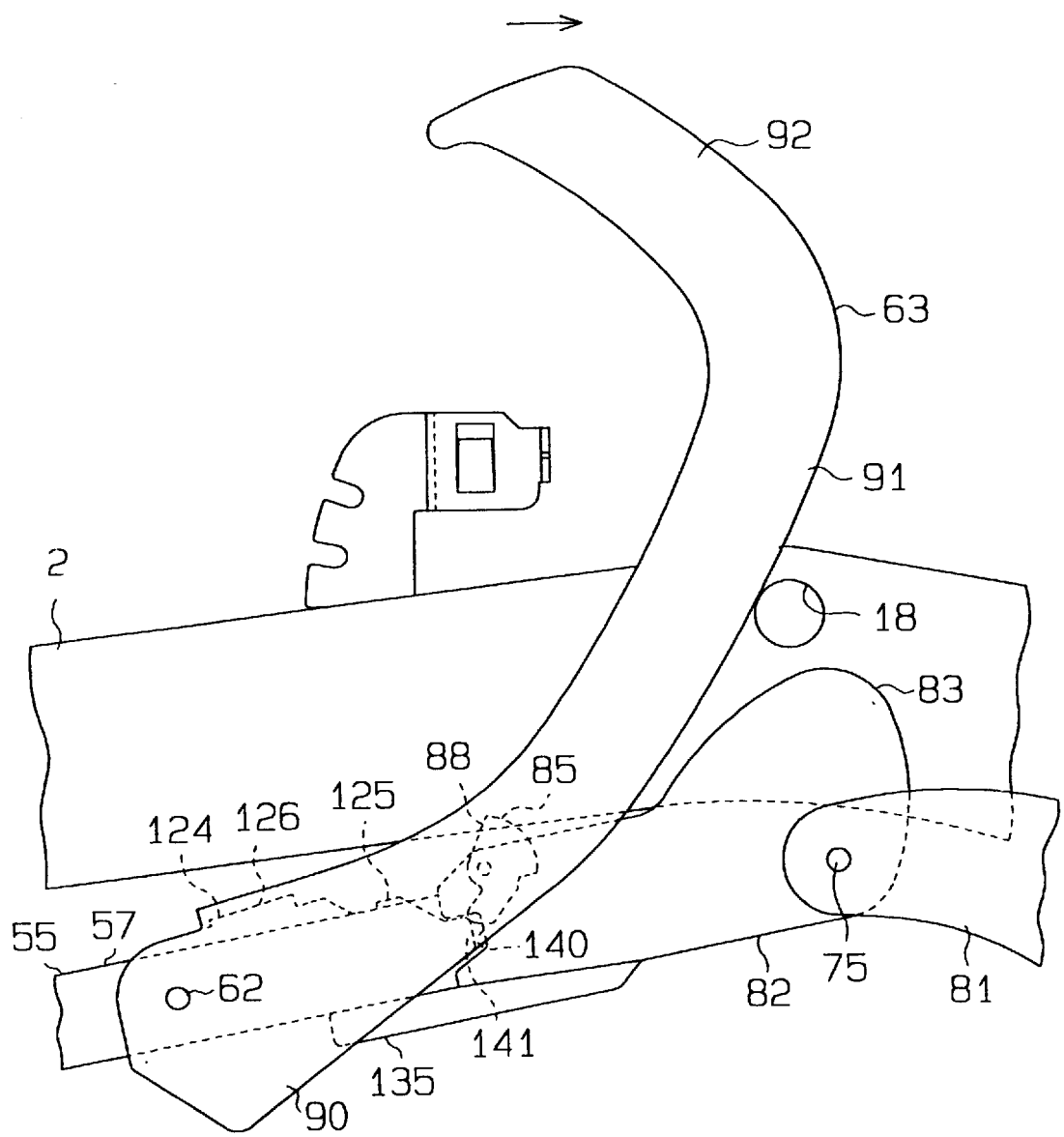
FIG. 44 is a partial side view showing the state in which the lever arm of FIG. 41 has been pulled rearward.

As shown in FIG. 43, each sliding member 65 includes a bore 120 into which a lock pin 121 is inserted. As shown in FIGS. 38 and 40, the side portions of a straight portion 57 of the connection rod 55 have a longitudinally extending bore 122 into which the lock pin 121 is inserted. Each lock pin 121 is movable between inner walls 122a and 122b of elongated bore 122. As shown in FIGS. 42 and 43, when a lock release 85 engages both a pressing surface 70 of the sliding member 65 and the upper surface of the connection rod 55, and when the rearward motion of the sliding member 65 is stopped, the lock pin 121 contacts the inner wall 122a.

In the side of the straight portion 57, at the proximal end portion of the connection rod 55, a first group of elongated bores 123 extend parallel to a second group of the elongated bores 122. The opposite ends of a support pin 62, on which a lever arm 63 rotates are inserted into the elongated bore 123. The support pin 62 is movable between a pair of inner walls 123a and 123b of the elongated bores 123 and rotatable within the elongated bores 123.

Each lever arm 63 has an auxiliary member 124 attached to its inner surface. More particularly, as shown in FIG. 38 each auxiliary member 124 is positioned at the side of the straight portion 57 and comprises a pair of guide portions 125 mounted on the support pin 62. The upper ends of the guide portions 125 couple a connection portion 126. Each guide portion 125 has an oblique slit 127 through which a rotation regulating portion 93 of the lever arm 63 is fitted. Therefore, when the lever arm 63 is rotated on the support pin 62, the auxiliary member also is rotated together with the lever arm 63.

A fan-shaped housing bore 128 is formed in each guide portion 125 in the vicinity of the support pin 42. A lock pin 121 is inserted through the bore 128. As shown in FIGS. 38 and 43, the housing bore 128 has a straight slide portion 130 and a concave engagement portion 131. When the lock pin 121 contacts the inner wall 122a of the elongated bore 122, and when the auxiliary member 124 rotates forward on the support pin 62, the portion 130 slides the lock pin 121 toward the inner wall 122b of the elongated bore 122. The concave engagement portion 131 is continuous to the slide portion 130, and the lock pin 121 that has slid along the slide portion 130 is received in the concave engagement portion 131.

Figure 39:
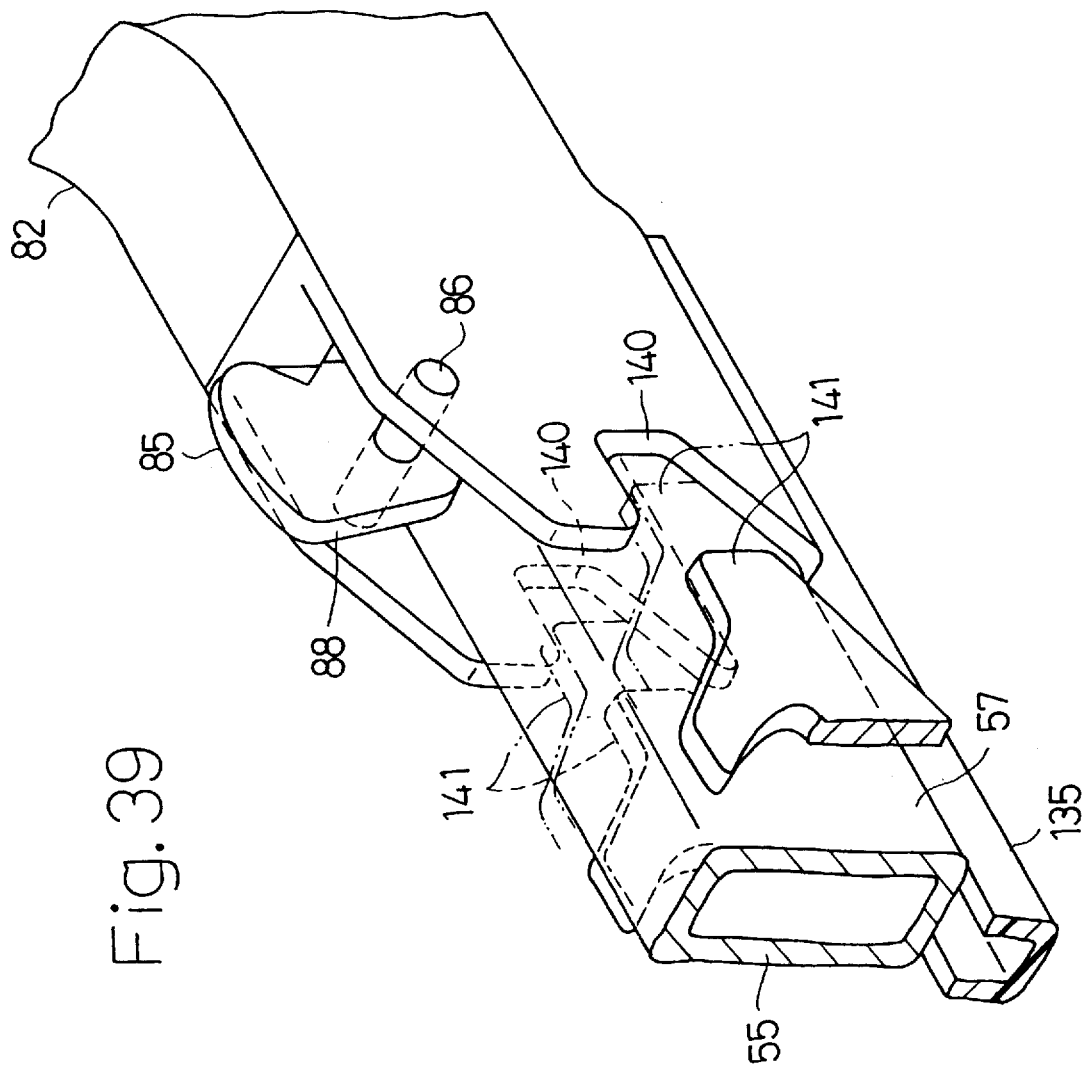
FIG. 39 is a partial perspective view showing how the protruding auxiliary member in FIG. 38 engages with the concave engagement portion of the protection cover.

A first end of an oscillating rod 133 attaches to a connecting member 132 between the guide portions 125. The connecting member 132 is positioned to front of the support pin 62 and below the connection rod 55. As shown in FIGS. 39 and 43, a protective cover 82 is integrally formed with a U-shaped housing portion 135, which is smaller than the width of the connection rod 55. A spring 137 is disposed in a space surrounded by the connection rod 55 and the housing portion 135 as shown in FIG. 43.

A second end of the oscillating rod 133 is inserted into the housing portion 135 so that the spring 137 can be compressed at all times. A spring force is thereby created urging the oscillating rod 133 out of the housing portion 135. This force is transmitted through the connecting member 132 and the auxiliary member 124 to the lever arm 63, thereby the lever arm 63 tries to rotate rearward. This rotation is restricted where the rotation regulating portion 93 of the lever arm 63 comes in contact with the upper surface of the connection rod 55. The support pin 62 is brought into contact with the inner wall 123b of the elongated bore 123 by means of the spring 67.

A protection cover 82 is formed with a pair of concave engagement portions 140. Each guide portion 125 is integrally formed with a protrusion 141 that can engage with the concave portion 140. As shown by arrows in FIGS. 44 and 45, if the lever arm 63 is pulled rearward while resisting the urging force of the spring 137, the support pin 62 will slide along the elongated bore 123, compressing the spring 67. If the support pin 62 is brought into contact with the inner wall 123a of the elongated bore 123, the protrusion 141 will engage with the concave engagement portion 140. This restricts the rotation of the lever arm 63 and the auxiliary member 124 on the support pin 62.

As the lever arm 63 moves rearward, the protrusion 94 pushes the slide surface 88 of the lock release 85. This rotates the lock release 85 clockwise on the release axle 86. The concave engagement portion 87 of the lock release 85 pushes the pressing surface 70 of the sliding member 65 while resisting the urging force of the spring 67.

Figure 46:
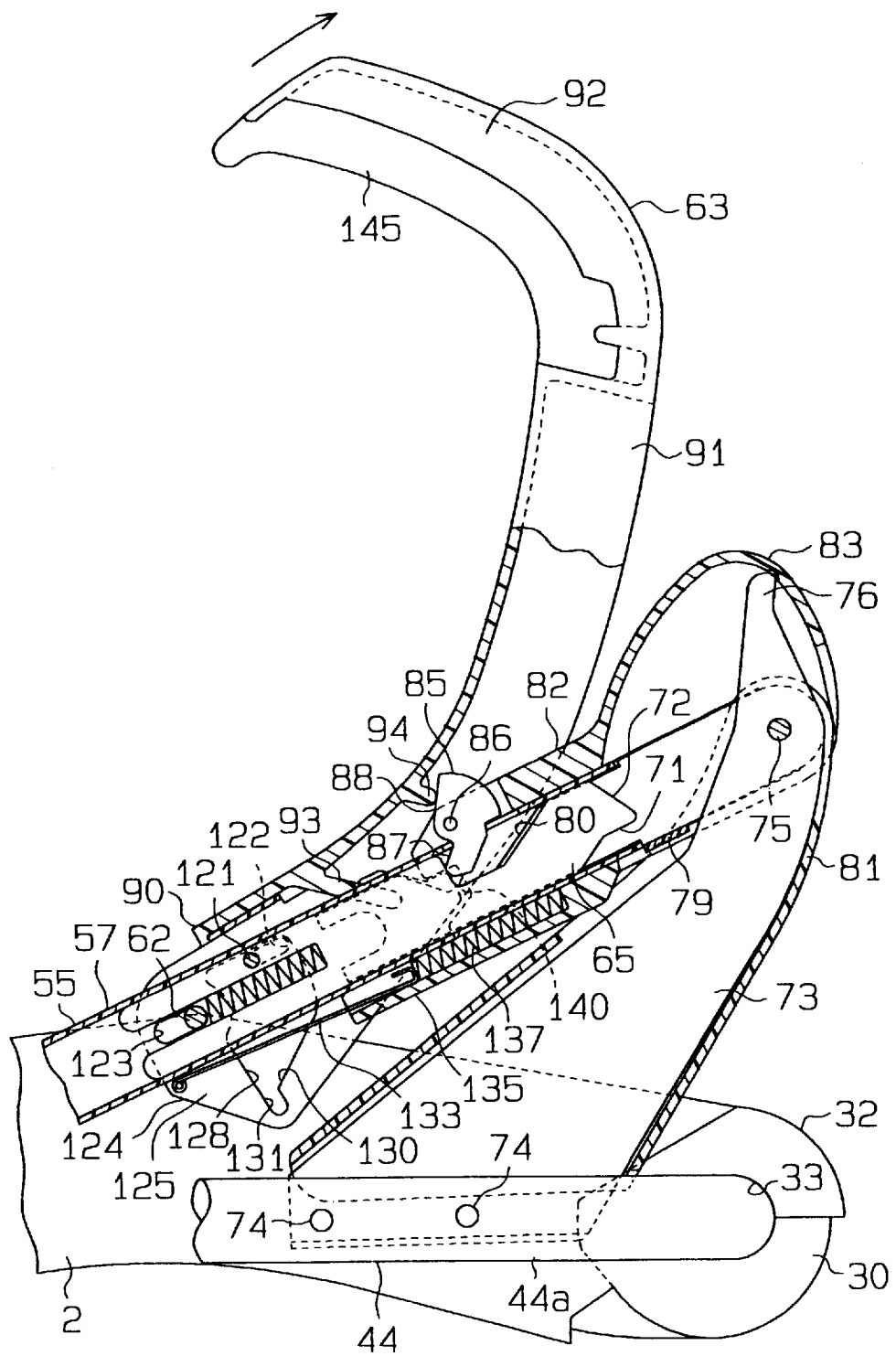
FIG. 46 is a partial sectional view illustrating the arrangement in which the lever arm of FIG. 45 has been lifted and both caster arms have been rotated in close proximity toward each other.

When the sliding member 65 slides toward the proximal end portion of the connection rod 55, it disengages from a locking member 73. On the other hand, when the lock pin 121 slides along the elongated bore 122 and contacts with the inner wall 122b of the bore 122, the connection rod 55 and the locking member 73 will fold as shown in FIG. 46. When this occurs, the lever arm 63 will not rotate on the support pin 62 because the protrusion 141 will engage the concave engagement portion 140. Therefore, the operator can lift the child safety seat 1.

Figure 47:
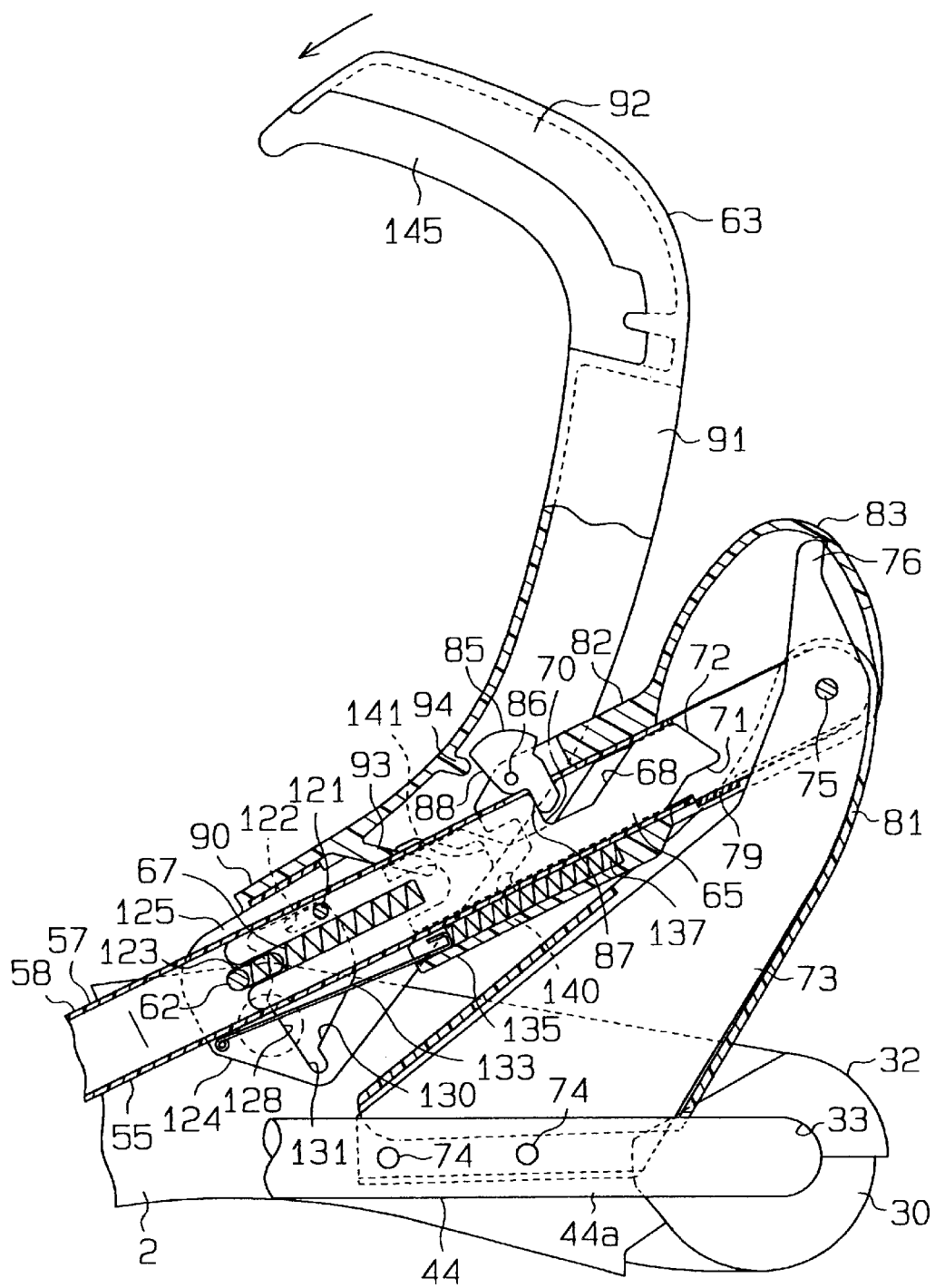
FIG. 47 is a partial sectional view illustrating the action of the safety seat when the operator releases the seat's grip portion from a state such as that shown in FIG. 46, where the lever arm moves forward and the sliding member slides rearward.

If the connection rod 55 and the locking member 73 are folded and the casters 41 and 45 are housed outside the both sides of the base portion 49, a locking arm 25 and an arm lock 47 will engage each other. This engagement causes the casters 41 and 45 to be held outside the base portion 49 and in housing positions. In this state, the casters 41 and 45 will not project from the undersurface of the bottom frame 2. If the operator releases his or her hold of the lever arm 63, the support pin 62 will move forward along the elongated bore 123 due to the urging force of the spring 67, as shown in FIG. 47. The lever arm 63 and the auxiliary member 124 move toward the proximal end portion of the connection rod 55, together with the support pin 62. This movement is stopped where the support pin 62 is brought into contact with the inner wall 123b of the elongated bore 123.

The movement of the lever arm 63 causes the protrusion 94 to move away from the lock release 85 and the protrusion 141 to disengage from the concave engagement portion 140. The sliding member 65 urged by the spring 67, slides toward the distal end of the connection rod 55. In the process of this sliding motion, the pressing surface 70 engages with the concave engagement portion 87 of the lock release 85. As the sliding member 65 slides, the lock pin 121 slides along the elongated bore 122 and finally comes into contact with the inner wall 122a of the bore 122.

Figure 48:
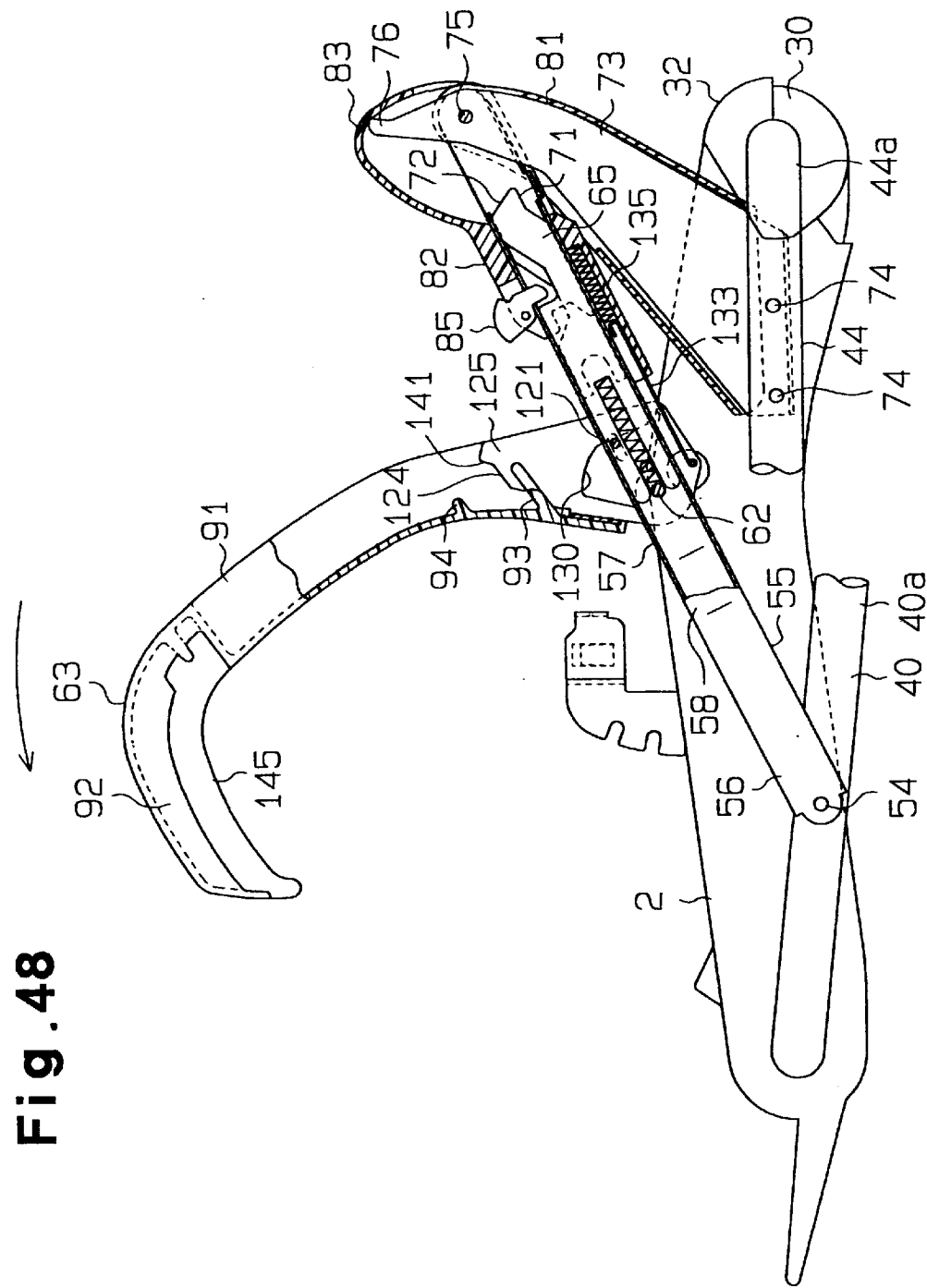
FIG. 48 is a partial sectional view showing how the lever arm is rotated forward from the position in FIG. 47.
Figure 49:
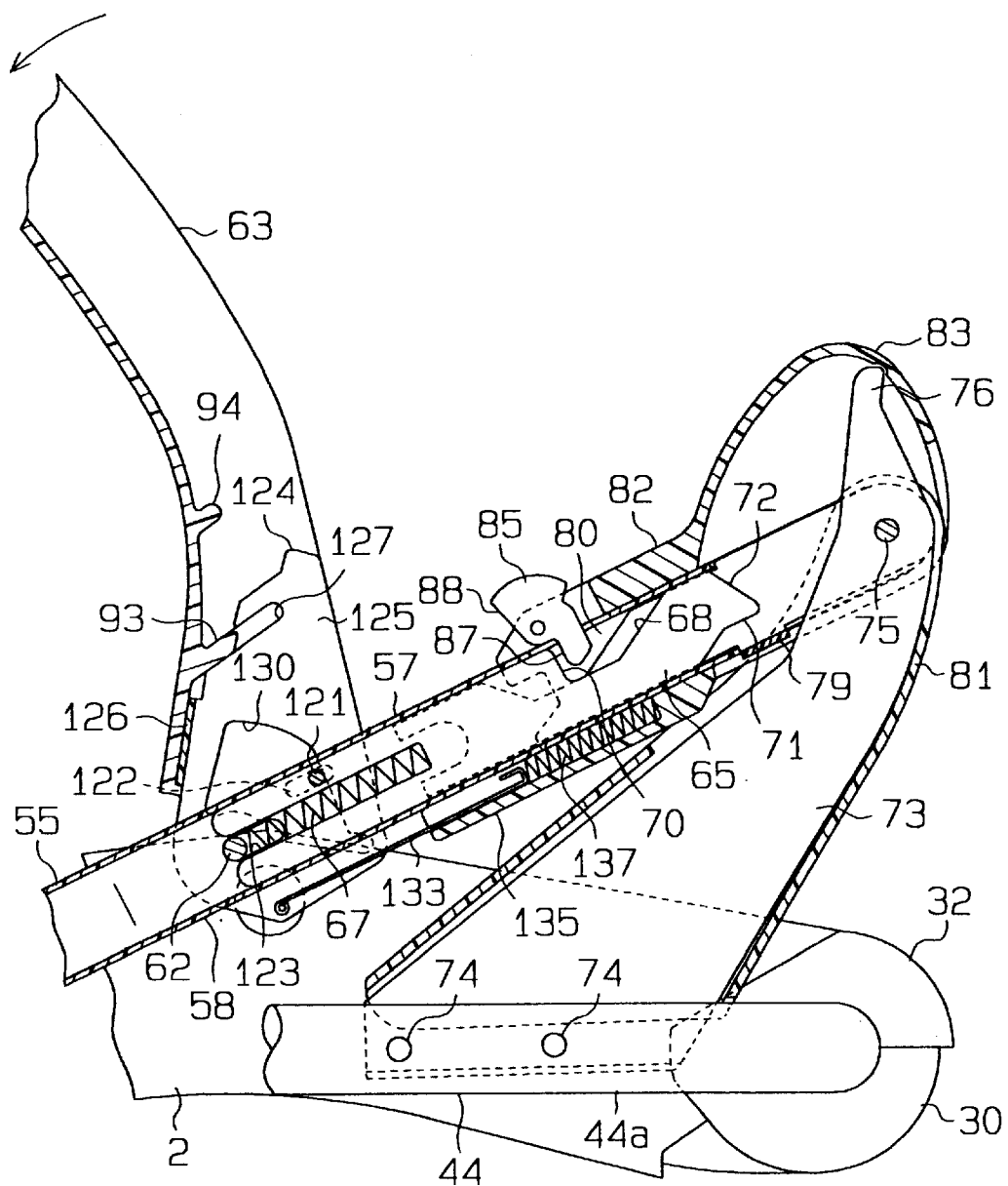
FIG. 49 is an enlarged sectional view showing the essential parts of FIG. 48.
Figure 50:
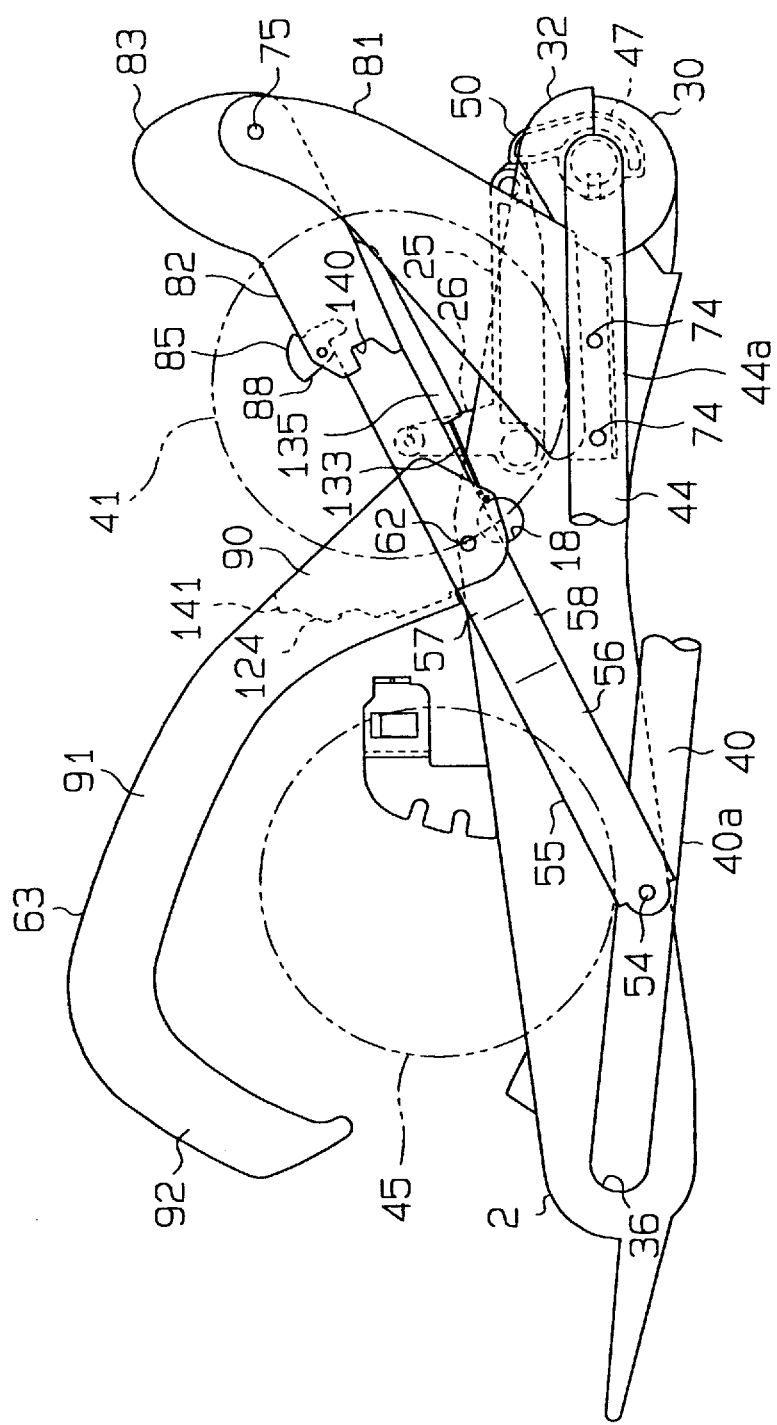
FIG. 50 is a partial side view showing the state in which the rear caster has been covered with the lever arm from the upper direction.

Accordingly, the lever arm 63 rotates forward as shown in FIGS. 47–49 and indicated by an arrow, resisting the urging force of the spring 137. With this rotation, the oscillating rod 133 compresses the spring 137 and enters the housing portion 135. In the initial stage of the rotation of the lever arm 63, the lock pin 121 is spaced from the wall of the housing bore 128. When the lever arm 63 is rotated to a certain degree, the slide portion 130 and the lock pin 121 interfere with each other.

Figure 51:
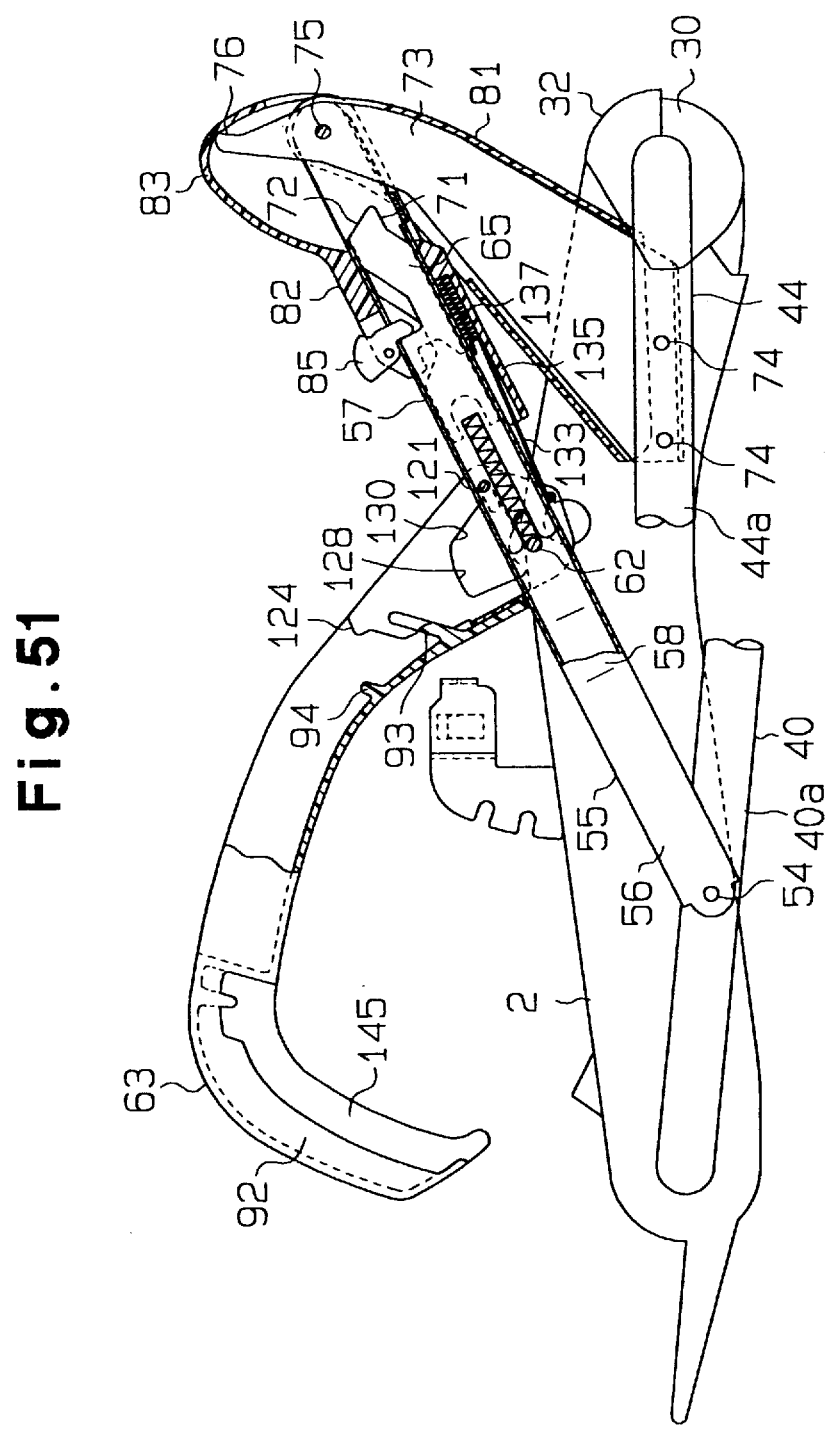
Figure 52:
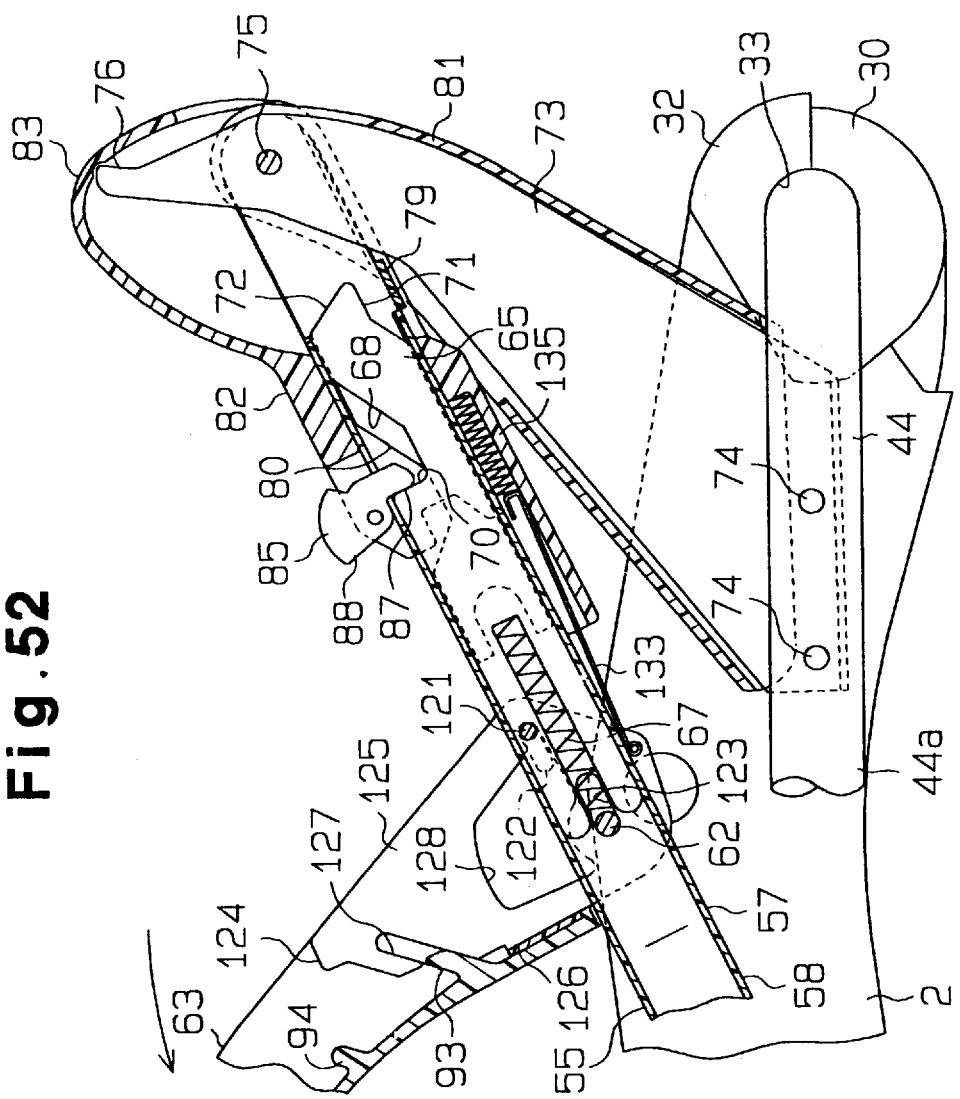
FIG. 52 is an enlarged sectional view showing the essential part of FIG. 51.

With this interference, the lock pin 121 slides along the elongated bore 122 toward the inner wall 122b, while resisting the urging force of the spring 67. This causes the sliding member 65 to slide toward the proximal end portion of the connection rod 55. If the lever arm 63 is further rotated forward, and the elongated bore 122 and the concave engagement portion 131 are aligned, the sliding member 65 will slide toward the distal end of the connection rod 55 due to the urging force of the spring 67 as shown in FIGS. 51 and 52. In the process of this sliding motion, the pressing surface 70 engages with the lock release 85 and also the lock pin 121 enters the concave engagement portion 131. Consequently, the rotation of the lever arm 63 is restricted. The child safety seat 1 is now switched to the auxiliary seat.

Figure 53:
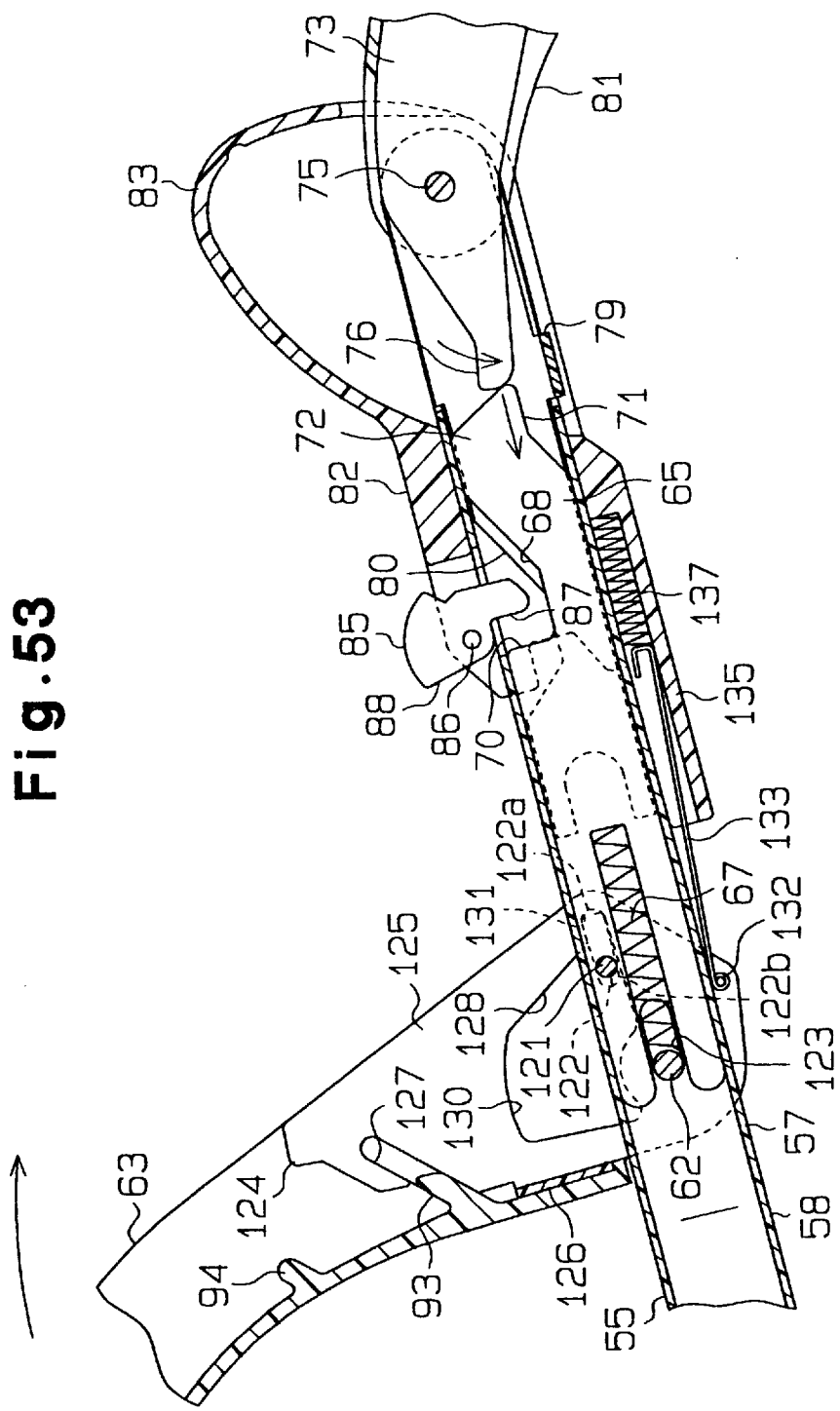
FIG. 53 is a partial sectional view illustrating an arrangement in which the sliding member is pushed forward by the locking member of FIG. 51 and in which the lock pin comes out of the engagement bore.

When the lever 10 is operated by the operator to switch the child safety seat 1 to the stroller and the locking arm 25 is disengaged from the arm lock 47, the connection rod 55 and the locking member 73 rotates on the connection pin 75. During the rotation of the locking member 73, the protrusion 76 presses the portion 72 of the sliding member 65 as shown in FIG. 53. Due to this pushing force, the member 65 slides toward the proximal end portion of the connection rod 55, and the lock pin 121 slides toward the inner wall 122b of the elongated bore 122. Then, because the lock pin 122 exits out of the concave engagement portion 131, the lever arm 63 and the auxiliary member 124 rotates on the support pin 62. The lever arm 63 being urged by the spring 137 and the auxiliary member 124 rotate rearward. When the rotation regulating portion 93 comes into contact with the upper surface of the connection rod 55, the rotation of the lever arm 63 is restricted. Therefore, the lever arms 63 stand up outside the both sides of the central portion of the lateral supports 7 in the base portion 49 as shown in FIG. 42.

It should be noted that in this embodiment a soft grip material 145 is fitted in the grip portion 92 of the lever arm 63, as shown in FIG. 42.

Figure 36:
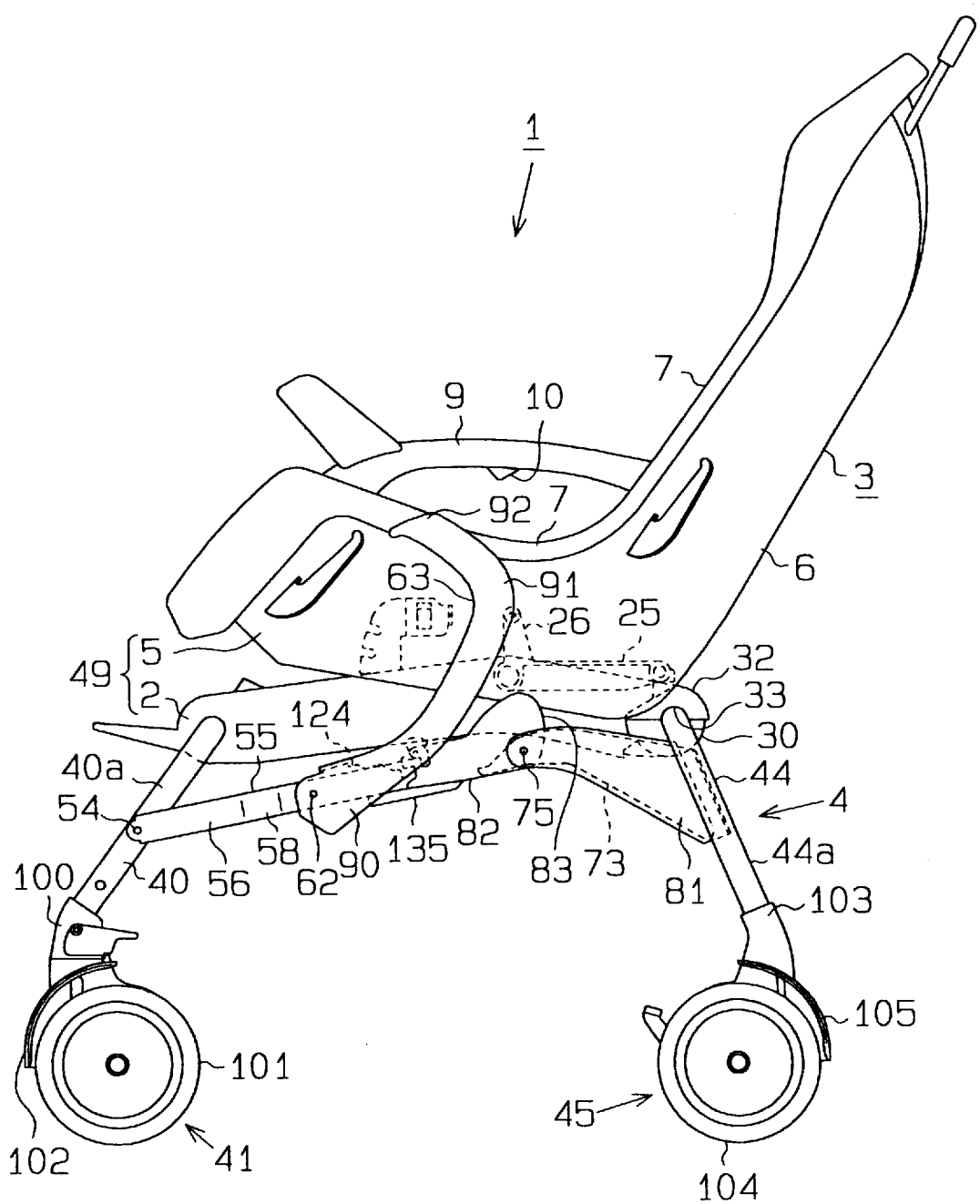
FIG. 36 is a perspective view showing a child safety seat used as a stroller according to a second embodiment of the present invention.

The operation and advantages of the child safety seat 1 as described above will now be described. FIGS. 36 and 43 illustrate the state in which the child safety seat 1 is used as a stroller. In this state, the lever arm 63 is urged by means of the spring 137 and rotates rearward or clockwise. This rotation is restricted because the rotation regulating portion 93 of the lever arm 63 comes into contact with the upper surface of the connection rod 55. The support pin 62 is brought into contact with the inner wall 123b of the elongated bore 123 and the lock pin 121 is brought into contact with the inner wall 122a of the elongated bore 122 by means of the spring 67. The protrusion 76 of the locking member 73 is sandwiched between the notch 71 of the sliding member 65 and the connection plate 79 the rotations of the connection rod 55 and the locking member 73 of the connection pin 75 are thereby restricted.

When the operator switches the child safety seat 1 to the auxiliary seat, they may grip the lever arms 63 from behind the child safety seat 1. Since the lever arms 63 are positioned outside the both sides of the longitudinal central portion of the base portion 49, the operator can easily and reliably grip the lever arm 63. If the lever arms 63 are pulled rearward again the urging force of the spring 137 by the operator, both the auxiliary members 124 will move rearward. The corresponding lever arms 63, and the support pin 62 slide to the rear of the lever 63 arms.

Figure 45:
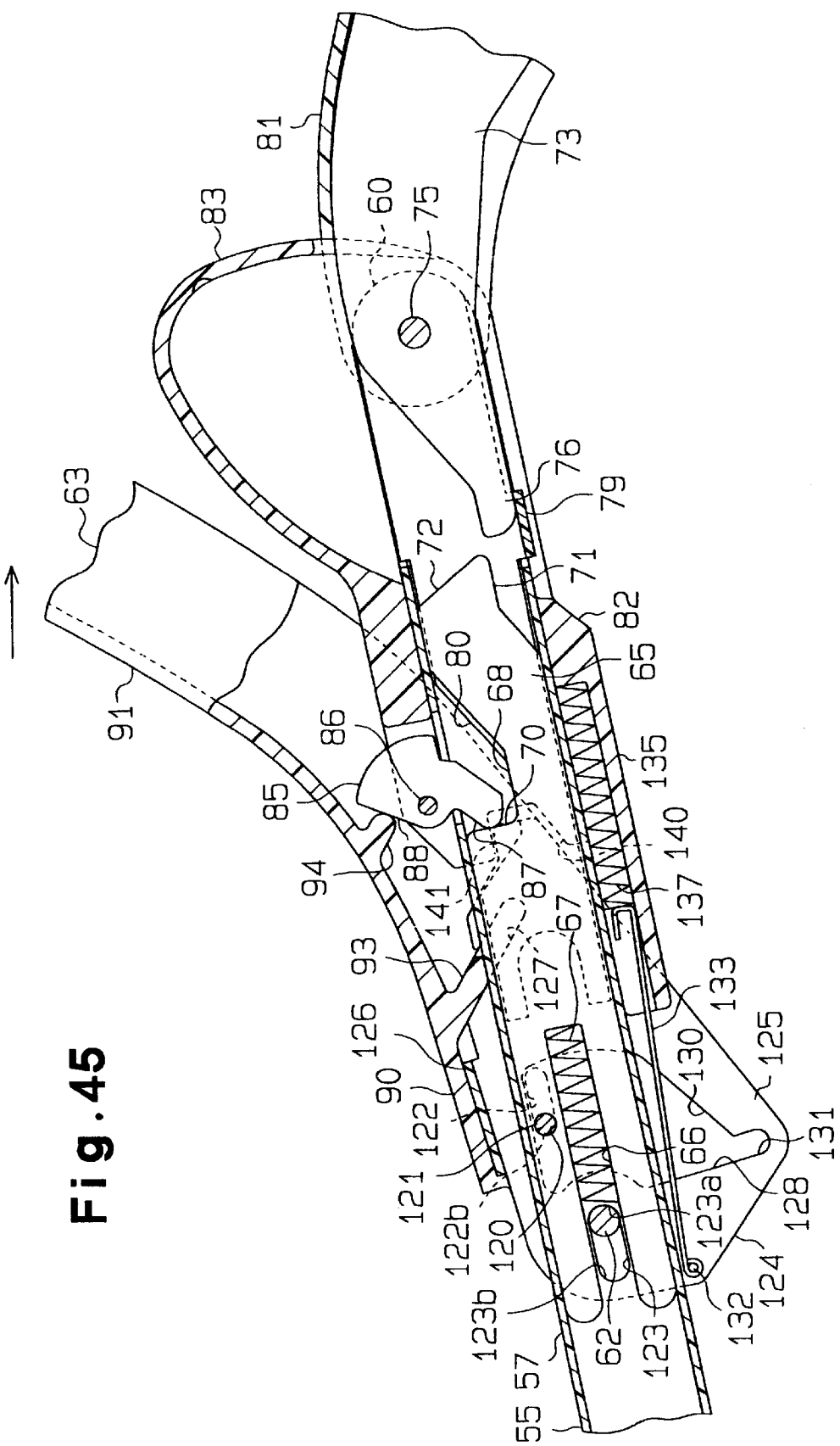
FIG. 45 is a partial sectional view illustrating the arrangement in which the lever arm of FIG. 43 has been pulled rearward and the sliding member has been disengaged from the locking member.

As the auxiliary member 124 moves, the protrusion 141 engages the concave engagement portion 140. The protection cover 82, the auxiliary member 124, and the lever arm 63 converge, restricting the rotations of the lever arm 63 and the auxiliary member 124 on the support pin 62. Also, when the protrusion 94 pushes the slide surface 88 by the rearward movement of the lever arm 63, the lock release 85 rotates clockwise on the release axle 86 as shown in FIG. 45. This rotation causes the lock release 85 to push the sliding member 65 against the urging force of the spring 67. The sliding member 65 slides toward the proximal end portion of the connection rod 55 and disengages the locking member 73. Therefore, the lock pin 121 slides forward along the elongated bore 122 and engages with the inner wall 122b.

In this state, when the operator lifts the lever arm 63, the connection rod 55 and the locking member 73 rotate downward on the connection pin 75 and fold together. At this time, since the concave engagement portion 140 and the protrusion 141 have engaged each other, the lever arm 63 will not rotate on the support pin 62. Therefore, the operator can lift the child safety seat 1 in stable state by gripping the lever arm 63.

Figure 37:
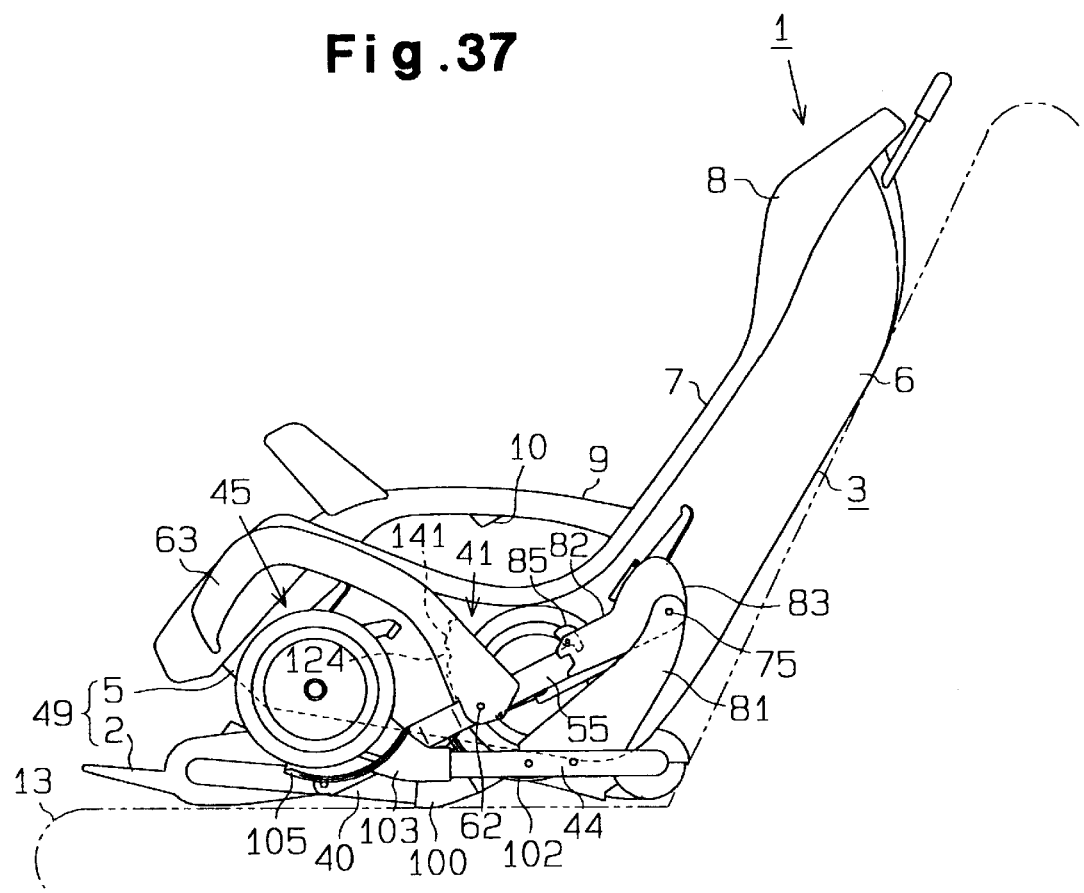
FIG. 37 is an elevational side view showing the state in which the safety seat of FIG. 36 has been switched to an auxiliary automobile seat.

When the connection rod 55 and the locking member 73 are folded, the casters 41 and 45 are retracted outside the opposite sides of the base portion 49 as shown in FIG. 37. Then, the locking arm 25 and the arm lock 46 engage with each other so that the rotations of the caster arms 40 and 44 are restricted. This prevents the casters 41 and 45 from protruding below undersurface of the bottom frame 2.

In this state, if the operator releases or loosens their hold of the lever arm 63, the support pin 62 will slide forward along the elongated bore 123, and the lever arm 63 and the auxiliary member 124 will move toward the proximal end portion of the connection rod 55 by means of the urging force of the spring 67 as shown in FIG. 47. In the process of the movement of the lever arm 63, the protrusion 94 disengages from the lock release 85. In the process of the movement of the auxiliary member 124, the protrusion 141 engages from the concave engagement portion 140. Also, the sliding member 65 slides toward the distal end portion of the connection rod 55 by the urging force of the spring 67. As the sliding member 65 slides, the lock pin 121 moves rearward along the elongated bore 122 and engages with the inner wall 122a.

From this state, the operator rotates the lever arm 63 forward, while compressing the spring 137. In the initial stage of the rotation of the lever arm 63, the lock pin 121 is spaced from the wall surface of the housing bore 128. If however, the lever arm rotates more than a predetermined angle, the slide portion 130 and the lock pin 121 will interfere with each other as shown in FIG. 49. Consequently, the lock pin 121 slides toward the inner wall 122b of the elongated bore 122. This causes the sliding member 65 to slide toward the proximal end portion of the connection rod 55.

If the operator rotates the lever arm 63 further forward, with the elongated bore 122 and the concave engagement portion 131 aligned, the longitudinal direction of the concave engagement portion 131 will move essentially parallel to the connection rod 55. Moreover, the lock pin will stop interfering with the slide portion 130 as shown in FIGS. 51 and 52. Consequently, the sliding member 65 will slide toward the distal end portion of the connection rod 55 by the urging force of the spring 67, as the lock pin 121 enters the concave engagement portion 131. If the lock pin 121 engages with the inner wall 122a, the forward rotation of the lever arm 63 is restricted. At this time, the lever arm 63 rotates to the rear by means of the spring 137 in compression state. However, this rotation is restricted by the engagement of the lock pin 121 and the concave engagement portion 131. This prevents the forward and rearward rotations of the lever arm 63.

When the lock pin 121 is engaged with the concave engagement portion 131, the upper end of the caster 45 is covered with the lever arm 63, and this change is resulted from the conversion of the child safety seat from the stroller to the auxiliary seat.

Thus, in the second embodiment, the child safety seat 1 can be switched from the stroller to the auxiliary seat by a very simple operation such that after both the lever arms 63 are pulled rearward and temporarily loosened, they can be rotated forward. The auxiliary seat can then be placed on an automobile seat 13 as shown in FIG. 37 and fixed to the seat 13 by means of a seat belt (not shown).

When the operator switches the form of the child safety seat 1 from the auxiliary seat to the stroller, he or she can push the lever 10 into the side guard 9 and disengages the distal end of the locking arm 25 from the arm lock 47. Due to the rotation of the locking arm 25, the operator can then grip the side guard 9 and lift the child safety seat 1. The connection rod 55 and the locking member 73 then rotate on the connection pin 75. In the process of the rotation of the locking member 73, the protrusion 76 depresses the depressed portion 72 of the sliding member 65 as shown in FIG. 53.

This causes the sliding member 65 to slide toward the proximal end portion of the connection rod 55. This sliding motion causes the lock pin 121 to slightly slide along the elongated bore 122 toward the inner wall 122b.

By this sliding motion, the lock pin 121 comes out of the concave engagement portion 131, allowing the lever arm 63 and the auxiliary member 124 to rotate on pin 62. The lever arm 63 and the auxiliary member 124 then rotate rearward by means of the spring 137 in the compressed state as shown by the arrow in FIG. 53. When, as shown in FIG. 43, the rotation regulating portion 93 is brought into contact with the upper surface of the connection rod 55, the rotation of the lever arm 63 will be restricted.

Accordingly, the second embodiment has the similar operation and advantages as the first embodiment. In addition, while the regulating pin 39 restricts the rotation of the lever arm 63 in the first embodiment, this pin becomes unnecessary in the second embodiment. Accordingly, the extending member 38 and the oblique member 38a are not required. With this structure, the number of parts from the base portion 2 is reduced, improving the exterior appearance of the child safety seat 1. Further, since there is no need for integrally forming the extending member 38, the oblique member 38a and the regulating pin 39, the base portion 2 is produced easily and the production costs is reduced.

Further, in the second embodiment, since the grip material 145 made of a soft material is fitted in the grip portion 92 of the lever arm 63, grip at the grip portion 92 is improved. In addition, since the friction between the grip portion 92 and the operator's hand is increased, the operator's hand does not easily slip out of the grip portion 92 so that the operator can reliably lift the child safety seat 1.

Figure 54A:
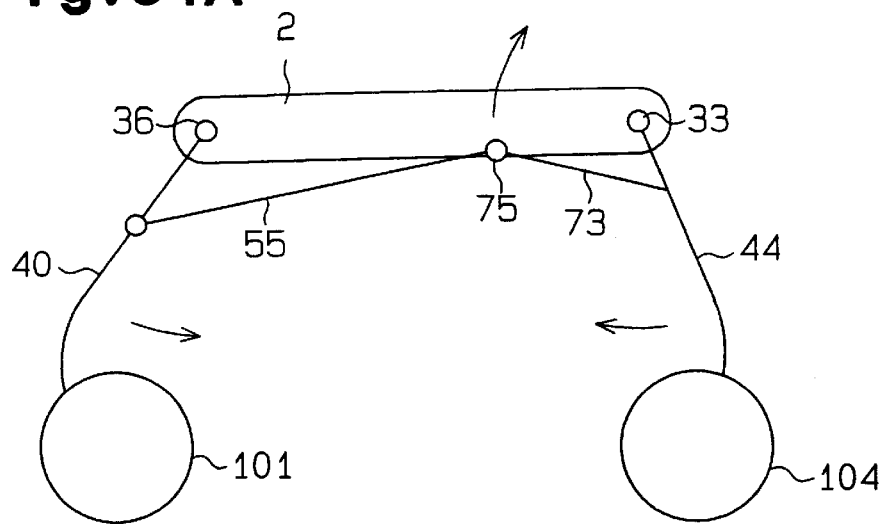
FIGS. 54A, 54B and 54C diagrammatically illustrate sequential side views of retracting front and rear casters and associated structures.
Figure 54B:
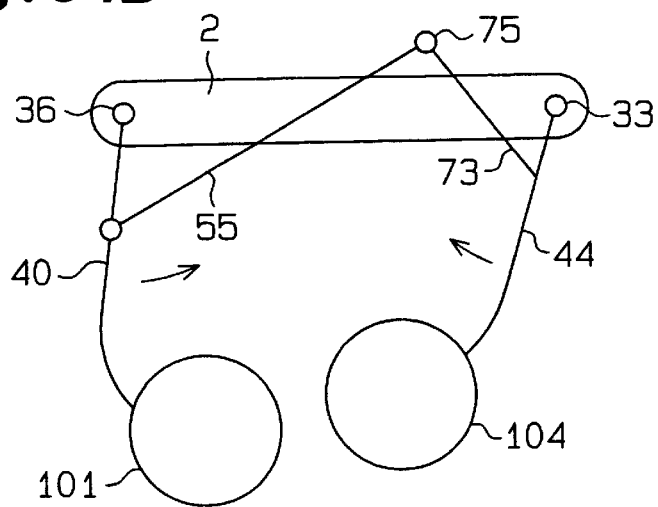
Figure 54C:
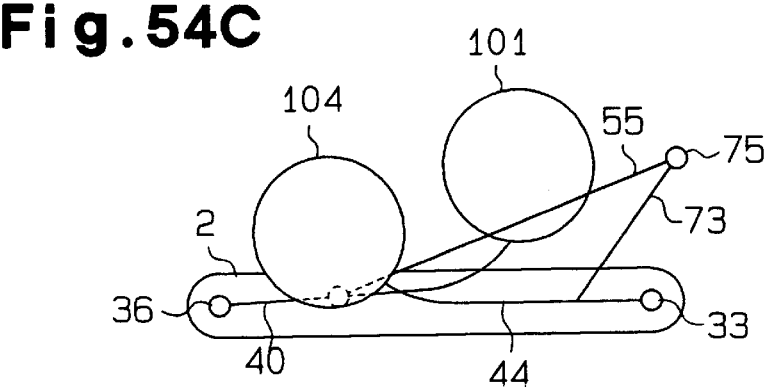

FIGS. 54A, 54B and 54C diagrammatically illustrate a sequence of retracting a front caster 101 and a rear caster 104 and the associated structures including a front arm 40, a rear arm 44, a connection rod 55 and a locking member 73. In general, FIGS. 54A and 54C respectively correspond to FIGS. 2 and 6.

Referring to FIG. 54A, both front and rear casters 101 and 104 are at a predetermined extended position so that the child safety seat is used as a stroller. At the extended position, the front arm 40 and the rear arm 44 are locked by the connection rod 55 and the locking member 73 which are pivotally joined at a connection pin 75.

Referring to FIG. 54B, the front caster 101 and the rear caster 104 are in the process of retracting, and the front arm 40 is rotated about a first bore 36 while the rear arm 44 is rotated about a second bore 33 as indicated by arrows. As the arms 40 and 44 rotate, the connection rod 55 and the locking member 73 are pivoted at the connection pin 75, and the connection pin 75 moves upwardly.

Referring to FIG. 54C, the front and rear casters 101 and 104 have been rotated above a bottom frame 2 to reach a predetermined retracted position. As a result of this rotation, the front and rear arms 40 and 44 have traveled to reach a position which is approximately in parallel to the bottom frame 2. The connection rod 55 and the locking member 73 have been also positioned above the bottom frame 2, and the connection pin 75 is now positioned behind the front caster 101 above the bottom frame 2. At the retracted position, a safety seat is now ready as an automobile safety seat.

The above-described movements as illustrated in FIGS. 54A through 54C are reversed when the front caster 101, the rear caster 104 and the associated structures are released to travel back to the extended position. The control for the above-described retracting process is initiated when a lever arm 63 is tilted backward as indicated by an arrow in FIG. 17. As already described, referring to FIG. 17, this lever movement causes a sliding member 65 to move a pin 62 and ultimately to disengage from the locking member 73. Referring to FIG. 19, contacting portions 72 and 76 are separated, as a result of the lever movement, the locking member 73 is now rotating as indicate by a newly added arrow towards the newly added rotated locking member 73 as indicated by dotted lines.

The extending process is initiated when a user presses a button 10 located on a side guard 9 in FIG. 6. Now referring to FIG. 11, the rear caster arm 44 is locked by a contacting surface 52 of an elongated portion 50 at an extended position as shown by the dotted line. The button in turn is operationally connected to a wire 27 to cause a locking arm 25 to rotate in a counter-clockwise direction as shown by arrows in FIG. 12. As the locking arm 25 rotates, the contacting surface 52 is now released from the locking arm 25 and rotates as a counter-clockwise direction due to the weight of the arm 44 and the caster 104. The rotated arm 40 is shown in dotted line and an arrow in FIG. 12. As the rear arm 44 rotates, the front caster 101 and the front arm 40 are also extended via the connection rod 55 and the locking member 73 which are pivoted at the connection pin 75.

As described above, the user lifts the stroller off the ground by the handles 92 in order to convert a stroller into a safety seat. When the stroller is lifted in the air by the handles 92, the weight of the stroller exerts a downward force towards the ground on the pin 62 connecting the handles 92 and the link 55, and causes the handle 92 to rotate backwards. This backward motion of the handles releases the locking mechanism 88 so that the link arm 55 and the stopper 73 are free to bend at the joint 75. Since the seat 3 and the bottom frame 2 outweigh the total weight of the front and rear arms 40a, 44a, the front and rear casters 41, 45, and the link 55 and the stopper 81, the gravitational force exerted by the weight of the seat structure 3 and the bottom frame 2 further rotates the arms 40a, 44a and the casters 41, 45 so that they are in a position that is at least equal to or above the most bottom portion of the bottom frame 2 while the stroller is lifted off the ground. When the arms 40a, 44a and the casters 41, 45 are retracted to a predetermined position, they are locked in that retracted position. Thus, by simply lifting the stroller by the lift handles 92, the user can easily convert the stroller into the safety sat without having to himself rotate the arms and the casters to the retracted position.

The above-described retraction mechanism is further advantageous in that it is relatively maintenance free, since the retraction mechanism does not employ springs or any other external mechanisms to rotate the arms and casters.

As described above, a user presses the release button 10 while holding the safety seat 1 by the arm 9 in order to convert the safety seat into the stroller. The release button 10 unlocks the retracted arms 40a and 44a, and the weight of the arms and the casters causes unfolding of the retracted arms and the casters into a predetermined extended position. Thus, by simply pressing the release button, the user can easily convert the safety seat without himself having to rotate the arms and the casters into the extended position.

Therefore, the present examples and embodiments are to be considered as illustrative and not restrictive and the invention is not to be limited to the details given herein, but may be modified within the scope of the appended claims.

What is claimed is:

1. A child safety seat for selective use as an auxiliary seat in an automobile seat and as a stroller, said child safety seat comprising:

a seat structure attachable on the automobile seat, said seat structure having sides, a torso support and a back portion, said seat structure having a first weight;

front caster arms rotatably coupled to the seat structure for selectively extending downward from and retracting to a retracted position above a lowermost portion of the torso support;

a pair of front casters rotatably coupled to the front caster arms, respectively, said front casters moving selectively beneath and above the lowermost portion of the torso support in accordance with the extending and retracting motions of the front caster arms;

rear caster arms rotatably coupled to the seat structure for selectively extending downward from and retracting to said retracted position above the lowermost portion of the torso support, wherein the front and rear caster arms retract substantially simultaneously;

a pair of rear casters rotatably coupled to the rear caster arms, respectively, said rear casters moving beneath and above the lowermost portion of the torso support in accordance with the extending and retracting motions of the rear caster arms wherein said front caster arms, said front casters, said rear caster arms and said rear casters together defining a mobile structure weighing a second weight;

a pair of grip members respectively provided in both sides of the seat structure, each of said grip members having an intermediate portion spaced from the seat structure;

an operation lever for selectively extending and retracting the front and rear caster arms, said operation lever being operable when at least one of grip members is gripped;

first holding means for holding the front and rear caster arms in the retracted positions in response to the operation of the operation lever; and first release means for releasing the front and rear caster arms held in the retracted positions in response to the operation of the operation lever; and a lift handle adjustably connected to said mobile structure for lifting the child safety seat off the ground, said first weight being greater than said second weight and pivoting to automatically move said mobile structure into said retracted position when the child safety seat has been lifted off the ground.

2. The child safety seat as set forth in claim 1 further including:

link means for linking said front and rear caster arms to associate the respective extending and retracting motions of the front and rear caster arms, said link means being arranged to selectively extend downward from and retract above the lowermost portion in accordance with the extension and retraction of the front and rear caster arms; and operation means provided with the link means for actuating the link means to selectively extend and retract the front and rear caster arms.

3. The child safety seat as set forth in claim 2, wherein said link means includes a pair of link structures respectively disposed at both sides of the seat structure, each link structure having:

a front link member rotatably coupled to the front caster arm;

a rear link member coupled to the rear caster arm; and a shaft for pivotably connecting the front and rear link members.

4. The child safety seat as set forth in claim 3, wherein said operation means includes:

a pair of lever arms positioned outside the seat structure; and a pair of shafts for rotatably attaching said lever arms to the link structures, respectively.

5. The child safety seat as set forth in claim 4 further comprising first securing means for securing the extension of the lever arms above the link means when the front and rear caster arms are extended.

6. The child safety seat as set forth in claim 5, wherein said first securing means includes:

a biasing member, provided between the link means and the lever arm, for biasing the lever arm to rotate; and a regulating member provided in the seat structure for regulating the rotation of the lever arm caused by a force of the biasing member.

7. The child safety seat as set forth in claim 4, wherein each of said lever arms is formed into a curved shape and has a distal end extending in a forward direction in respect with seat structure.

8. The child safety seat as set forth in claim 4 further comprising second securing means for securing the lever arms to be retracted above one of said front and rear casters.

9. The child safety seat as set forth in claim 8, wherein said second securing means includes:

a biasing member, provided between the link means and the lever arm, for biasing the lever arm to rotate; and a regulating member, provided in the seat structure for regulating the rotation of the lever arm caused by the force of the biasing member.

10. The child safety seat as set forth in claim 2, wherein said front caster arms and said rear caster arms are connected by the link means to rotate toward each other when retracted above the lowermost portion of the torso portion in response to operation of said operation means.

11. The child safety seat as set forth in claim 10, wherein said front and rear caster arms cross each other in the retracted positions.

12. The child safety seat as set forth in claim 10 further comprising:

said front caster arm having a first distal end;

a first shaft interposed between the first distal end and the front caster, said first shaft having an axis offset from the axis of the front caster arm toward the corresponding rear caster arm;

said rear caster arm having a second distal end; and a second shaft interposed between the second distal end and the rear caster, said second shaft having an axis offset from the axis of the rear caster arm toward the corresponding front caster arm.

13. The child safety seat as set forth in claim 2 further including:

second holding means for holding said front and rear caster arms in the extended positions; and second release means for releasing the front and rear caster arms held in the extended positions in response to the operation of the operation means.

14. The child safety seat as set forth in claim 1, wherein each of said grip members is bridged between the torso support and the back portion.

15. The child safety seat as set forth in claim 1, wherein said first holding means is provided in both sides of the seat structure and said operation lever is provided in the grip members.

16. The child safety seat as set forth in claim 1, wherein said front caster arms, said rear caster arms, said front casters, and said rear casters are respectively spaced larger than the width of the seat structure.

17. The child safety seat as set forth in claim 16, wherein said front and rear caster arms are connected by way of the link means to be rotated toward and cross each other when the front and rear caster arms are retracted in response to operation of the operation means, wherein the space separating the front caster arms is other than the space separating the rear caster arms, and wherein the space separating the front casters is other than the space separating the rear casters.

18. A child safety seat for selective use as an auxiliary seat in an automobile seat and as a stroller, said child safety seat comprising:

a seat structure attachable on the automobile seat, said seat structure having a torso support and a back portion, said seat structure having a first weight;

a pair of front caster arms separated from each other by a first space and rotatably coupled to the seat structure for selectively extending downward from and retracting to a retracted position above a lowermost portion of the torso support;

a pair of front casters separated from each other by a second space, and respectively rotatably coupled to distal ends of the front caster arms, said front casters moving selectively beneath and above the lowermost portion of the torso support in accordance with the extending and retracting motions of the front caster arms;

a pair of rear caster arms separated from each other by a third space, and rotatably coupled to the seat structure for selectively extending downward from and retracting to said retracted position above the lowermost portion of the torso support;

a pair of rear casters separated from each other by a fourth space, and respectively rotatably coupled to distal ends of the rear caster arms, said rear casters moving selectively beneath and above the lowermost portion of the torso support in accordance with the extending and retracting motions of the rear caster arms;

wherein said seat structure has a width less than the first through fourth spaces wherein said front caster arms, said front casters, said rear caster arms and said rear casters together defining a mobile structure weighing a second weight;

link means including a pair of front link members and a pair of rear link members, said front link members being respectively pivotally coupled to the front caster arms, said rear link members being respectively secured to the rear caster arms and respectively pivotally coupled to said pair of front link members, wherein each front link member and the associated rear link member form an angle adjustable according to the relative pivoting movement of the front and rear link members to associate the extension and retraction of the front and rear caster arms, and wherein said front and rear link members retract to said retracted position above a lowermost portion of the torso support;

a pair of lever arms for selectively retracting the front and rear caster arms by lifting the child safety seat off the ground at said lever arms, each lever arm pivotally coupled to the link means, said first weight being greater than said second weight and pivoting to automatically move said mobile structure into said retracted position when the child safety seat has been lifted off the ground;

a first securing means for securing the extension of the lever arms above the link means when the front and rear caster arms are extended wherein first securing means includes:

a biasing member, provided between the link means and the lever arm, for biasing the lever arm to rotate; and a regulating member provided in the seat structure for regulating the rotation of the lever arm caused by a force of the biasing member.

19. The child safety seat as set forth in claim 18, wherein said front caster arms and said rear caster arms are connected by the link means to rotate toward each other when retracted above the lowermost portion of the torso support in response to operation of the lever arms.

20. The child safety seat as set forth in claim 19, wherein the first space is other than the third space and the second space is other than the fourth space.

21. The child safety seat as set forth in claim 18 further including:

first holding means for holding said front and rear caster arms in the extended positions; and first release means for releasing the front and rear caster arms held in the extended positions in response to the operation of the lever arms.

22. The child safety seat as set forth in claim 18, which further comprises:

an operation lever for selectively extending and retracting the front and rear caster arms, said operation lever being operable when at least one of grip members is gripped;

second holding means for holding the front and rear caster arms in the retracted positions in response to the operation of the operation lever; and second release means for releasing the front and rear caster arms held in the retracted positions in response to the operation of the operation lever.

23. The child safety seat as set forth in claim 18, wherein said seat structure includes a pair of grip members respectively provided in both sides of the seat structure, each of said grip members having an intermediate portion spaced from the seat structure.

24. The child safety seat as set forth in claim 18 further comprising second securing means for securing the lever arm to be retracted above one of said front and rear casters.

25. The child safety seat as set forth in claim 24, wherein said second securing means includes:

a biasing member, provided between the link means and the lever arm, for biasing the lever arm to rotate; and a regulating member, provided in the seat structure for regulating the rotation of the lever arm caused by the force of the biasing member.

26. A child safety seat for selective use as an auxiliary seat in an automobile seat and as a stroller, said child safety seat comprising:

a seat structure attachable on the automobile seat, said seat structure having a torso support and a back portion, said seat structure having a first weight;

a pair of front caster arms separated from each other by a first space and rotatably coupled to the seat structure for selectively extending downward at an extended position and retracting to a retracted position above a lowermost portion of the torso portion;

a pair of front casters separated from each other by a second space, and rotatably coupled to distal ends of the front caster arms, said front casters moving selectively above and underneath the lowermost portion of the torso support in accordance with the extending and retracting motion of the front caster arms;

a pair of rear caster arms separated from each other by a third space, and rotatably coupled to the seat structure for selectively extending downward at said extended position and retracting to said retracted position above the lowermost portion of the torso support;

a pair of rear casters separated from each other by a fourth space, and respectively rotatably coupled to distal ends of the rear caster arms, said rear casters being positioned underneath the front portion of the torso support, said rear casters moving selectively beneath and above the lowermost portion of the torso support in accordance with the extending and retracting motions of the rear caster arms;

wherein said seat structure having a width less than the first, second, third and fourth spaces wherein said front caster arms, said front casters, said rear caster arms and said rear casters together defining a mobile structure weighing a second weight;

link means including a pair of front link members and a pair of rear link members, said front link members being respectively pivotally coupled to the front caster arms, said rear link members being respectively secured to the rear casters arms and pivotably coupled to said pair of front link members, wherein each front link member and the associated rear link member form an angle decreasable according to the relative pivoting movement of the front and rear link members to rotate the front and rear caster arms toward each other, and wherein the front and rear link members are retracted to said retracted position above the lowermost portion of the seat structure;

a pair of lever arms for selectively extending and retracting the front and rear caster arms by lifting the child safety seat off the ground at said lever arms, each lever arm being pivotably coupled to the link means, said first weight being greater than said second weight and pivoting to automatically move said mobile structure into said retracted position when the child safety seat has been lifted off the ground;

a first securing means for securing the extension of the lever arms above the link means when the front and rear caster arms are extended wherein first securing means includes:

a biasing member, provided between the link means and the lever arm, for biasing the lever arm to rotate; and a regulating member provided in the seat structure for regulating the rotation of the lever arm caused by a force of the biasing member;

said lever arms further comprise:

a first holding means for holding said front and rear caster arms at said extended positions;

a first release means for releasing said front and rear caster arms held in the extended positions in response to the operation of the operation means;

a second holding means for holding said front and rear caster arms at said retracted positions; and a second release means for releasing the front and rear caster arms held at said retracted positions.

27. The child safety seat as set forth in claim 26, wherein said seat structure includes a pair of grip members respectively provided in both sides of the seat structure, each of said grip members having an intermediate portion spaced from the seat structure.

28. The child safety seat as set forth in claim 26, wherein said seat structure includes a pair of grip members respectively provided in both sides of the seat structure, and wherein said second release means includes a pair of operation levers operable when the grip members are gripped.

29. The child safety seat as set forth in claim 26 further comprising a second securing means for securing the lever arms to retract above one of the front and rear casters when the front and rear caster arms are retracted.

30. The child safety seat as set forth in claim 29, wherein said second securing means includes:

biasing members, respectively provided between the link means the associated lever arms, for biasing and rotating the lever arms; and regulating members, respectively provided in the seat structure for regulating the rotation of the associated lever arms caused by the force of the biasing members.

* * * * *

UNITED STATES PATENT AND TRADEMARK OFFICE
CERTIFICATE OF CORRECTION

PATENT NO.   : 5,823,547  
DATED        : October 20, 1998  
INVENTOR(S)  : Tetsuro Otobe, Hiroshi Matsumoto, Kazuhiro Sasaki, Kazumasa Okumura, Kazuo Sato and Masaaki Toya Page 1 of 1

It is certified that error appears in the above-identified patent and that said Letters Patent is hereby corrected as shown below:

Column 9,  
Line 54, change "76" to -- 78 --.

Column 11,  
Line 54, after "below" insert -- projecting --.

Column 20,  
Line 50, after "1" insert -- consitituted --.

Column 23,  
Line 41, after "move" insert -- towards --.

Column 27,  
Line 10, change "has" to -- having --.

Column 28,  
Line 16, change "second" to -- first --.

Signed and Sealed this

Nineteenth Day of February, 2002

Attest:

*Attesting Officer*

JAMES E. ROGAN  
*Director of the United States Patent and Trademark Office*